United States Patent
Inata et al.

(10) Patent No.: US 8,099,741 B2
(45) Date of Patent: *Jan. 17, 2012

(54) DISK DEVICE

(75) Inventors: Masahiro Inata, Hyogo (JP); Teruyuki Takizawa, Osaka (JP); Kozo Ezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 583 days.

This patent is subject to a terminal disclaimer.

(21) Appl. No.: 12/302,948

(22) PCT Filed: Jun. 1, 2007

(86) PCT No.: PCT/JP2007/061219
§ 371 (c)(1),
(2), (4) Date: Dec. 1, 2008

(87) PCT Pub. No.: WO2007/142156
PCT Pub. Date: Dec. 13, 2007

(65) Prior Publication Data
US 2010/0017813 A1 Jan. 21, 2010

(30) Foreign Application Priority Data
Jun. 2, 2006 (JP) .................. 2006-155135

(51) Int. Cl.
*G11B 17/04* (2006.01)
(52) U.S. Cl. .................. 720/604; 720/641; G9B/17.009
(58) Field of Classification Search .................. 720/604, 720/641
See application file for complete search history.

(56) References Cited

U.S. PATENT DOCUMENTS

| 4,608,681 A | 8/1986 | Shiosaki |
| 4,740,949 A | 4/1988 | Davis |
| 7,093,271 B2 * | 8/2006 | Ezawa et al. .................. 720/643 |
| 2003/0112739 A1 | 6/2003 | Takizawa et al. |

FOREIGN PATENT DOCUMENTS

| EP | 0 579 172 A2 | 1/1994 |
| JP | 61-006974 | 1/1986 |
| JP | 09-153264 | 6/1997 |
| JP | 2001-035119 | 2/2001 |
| JP | 2001-143359 | 5/2001 |
| JP | 2003-228944 | 8/2003 |

OTHER PUBLICATIONS

International Search Report for corresponding Application No. PCT/JP2007/061219 mailed Jul. 3, 2007.
Supplemental European Search Report for corresponding European Application No. 07 74 4606 mailed Sep. 14, 2011.

* cited by examiner

*Primary Examiner* — Hoai V Ho
(74) *Attorney, Agent, or Firm* — Renner, Otto, Boisselle & Sklar, LLP

(57) ABSTRACT

A disk drive includes: a pair of guide walls, which is arranged in the vicinity of the holder opening of a cartridge holder to define a direction in which a disk cartridge is supposed to be inserted; a first opening/closing lever, which has a first engaging portion that engages with a portion of the disk cartridge and which rotates while the disk cartridge is being inserted or ejected; and a second opening/closing lever, which has a second engaging portion that engages with another portion of the disk cartridge and which rotates while the disk cartridge is being inserted or ejected. The first and second opening/closing levers rotate so as to leave a broader gap between the first and second engaging portions than between the guide walls when the drive gets loaded with the disk cartridge, thereby opening a window in the disk cartridge.

10 Claims, 24 Drawing Sheets

(a)

(b)

(a)

(b)

(a)

(b)

(a)

(b)

DISK DEVICE

TECHNICAL FIELD

The present invention relates to a disk drive for reading and/or writing data from/on a disklike data storage medium such as an optical disk or a magnetic disk that is housed in a disk cartridge.

BACKGROUND ART

Various disklike read-only or rewritable storage media, including optical disks such as a CDs and DVDs to read and write data using a light beam, magnetic disks such as flexible disks to read and write data using magnetism, and magneto-optical disks such as MOs and MDs to read and write data using a light beam and magnetism in combination, have already been used extensively around the world. Among other things, DVD-RAMs, MOs and other recordable media are housed in a cartridge such as the one disclosed in Patent Document No. 1 in order to protect the data stored there. As used herein, a "disk cartridge" refers to a cartridge in which such a disklike read-only or rewritable storage medium is housed.

FIG. 24 schematically illustrates the structure of the disk cartridge that is disclosed in Patent Document No. 1. As shown in FIG. 24, the disk cartridge 100 includes a supporting base member 101 that houses a read-only or rewritable disk 10 and that forms the outer shell of the disk cartridge 100.

The supporting base member 101 has a window 101w on the upper and lower surfaces thereof to allow some means for rotating the disk 10 (such as a disk motor) and a read/write means to enter the supporting base member 101 and access the disk 10.

The supporting base member 101 also has inner walls for holding the disk 10 rotatably with the center of the disk 10 positioned and with some clearance left with respect to the disk 10.

The disk cartridge 100 includes a shutter 103 that has been folded in a C-shape to close the window 101w on the upper and lower surfaces of the supporting base member 101 and to protect the data side of the disk 10 to be exposed inside the window 101w.

The shutter 103 can move parallel in the direction indicated by the arrow P in FIG. 24 and is biased by a spring so as to keep the window 101w closed unless some external force is applied thereto. Thus, this disk cartridge 100 is designed so as not to expose the disk 10 unless the external force is applied.

To perform a read/write operation on this disk cartridge 100 using a disk drive (not shown), the shutter 103 of the cartridge is moved in the direction indicated by the arrow P and the disk 10 is exposed in order to clamp the disk 10 and to allow a read/write means to access the disk 10. In this case, as the disk cartridge 100 being inserted into the disk drive goes in the direction indicated by the arrow Q, the notched portion 103a of the shutter 103 gets engaged with the protrusion 104a of a shutter opener 104 and the shutter opener 104 is turned around the center of rotation 104b in the direction indicated by the arrow R, thereby sliding the shutter in the direction indicated by the arrow P.

Patent Document No. 1: Japanese Patent Application Laid-Open Publication No. 9-153264

DISCLOSURE OF INVENTION

Problems to be Solved by the Invention

As in the disk cartridge disclosed in Patent Document No. 1, to get the disk chucked and to allow the optical head to access the entire data side of the disk, the conventional disk cartridge needs to have a window that runs from the center of the cartridge through its end. Also, in a disk cartridge with such a structure, the shutter moves straight with respect to the shell of the cartridge, thus requiring a space to store the shutter opened. That is why the size of the window depends on the overall size of the cartridge, and therefore, it is difficult to design a small cartridge with a big window. As a result, in small portable devices and disk video cameras in which a small cartridge is used, the size of the optical head is limited.

In order to overcome the problems described above, the present invention has an object of providing an optical disk drive that is specially designed for a disk cartridge that can have a big head access window even though its overall size is small.

Means for Solving the Problems

A disk drive according to the present invention can be loaded with a disk cartridge that houses a disk therein. The drive includes: a cartridge holder for holding the disk cartridge, the holder having a holder opening, through which the disk cartridge is inserted from outside of the drive into the cartridge holder and ejected out of the cartridge holder; a pair of guide walls, which is arranged in the vicinity of the holder opening of the cartridge holder to define a direction in which the disk cartridge is supposed to be inserted; a disk motor for rotating the disk that has been mounted thereon; a head for reading and/or writing information from/on the disk; a base for supporting the head and the disk motor thereon; a first opening/closing lever, which has a first engaging portion that engages with a portion of the disk cartridge and which rotates while the disk cartridge is being inserted or ejected; and a second opening/closing lever, which has a second engaging portion that engages with another portion of the disk cartridge and which rotates while the disk cartridge is being inserted or ejected. The first and second opening/closing levers rotate and get engaged with the disk cartridge so as to leave a narrower gap between the first and second engaging portions than between the guide walls when the disk cartridge is being inserted but to leave a broader gap between the first and second engaging portions than between the guide walls when the drive gets loaded with the disk cartridge, thereby opening a window in the disk cartridge so as to allow the head to access the disk and also allow the disk motor to mount the disk.

In one preferred embodiment, the respective axes of rotation of the first and second opening/closing levers are located closer to the holder opening than the center of the disk is when the disk drive is loaded with the disk cartridge.

In this particular preferred embodiment, the respective axes of rotation of the first and second opening/closing levers are arranged near the guide walls on the cartridge holder.

In another preferred embodiment, the disk cartridge includes: first and second disk housing portions, each of which has a space to house the disk partially and which house the disk entirely when joined together; and a supporting base member for supporting the first and second disk housing portions so as to allow the first and second disk housing portions to turn around their respective pivots. The first and second engaging portions of the first and second opening/closing levers interlock with the first and second disk housing portions, respectively, thereby turning the first and the second disk housing portions so as to open a window in the disk cartridge being inserted.

In this particular preferred embodiment, each of the first and second disk housing portions of the disk cartridge includes: a notch, with which an associated one of the first and second engaging portions of the first and second opening/closing levers engages rotatably; and an interlocking portion. The interlocking portions of the first and second disk housing portions engage with each other such that the first and second disk housing portions turn around the pivots in mutually opposite directions and synchronously with each other.

In a specific preferred embodiment, while the disk cartridge is being inserted or ejected, the first engaging portion gets engaged rotatably with the notch of the first disk housing portion, thereby forming a first link mechanism, of which the nodes are defined by the pivot of the first opening/closing lever, the engagement between the first engaging portion and the notch, and the pivot of the first disk housing portion. The second engaging portion also gets engaged rotatably with the notch of the second disk housing portion, thereby forming a second link mechanism, of which the nodes are defined by the pivot of the second opening/closing lever, the engagement between the second engaging portion and the notch, and the pivot of the second disk housing portion. The first and second disk housing portions rotate around their pivots in mutually opposite directions and synchronously with each other, thereby enabling the first and second link mechanisms to keep the inserting direction of the disk cartridge constant.

In a more specific preferred embodiment, the guide walls are arranged only in the vicinity of the holder opening.

In another preferred embodiment, the disk drive further includes a positioning portion to contact with the outer edge of the disk when the disk cartridge is loaded. The positioning portion and the disk contact with each other, thereby positioning the center of the disk with respect to the disk motor.

In this particular preferred embodiment, the positioning portion forms part of the cartridge holder.

In a specific preferred embodiment, the first and second opening/closing levers have guide faces in the vicinity of the first and second engaging portions. The guide faces contact with the bottom of the first and second disk housing portions while the disk cartridge is being inserted or ejected.

Effects of the Invention

While a disk cartridge is being inserted into the disk drive of the present invention, the gap between the first and second engaging portions of first and second opening/closing levers is narrower than the one between a pair of guide walls. For that reason, the first and second engaging portions will soon contact and get engaged with the disk cartridge inserted. On the other hand, once the disk drive is loaded with the disk cartridge, the first and second opening/closing levers rotate such that the gap between the first and second engaging portions is wider than the gap between the guide walls. Therefore, the shutters and housing of the disk cartridge can be opened so as to protrude out of the projection area of the disk cartridge when the disk housing portions are closed. As a result, a big window can be opened. Consequently, the disk drive of the present invention is compatible with a disk cartridge that has relatively small outer dimensions but can still make a big head access window.

Figure 1:
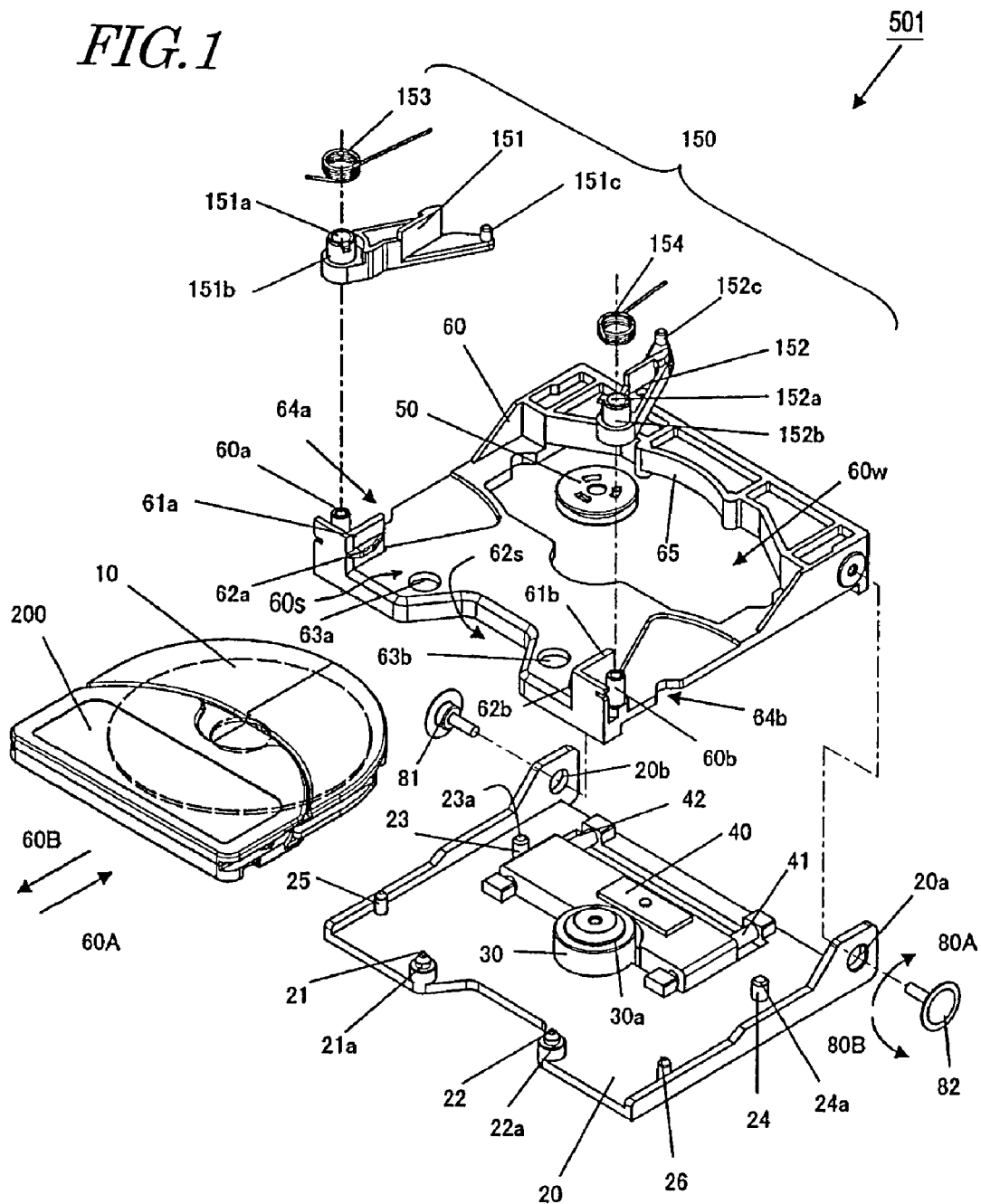
FIG. 1 is an exploded perspective view illustrating the structure of a disk drive as a first preferred embodiment of the present invention.

DESCRIPTION OF REFERENCE NUMERALS 10 disk
20 traverse base
21, 22 cartridge positioning pin
25, 26 lever positioning pin
30 disk motor
40 optical head
50 damper
60 cartridge holder
65 positioning portion
150 cartridge opening/closing mechanism
151 first opening/closing lever
152 second opening/closing lever
153 first lever biasing spring
154 second lever biasing spring
200 disk cartridge
211 upper supporting base member
212 lower supporting base member
220 disk housing
220w window
221 first disk housing portion
222 second disk housing portion
231 first locking member
232 second locking member

BEST MODE FOR CARRYING OUT THE INVENTION

The applicant of the present application proposed a disk cartridge that has a small overall size but can still have a big head access window in PCT International Application PCT/JP2007/059444, which has not been laid open yet. The disk drive of the present invention is compatible with such a disk cartridge. Hereinafter, the structure of that disk cartridge will be described.

Figure 19:
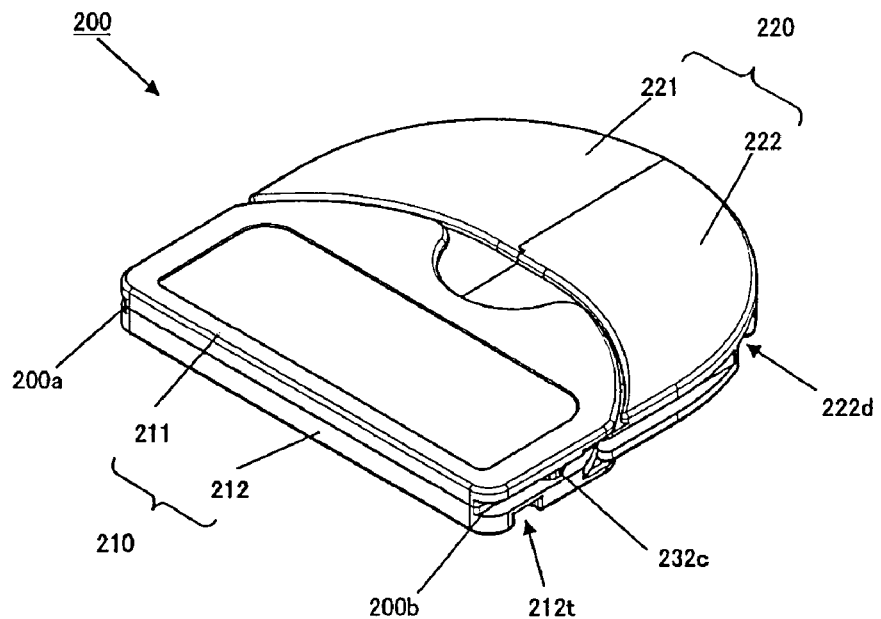
FIGS. 19(a) and 19(b) are perspective views illustrating the general appearance of a disk cartridge that opens and closes a window by turning its disk housing portions in two opposite directions in a situation where its disk housing is closed and in a situation where its disk housing is opened, respectively.
Figure 19:
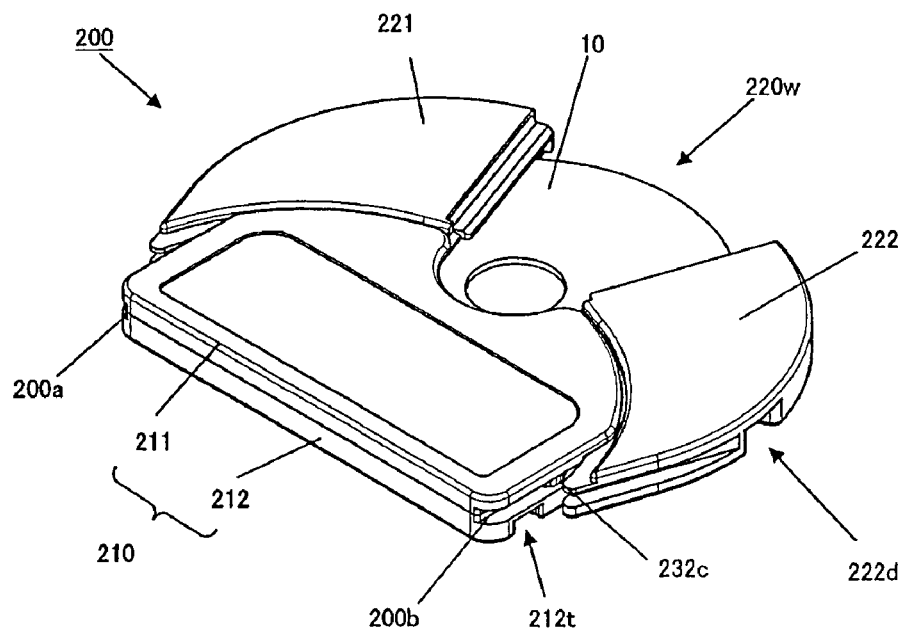
Figure 20:
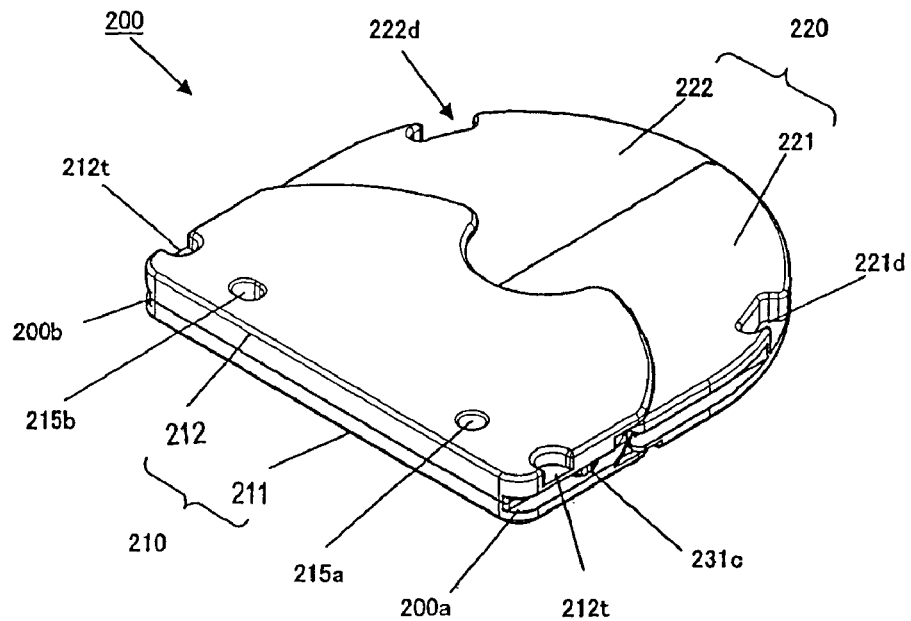
FIGS. 20(a) and 20(b) are perspective views illustrating the general appearance of the bottom of the disk cartridge that opens and closes a window by turning its disk housing portions in two opposite directions in a situation where its disk housing is closed and in a situation where its disk housing is opened, respectively.
Figure 20:
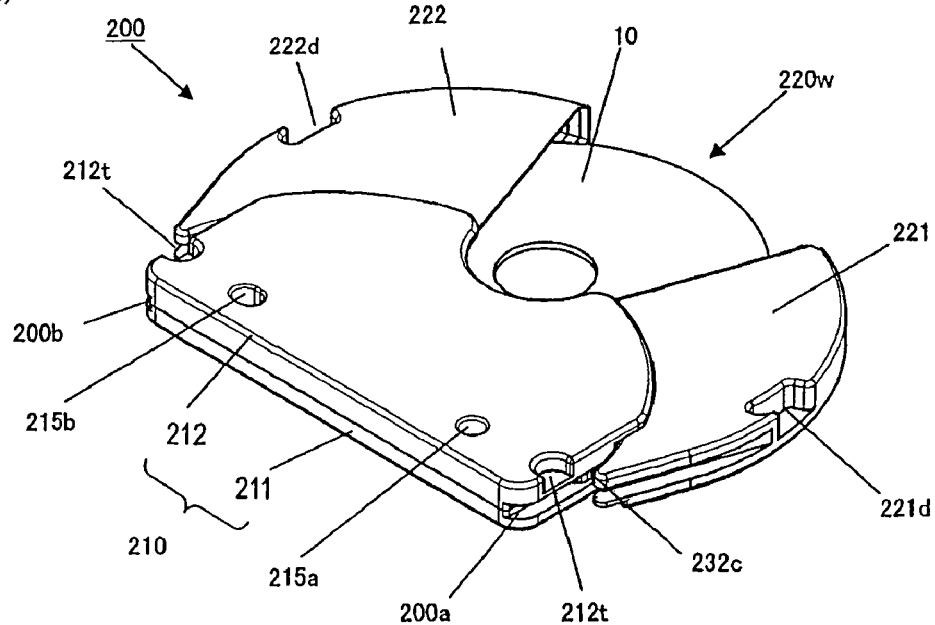
Figure 22:
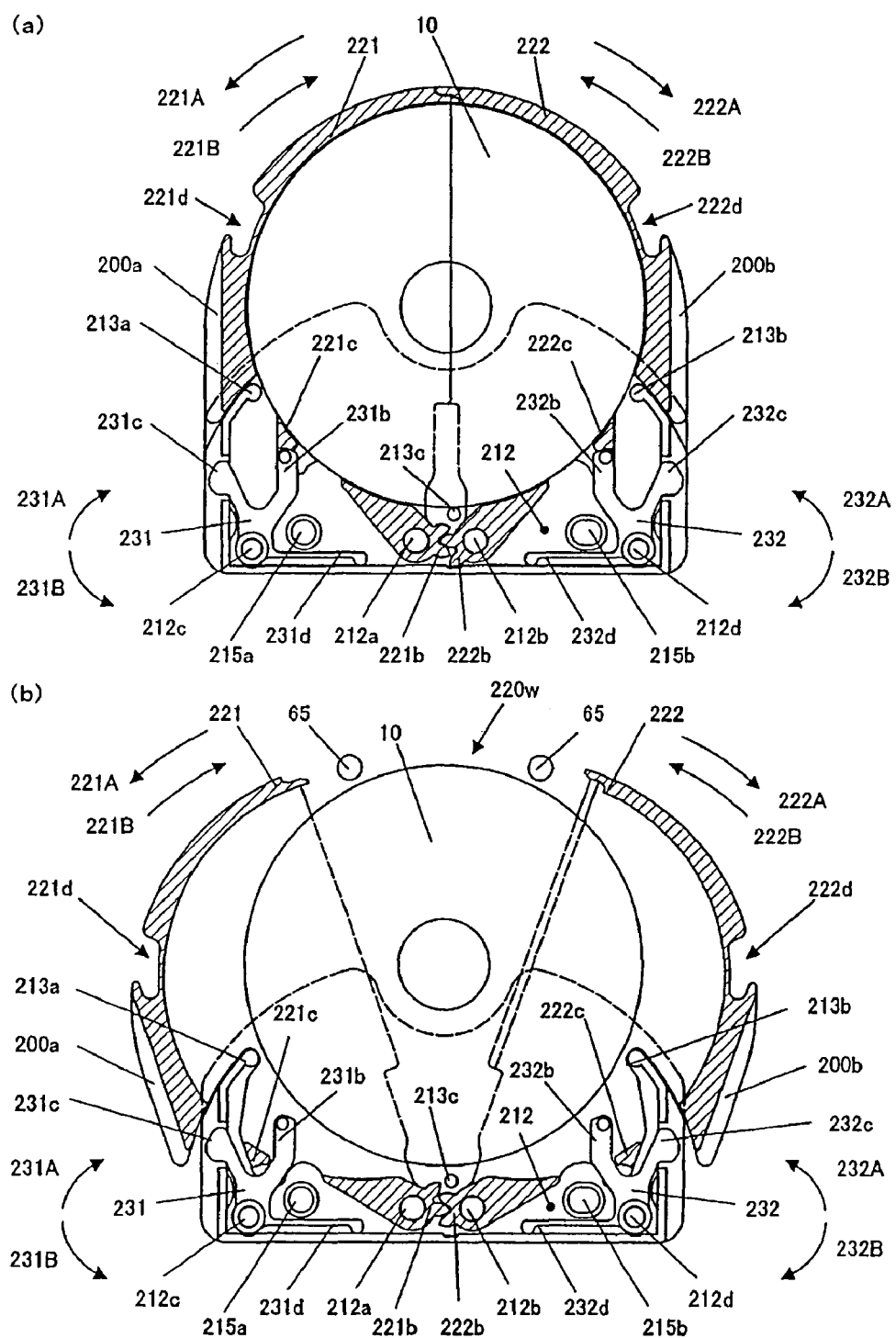
FIGS. 22(a) and 22(b) are partial cross-sectional views of the disk cartridge shown in FIG. 19 in a situation where its disk housing is closed and in a situation where its disk housing is opened, respectively.

FIGS. 19(a) and 19(b) are perspective views illustrating the general appearance of a disk cartridge 200 that can be loaded into the disk drive of the present invention as viewed from above the upper side thereof. Specifically, FIG. 19(a) illustrates how the disk cartridge 200 looks when its window is closed, and FIG. 19(b) illustrates how the disk cartridge 200 looks when the window is opened to partially expose a disk 10 inside the cartridge 200. On the other hand, FIGS. 20(a) and 20(b) are perspective views illustrating the general appearance of the disk cartridge 200 as viewed from above the lower side thereof. Specifically, FIG. 20(a) illustrates how the disk cartridge 200 looks when its window is closed, and FIG. 20(b) illustrates how the disk cartridge 200 looks when the window is opened to partially expose the disk 10 inside the cartridge 200. And FIG. 22 is an exploded perspective view illustrating respective members that form the disk cartridge 200.

The disk cartridge 200 includes a first disk housing portion 221, a second disk housing portion 222 and a supporting base member 210.

The first and second disk housing portions 221 and 222 each have a space to house a portion of the disk 10 and form a disk housing 220 to house the disk 10 in its entirety when joined together. More specifically, each of the first and second disk housing portions 221 and 222 has a flat baglike space to house a portion of the disk 10. And by merging the first and second disk housing portions 221 and 222 together with the edges of their openings fitted into each other, a space to house the entire disk 10 is produced. In the following description, the first and second disk housing portions 221 and 222 will sometimes be referred to herein as a "disk housing 220" collectively.

The supporting base member 210 supports the first and second disk housing portions 221 and 222 thereon such that these housing portions 221 and 222 can turn around their axes of rotation. At least a portion of the supporting base member 210 overlaps with the first and second disk housing portions 221 and 222 to prevent the first and second disk housing portions 221 and 222 to move perpendicularly to the disk 10.

As shown in FIGS. 19(b) and 20(b), when the first and second disk housing portions 221 and 222 are opened, a substantially fan-shaped window 220w is made to allow a disk motor, damper and other members for rotating the disk 10 and a read/write head to approach and access the disk 10 from outside of the disk cartridge 200.

Therefore, the first and second disk housing portions 221 and 222 function not only as a housing, or an outer shell for the disk cartridge 200, but also as shutters for opening and closing the window 220w.

As shown in FIGS. 19(a) and 20(a), as viewed from over the upper or lower side of the disk cartridge 200, the disk cartridge 200 has an arc shape where the window 220w is supposed to be opened. That is why the first and second disk housing portions 221 and 222 also have a curved side surface where the window 220w is supposed to be opened.

Figure 21:
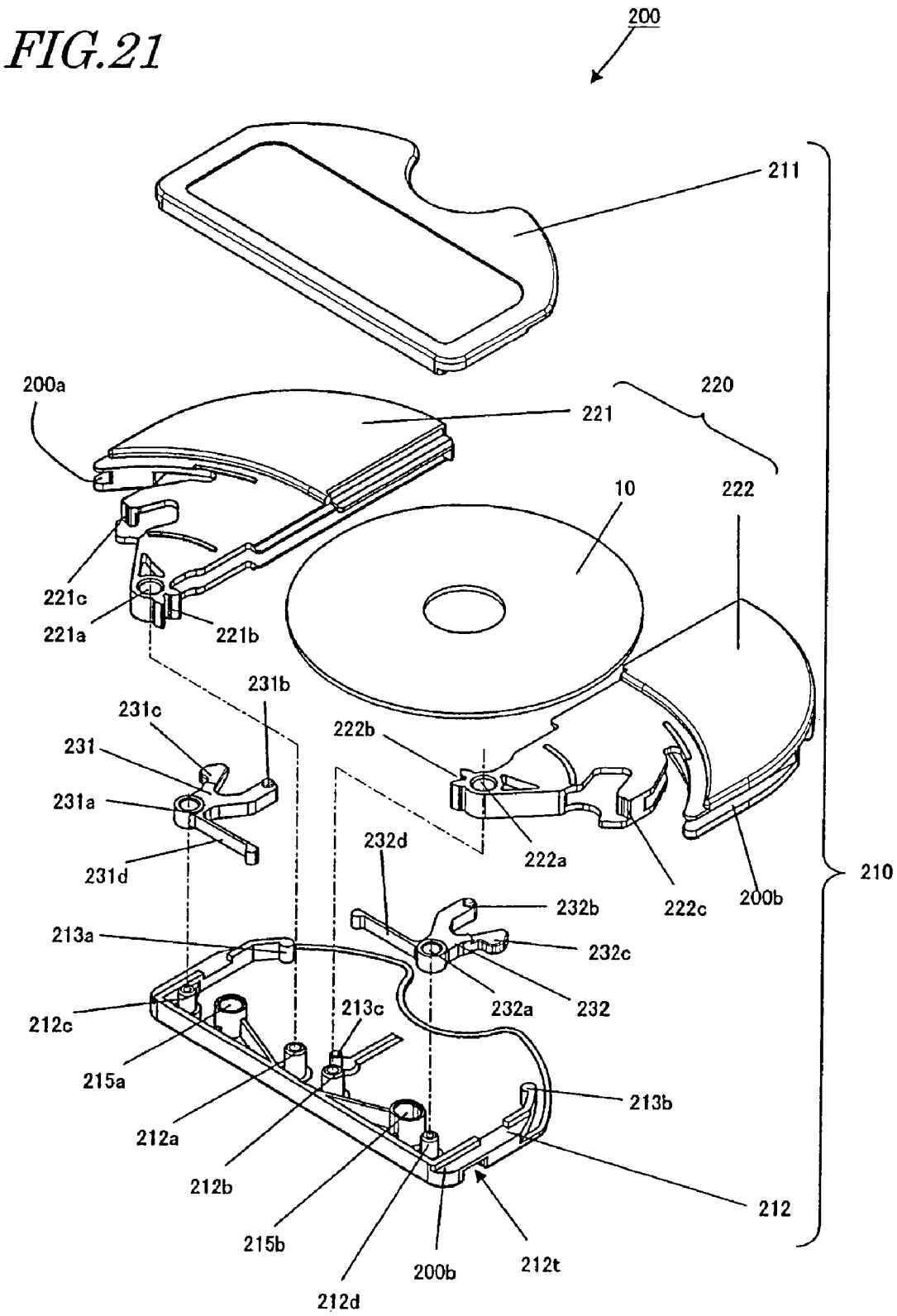
FIG. 21 is an exploded perspective view illustrating the structure of such a disk cartridge that opens and closes a window by turning its disk housing portions in two opposite directions.

The supporting base member 210 includes an upper supporting base portion 211 and a lower supporting base portion 212. As shown in FIG. 21, the lower supporting base portion 212 has positioning holes 215a and 215b to position the disk cartridge 200 on a plane that is parallel to the disk 10 in the disk drive (not shown). Also, the lower supporting base portion 212 has notches 212t on both sides thereof. These notches 212t may be used to prevent the user from loading the disk cartridge 200 upside down in a tray loading system or to engage with the disk cartridge 200 in a slot loading system, for example.

The first and second disk housing portions 221 and 222 have pivot holes 221a and 222a, respectively, into which pivots 212a and 212b on the lower supporting base portion 212 are respectively inserted, thereby supporting the first and second disk housing portions 221 and 222 rotatably such that these housing portions 221 and 222 can turn around the pivots 212a and 212b, respectively.

The first and second disk housing portions 221 and 222 further have interlocking portions 221b and 222b that engage and interlock with each other. By interlocking these interlocking portions 221b and 222b with each other, the first and second disk housing portions 221 and 222 can turn around their respective pivots 212a and 212b in mutually opposite directions and synchronously with each other.

Also, the first and second disk housing portions 221 and 222 have notches 221d and 222d, which can be used to open or close the first and second disk housing portions 221 and 222 externally.

A first locking member 231 and a second locking member 232 have pivot holes 231a and 232a, respectively, into which pivots 212c and 212d on the lower supporting base portion 212 are inserted, so as to be attached rotatably to the lower supporting base portion 212.

The first locking member 231 includes a catching lever portion 231b that catches the latching portion 221c of the first disk housing portion 221, thereby preventing the first disk housing portion 221 from turning in the opening direction while the first and second disk housing portions 221 and 222 are closed, an opener/closer 231c for operating the first locking member 231 externally, and an elastic portion 231d that deforms elastically under externally applied force.

Likewise, the second locking member 232 also includes a catching lever portion 232b that catches the latching portion 222c of the second disk housing portion 222, thereby preventing the second disk housing portion 222 from turning in the opening direction while the disk housing 220 is closed, an opener/closer 232c for operating the second locking member 232 externally, and an elastic portion 232d that deforms elastically under externally applied force.

Furthermore, the disk cartridge 200 has unlocking slits 200a and 200b for operating the first and second locking members 231 and 232 on the right- and left-hand sides thereof. The openers/closers 231c and 232c of the first and second locking members 231 and 232 are designed so as to protrude into the slits 200a and 200b, respectively, but not to stick out of the outer shell of the disk cartridge 200. Thus the person who handles the disk cartridge 200 cannot easily press the openers/closers 231c and 232c with his or her fingers. In this manner, it is possible to prevent the user from operating the locking members 231 and 232 intentionally and carelessly.

Hereinafter, it will be described exactly how to open or close the disk housing 220 of the disk cartridge 200. FIGS. 22(a) and 22(b) are partial cross-sectional views of the disk cartridge 200 in a situation where the first and second disk housing portions 221 and 222 are closed and a situation where the first and second disk housing portions 221 and 222 are opened, respectively.

As shown in FIG. 22(a), while the first and second disk housing portions 221 and 222 are closed, the catching lever portions 231b and 232b of the first and second locking members 231 and 232 catch the latching portions 221c and 222c of the first and second disk housing portions 221 and 222, thereby stopping the first and second disk housing portions 221 and 222 from turning in the directions indicated by the arrows 221A and 222A, respectively. In this case, the elastic portions 231d and 232d are not deformed elastically. Also, to prevent the disk 10 from rattling inside the disk cartridge 200, the inner walls of the first and second disk housing portions 221 and 222 have portions that contact with the periphery or the outer edge of the disk 10 to hold the disk 10 firmly when the disk housing 220 is closed.

If the first and second locking members 231 and 232 are pressed down and unlocked at the same time in the state shown in FIG. 22(a) to let the first and second disk housing portions 221 and 222 turn in the directions indicated by the arrows 221A and 222A, respectively, the first and second disk housing portions 221 and 222 are opened as shown in FIG. 22(b). In this state, the inner walls of the first and second disk housing portions 221 and 222 are out of contact with the disk 10 and therefore the disk 10 can now take any position with respect to the supporting base member 210 as far as the disk 10 keeps out of contact with the inner walls. That is why the position of the disk 10 is regulated with position regulating portions 213a, 213b and 213c on the lower supporting base portion 212 and positioning portions 65 provided for the disk drive.

To close the first and second disk housing portions 221 and 222, the first and second disk housing portions 221 and 222 are turned in opposite directions (i.e., in the directions indicated by the arrows 221B and 222B, respectively) compared to the opening operation. In the meantime, the first and second locking members 231 and 232 contact with the latching portions 221c and 222c of the first and second disk housing portions 221 and 222 to rotate in the directions 231A and 232A, respectively. And when the disk housing 220 is fully closed as shown in FIG. 22(a), the first and second locking members 231 and 232 rotate in the directions indicated by the arrows 231B and 232B, respectively, under the elastic force applied by their elastic portions 231d and 232d. As a result, the catching lever portions 231b and 232b of the first and second locking members 231 and 232 catch the latching portions 221c and 222c of the first and second disk housing portions 221 and 222, respectively, thereby stopping the disk housing 220 from turning. In this manner, the operation of closing the first and second disk housing portions 221 and 222 can get done.

In the disk cartridge 200, the overall projection area of the disk 10, the first and second disk housing portions 221, 222 and the supporting base member 210 that is defined perpendicularly to the axis of rotation of the disk 10 is greater when the first and second disk housing portions 221 and 222 are opened as shown in FIG. 22(b) than when the first and second disk housing portions 221 and 222 are closed as shown in FIG. 22(a). However, since the window 220w can have an increased opening area, the head can be designed much more flexibly.

Figure 23:
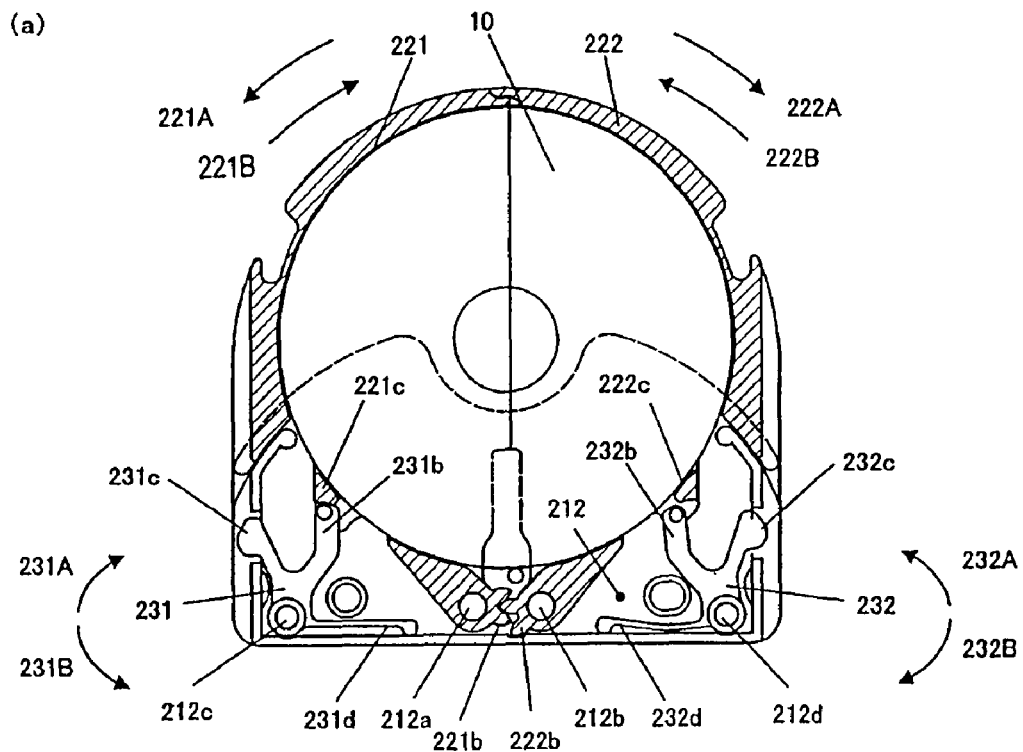
FIGS. 23(a) and 23(b) are partial cross-sectional views of the disk cartridge shown in FIG. 19 in a situation where only the second locking member has been unlocked and in a situation where both the first and second locking members have been unlocked.
Figure 23:
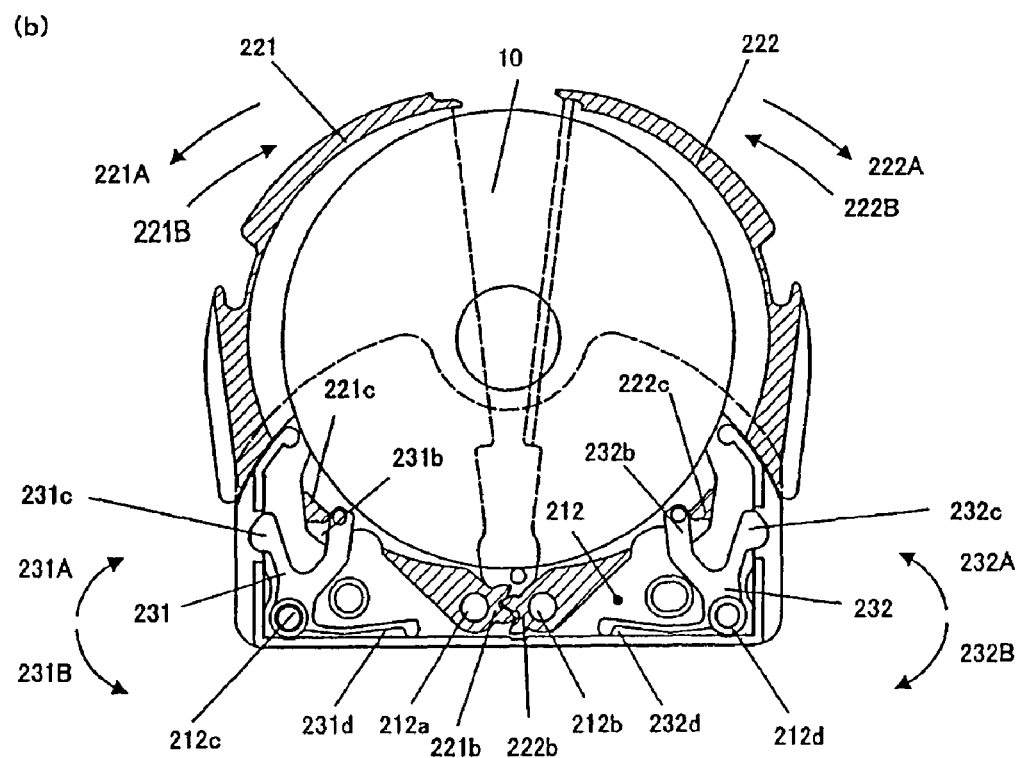

Next, an unlocking operation will be described. FIG. 23(a) illustrates a situation where only the second locking member 232 has been unlocked while the first and second disk housing portions 221 and 222 are locked with the first and second locking members 231 and 232. On the other hand, FIG. 23(b) illustrates a situation where both the first and second locking members 231 and 232 have been unlocked while the first and second disk housing portions 221 and 222 are locked with the first and second locking members 231 and 232. While closed, the first and second disk housing portions 221 and 222 are prevented from turning in the directions indicated by the arrows 221A and 222A, respectively, by the first and second locking members 231 and 232 as shown in FIG. 22(a).

As shown in FIG. 23(a), if the opener/closer 232c of the second locking member 232 is pressed down externally, the second locking member 232 rotates in the direction indicated by the arrow 232A with its elastic portion 232d deformed. In this state, the catching lever portion 232b of the second locking member 232 disengages itself from the latching portion 222c of the second disk housing portion 222. However, the first and second disk housing portions 221 and 222 are still engaged with each other by their interlocking portions 221b and 222b and the first disk housing portion 221 is still locked by the first locking member 231. For that reason, the first disk housing portion 221 locked prevents the second disk housing portion 222 from rotating and never allows the user from opening the first and second disk housing portions 221 and 222. That is to say, even if one of the first and second locking members 231 and 232 were intentionally unlocked externally, the first and second disk housing portions 221 and 222 still could not be opened.

However, if the openers/closers 231c and 232c of the first and second locking members 231 and 232 are externally pressed down at the same time, the first and second locking members 231 and 232 rotate in the directions indicated by the arrows 231A and 232A, respectively, with their elastic portions 231d and 232d deformed as shown in FIG. 23(b). In this state, the catching lever portions 231b and 232b of the first and second locking members 231 and 232 disengage themselves from the latching portions 221c and 222c of the first and second disk housing portions 221 and 222. As a result, the first and second disk housing portions 221 and 222 can now rotate in the directions indicated by the arrows 221A and 222A and can be opened eventually. As can be seen, only when the first and second locking members 231 and 232 are unlocked at the same time, the first and second disk housing portions 221 and 222 can be opened.

The disk drive of the present invention can be loaded with the disk cartridge 200 described above to read and write information from/on the disk 10 that is housed in the disk cartridge 200. As used herein, the "loaded" state refers to a state in which a read/write operation is ready to be performed on the disk that has already been mounted on the disk motor after the disk cartridge has been inserted into the disk drive. Hereinafter, preferred embodiments of a disk drive according to the present invention will be described with reference to the accompanying drawings.

Embodiment 1

A first preferred embodiment of a disk drive according to the present invention will be described in detail with reference to the accompanying drawings.

Figure 2:
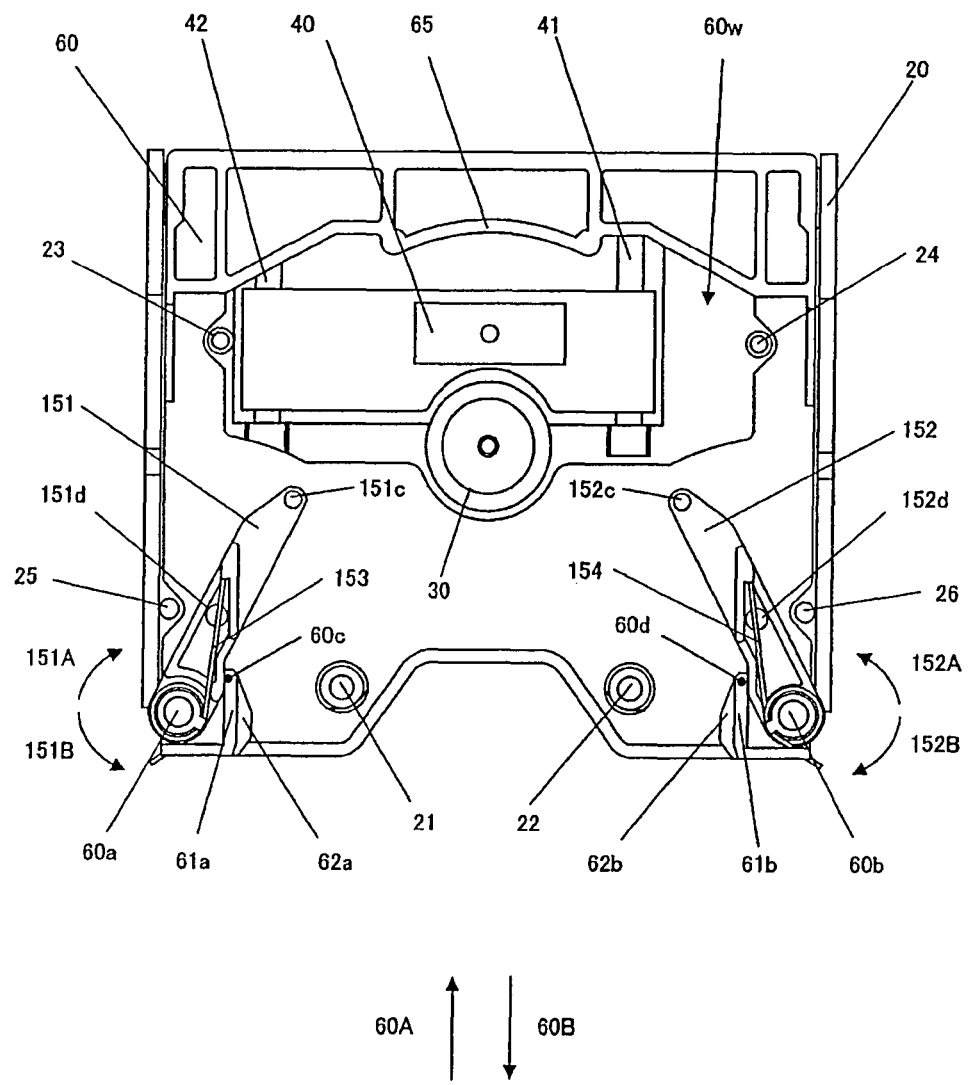
FIG. 2 is a plan view illustrating the structure of the first preferred embodiment.
Figure 3:
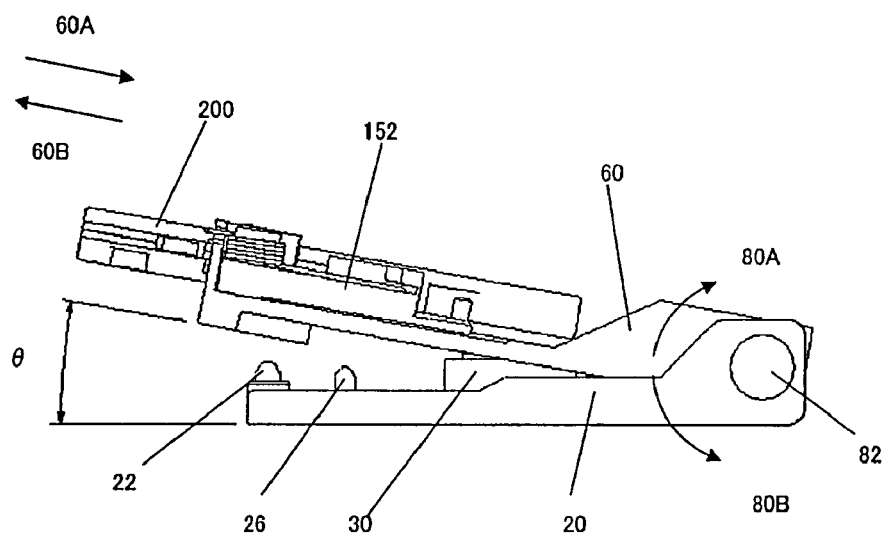
FIGS. 3(a) and 3(b) are side views illustrating the structure of the first preferred embodiment and showing the respective positions of its cartridge holder when a disk cartridge is inserted or ejected and when a read/write operation is performed on a disk housed there, respectively.
Figure 3:
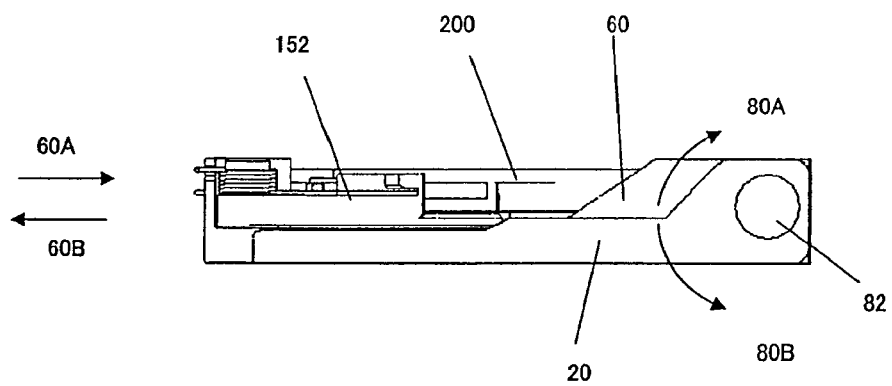

FIGS. 1 and 2 are respectively an exploded perspective view and a plan view illustrating a disk drive 501 as a first preferred embodiment of the present invention, which can be loaded with the disk cartridge 200. On the other hand, FIGS. 3(a) and 3(b) are side views of the disk drive 501 in a situation where the disk cartridge 200 is being inserted or ejected and in a situation where a read/write operation is performed on the disk 10, respectively.

As shown in FIGS. 1 and 2, the disk drive 501 includes a traverse base 20, a disk motor 30, an optical head 40 and a cartridge holder 60.

The disk motor 30 has a disk mount 30a to mount the disk 10 and is supported on the traverse base 20. The optical head 40 is supported on the traverse base 20 so as to move on guide pivots 41 and 42. Also, the optical head 40 is driven by a drive source (not shown), which is arranged on the traverse base 20, along the guide pivots 41 and 42 so as to move freely in the radial direction of the disk 10 that is mounted on the disk mount 30a of the disk motor 30.

The optical head 40 reads and writes information from/on the disk 10. The disk drive 501 may be either a device that can perform both read and write operations or a read-only or write-only device.

On the traverse base 20, arranged are cartridge positioning pins 21 and 22, which respectively have bearing surfaces 21a and 22a that will contact with the bottom of the lower supporting base portion 212. The cartridge positioning pins 21 and 22 are used to position the disk cartridge 200 with respect to the disk motor 30. Also arranged on the traverse base 20 are a fixing pin 23 with a bearing surface 23a that will contact with the bottom of the first disk housing portion 221 and another fixing pin 24 with a bearing surface 24a that will contact with the bottom of the second disk housing portion 222. These bearing surfaces 23a and 24a, as well as the bearing surfaces 21a and 22a of the cartridge positioning pins 21 and 22, determine the vertical level of the disk cartridge 200.

The traverse base 20 also has lever positioning pins 25 and 26 that fit into the positioning holes 151d and 152d of first and second opening/closing levers 151 and 152 (to be described later), thereby positioning the first and second opening/closing levers 151 and 152 with respect to the disk motor 30.

The disk drive 501 further includes a damper 50 and a cartridge holder 60 to be loaded with the disk cartridge 200.

The damper 50 sandwiches the disk 10 between itself and the disk mount 30a of the disk motor 30, thereby clamping the disk 10 such that the disk 10 can be rotated by the disk motor 30. The damper 50 is held by a damper supporting member (not shown) and is supported on the cartridge holder 60.

The cartridge holder 60 holds the disk cartridge 200. The cartridge holder 60 has a holder opening 60s, through which the disk cartridge 200 can be externally inserted into the cartridge holder 60 in the direction indicated by the arrow 60A or through which the disk cartridge 200 held in the cartridge holder 60 is ejected out of the holder 60 in the direction indicated by the arrow 60B. The holder opening 60s is an opening provided for the cartridge holder 60. Other than that, the disk drive 501 may also have another opening in its housing that covers the disk drive 501 entirely in order to insert and eject the disk cartridge through that opening.

In the vicinity of the holder opening 60s of the cartridge holder 60, arranged are two guide walls 61a and 61b. The guide walls 61a and 61b define the inserting and ejecting directions of the disk cartridge 200. That is to say, the guide walls 61a and 61b contact with the side surfaces of the disk cartridge 200 being inserted into the cartridge holder 60 or ejected out of the cartridge holder 60, thereby guiding the disk cartridge 200 such that the disk cartridge 200 is inserted in the direction indicated by the arrow 60A or ejected in the direction indicated by the arrow 60B. The guide walls 61a and 61b are arranged only in the vicinity of the holder opening 60s.

The guide walls 61a and 61b include unlocking portions 62a and 62b that will go inside the unlocking slits 200a and 200b of the disk cartridge 200 being inserted in the direction indicated by the arrow 60A or ejected in the direction indicated by the arrow 60B, thereby pressing down the openers/closers 231c and 232c of the first and second locking members 231 and 232 of the disk cartridge 200.

The bottom of the cartridge holder 60 has a window 60w to allow the disk motor 30 and the optical head 40 to access the disk 10. Also, to prevent the cartridge positioning pins 21 and 22 and the lever positioning pins 25 and 26 from interfering with the cartridge holder 60, the bottom of the cartridge holder 60 has holes 63a and 63b and notches 64a and 64b. The cartridge holder 60 further has a positioning portion 65 for positioning the disk 10 with respect to the center of the disk motor 30 when the cartridge holder 60 is loaded with the disk cartridge 200.

On the holder opening 60s of the cartridge holder 60, a notch 62s may be provided in order to partially expose one side surface of the disk cartridge 200 and thereby make it easier to remove the disk cartridge 200 from the cartridge holder 60.

Furthermore, pivot screws 81 and 82 that are inserted into the pivot holes 20a and 20b of the traverse base 20 are attached to the cartridge holder 60. As a result, the cartridge holder 60 is supported by the traverse base 20 so as to be freely rotatable in the directions indicated by the arrows 80A and 80B.

When the disk cartridge 200 is inserted into the cartridge holder 60 in the direction indicated by the arrow 60A or ejected out of the cartridge holder 60 in the direction indicated by the arrow 60B, the cartridge holder 60 is rotated θ degrees in the direction indicated by the arrow 80A with respect to the traverse base 20 as shown in FIG. 3(a). In this manner, the disk cartridge 200 can be inserted or ejected without interfering with the disk motor 30, optical head 40 or various positioning pins on the traverse base 20.

Also, by rotating the cartridge holder 60 with respect to the traverse base 20 in the direction indicated by the arrow 80B in a situation where the disk cartridge 200 has been inserted into the cartridge holder 60 and where the window 220w of the disk cartridge 200 has been opened, the disk motor 30 and the optical head 40 on the traverse base 20 enter the disk cartridge 200 through the window 220w and the various positioning pins fit into their positioning holes to position the disk cartridge 200 in place as shown in FIG. 3(b). As a result, the disk drive 501 is now loaded with the disk cartridge 200 so that a read/write operation is ready to be started on the disk 10.

As shown in FIG. 1, the disk drive 501 further includes a cartridge opening/closing mechanism 150, which interlocks with portions of the disk cartridge 200. As the disk cartridge 200 is going to be inserted or ejected, the cartridge opening/closing mechanism 150 opens or closes the first and second disk housing portions 221 and 222. Specifically, the cartridge opening/closing mechanism 150 includes first and second opening/closing levers 151 and 152 and first and second lever biasing springs 153 and 154.

The first and second opening/closing levers 151 and 152 have pivot holes 151a and 152a, respectively, and are arranged on the cartridge holder 60 so as to turn around pivots 60a and 60b on the cartridge holder 60 when the pivots 60a and 60b are inserted into the pivot holes 151a and 152a, respectively. The pivots 60a and 60b are arranged in the vicinity of the guide walls 61a and 61b, respectively.

The first and second lever biasing springs 153 and 154 are attached to the pivots 151b and 152b of the first and second opening/closing levers 151 and 152, respectively, thereby applying biasing force to the first opening/closing lever 151 in the direction indicated by the arrow 151A and to the second opening/closing lever 152 in the direction indicated by the arrow 152A, respectively.

Also, the first opening/closing lever 151 has a first engaging portion 151c that engages with the notch 221d of the first disk housing portion 221 and a positioning hole 151d to receive the lever positioning pin 25 of the traverse base 20. When the first opening/closing lever 151 turns in the direction indicated by the arrow 151A, the positioning hole 151d positions the first opening/closing lever 151 with respect to the disk motor 30.

Likewise, the second opening/closing lever 152 has an engaging portion 152c that engages with the notch 222d of the second disk housing portion 222 and a positioning hole 152d to receive the lever positioning pin 26 of the traverse base 20. When the second opening/closing lever 152 turns in the direction indicated by the arrow 152A, the positioning hole 152d positions the second opening/closing lever 152 with respect to the disk motor 30.

The pivots 60a and 60b are arranged closer to the front end of the disk drive 501 (i.e., closer to the holder opening 60s of the cartridge holder 60 than to the center of the disk 10 when the disk drive is loaded with the disk cartridge 200) than the engaging portions 151c and 152c of the first and second opening/closing levers 151 and 152 are as shown in FIG. 2. Also, the pivots 60a and 60b are arranged in the direction in which the guide walls 61a and 61b are arranged. Furthermore, the pivots 60a and 60b are arranged symmetrically with respect to a plane that is defined parallel to the inserting and ejecting directions of the disk cartridge 200, that passes the center of the disk 10 when the disk drive is loaded with the disk cartridge 200, and that intersects with the disk 10 at right angles.

Likewise, the first and second engaging portions 151c and 152c of the first and second opening/closing levers 151 and 152 are arranged symmetrically with respect to a plane that is defined parallel to the inserting and ejecting directions of the disk cartridge 200, that passes the center of the disk 10 when the disk drive is loaded with the disk cartridge 200, and that intersects with the disk 10 at right angles. That is why the first and second opening/closing levers 151 and 152 are also arranged symmetrically with respect to a plane that is defined parallel to the inserting and ejecting directions of the disk cartridge 200, that passes the center of the disk 10 when the disk drive is loaded with the disk cartridge 200, and that intersects with the disk 10 at right angles.

As shown in FIG. 2, the cartridge holder 60 has stopper portions 60c and 60d to stop the rotation of the first and second opening/closing levers 151 and 152 that has been set off by the first and second lever biasing springs 153 and 154. The first and second opening/closing levers 151 and 152 are held at predetermined standby positions by these stopper portions 60c and 60d.

While in contact with the stopper portions 60c and 60d of the cartridge holder 60, the first and second opening/closing levers 151 and 152 do not interfere with the lever positioning pins 25 and 26 of the traverse base 20 as shown in FIG. 2. That is why there should be no problem even if the cartridge holder 60 were turned as shown in FIG. 3(b) while the cartridge holder 60 is not loaded with the disk cartridge 200.

Hereinafter, it will be described how the cartridge opening/closing mechanism 150 with such a configuration works. As described above, as the disk cartridge 200 is inserted deeper into the cartridge holder 60 in the direction indicated by the arrow 60A, the cartridge opening/closing mechanism 150 opens the first and second disk housing portions 221 and 222. On the other hand, as the disk cartridge 200 is ejected in the direction indicated by the arrow 60B, the cartridge opening/closing mechanism 150 closes the first and second disk housing portions 221 and 222. It should be noted that the disk drive 501 of this preferred embodiment has no drive mechanism for inserting and ejecting the disk cartridge 200 automatically. That is to say, the disk cartridge 200 is manually inserted in the direction indicated by the arrow 60A by the operator. On the other hand, the disk cartridge 200 is ejected in the direction indicated by the arrow 60B by using the biasing force applied by the first and second lever biasing springs 153 and 154 and then removed manually by the operator.

First, it will be described with reference to FIGS. 4 through 8 how the cartridge opening/closing mechanism 150 opens the disk housing of the disk cartridge 200 being inserted into the cartridge holder 60.

While the disk cartridge 200 is being inserted or ejected into/out of the cartridge holder 60, the cartridge holder 60 is tilted with respect to the traverse base 20 as shown in FIG. 3(a). However, the traverse base 20 has nothing to do with the operation of inserting or ejecting the disk cartridge 200 but only the cartridge holder 60 has something to do with it. For that reason, the cartridge holder 60 and the traverse base 20 are illustrated on the same plane in FIGS. 4 through 7 for the sake of convenience. And FIG. 8 illustrates a situation where the cartridge holder 60 has been loaded with the disk cartridge 200. In this state, the cartridge holder 60 has been lowered and is now on a level with the traverse base 20 as shown in FIG.

3(b) such that the disk 10 in the disk cartridge 200 is mounted on the disk mount 30a of the disk motor 30.

Figure 4:
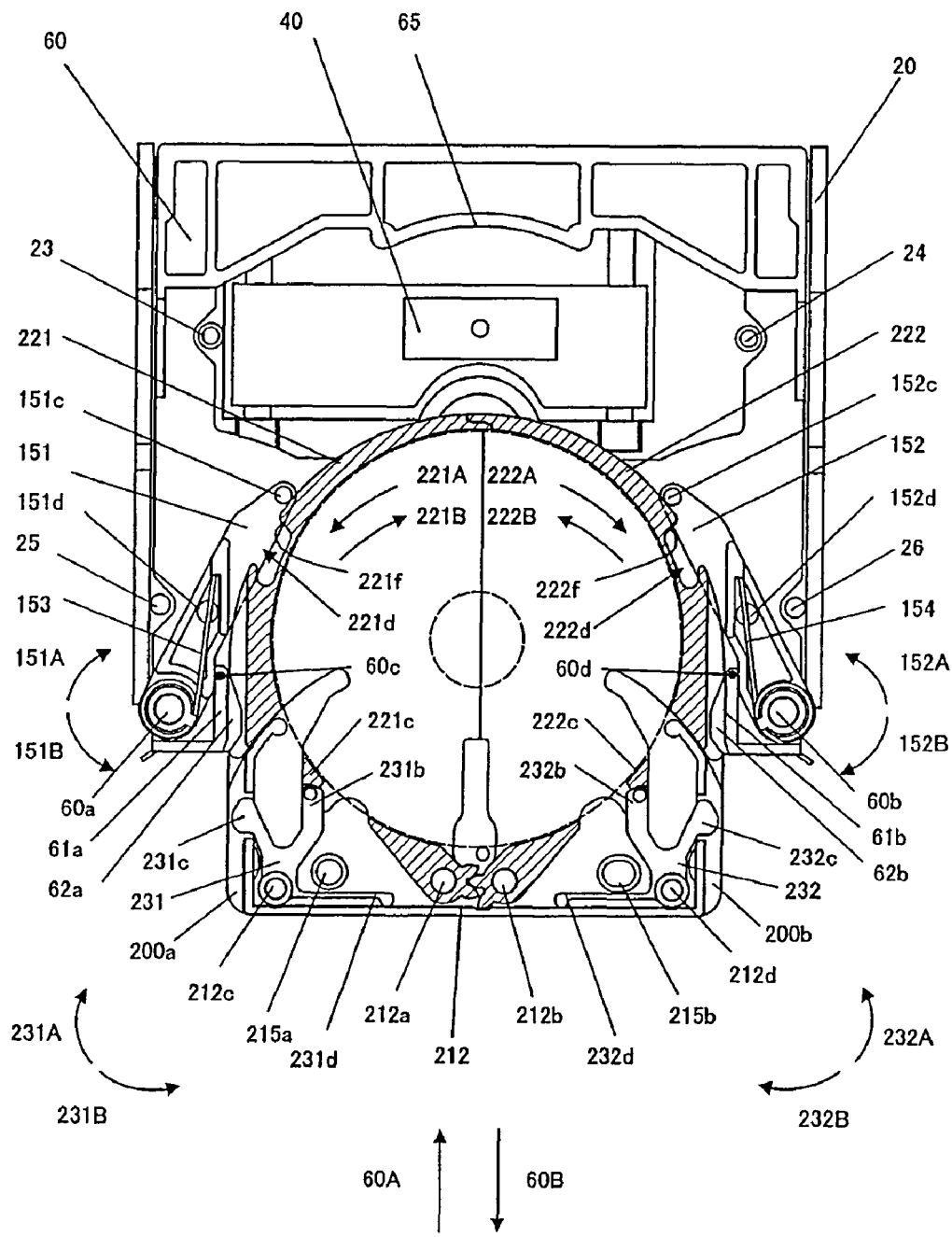
FIG. 4 is a plan view illustrating one state of the cartridge opening/closing mechanism of the first preferred embodiment either during an opening operation or during a closing operation.

First, as shown in FIG. 4, the operator manually inserts the disk cartridge 200 through the holder opening 60s into the cartridge holder 60 in the direction indicated by the arrow 60A. In this case, the disk cartridge 200 is inserted into the cartridge holder 60 while being guided by the guide walls 61a and 61b of the cartridge holder 60 in its width direction, i.e., in the direction that intersects with the inserting direction 60A at right angles.

The first and second opening/closing levers 151 and 152 contact with the stopper portions 60c and 60d of the cartridge holder 60, and are held at predetermined standby positions. At this point in time, the gap between the first and second engaging portions 151c and 152c of the first and second opening/closing levers 151 and 152 is narrower than the one between the guide walls 61a and 61b. For that reason, as the disk cartridge 200 is inserted deeper, the first and second engaging portions 151c and 152c will soon contact with the outer side surface of the first and second disk housing portions 221 and 222 of the disk cartridge 200.

In the meantime, the unlocking portions 62a and 62b of the guide walls 61a and 61b respectively go through the unlocking slits 200a and 200b of the disk cartridge 200.

Figure 5:
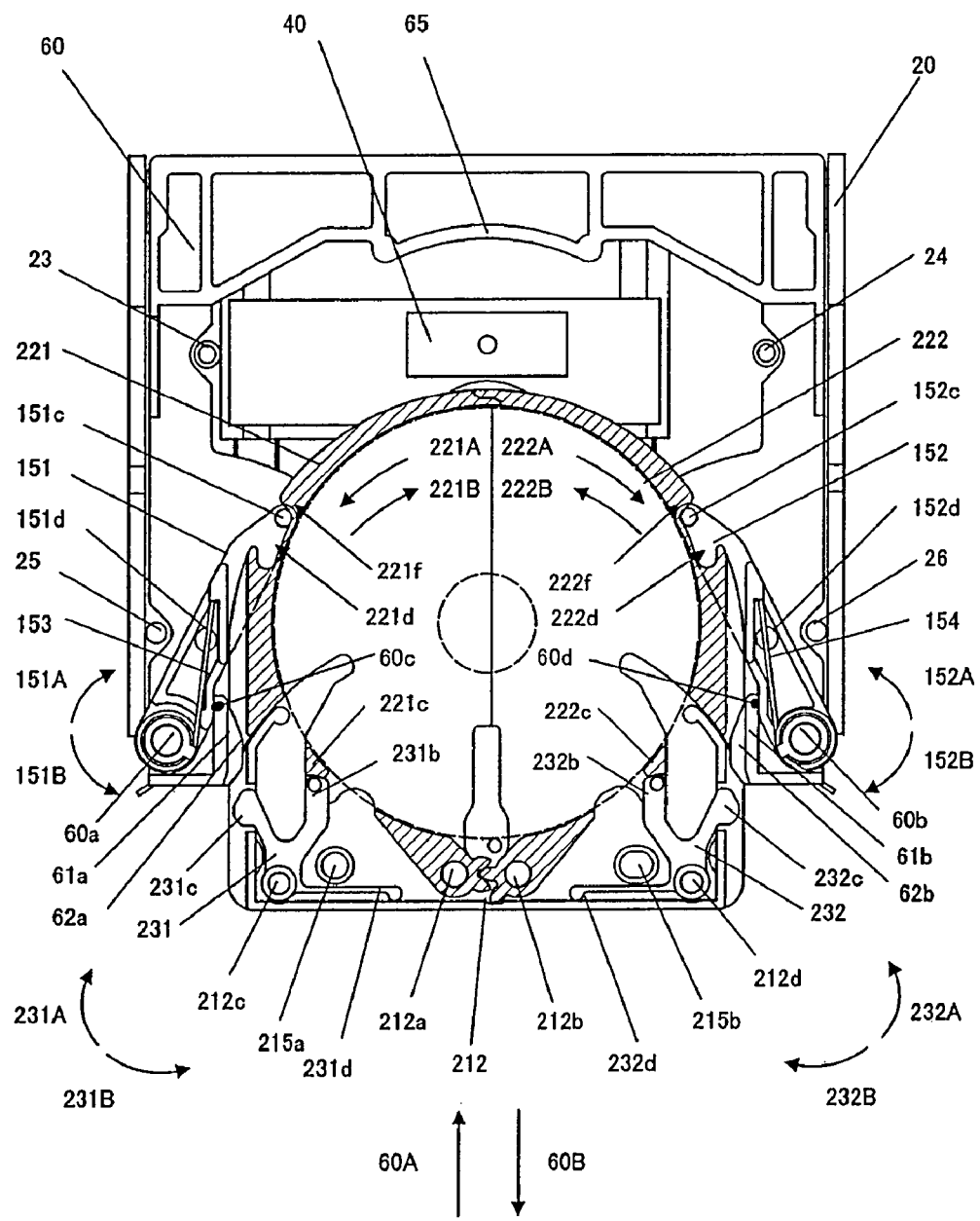
FIG. 5 is a plan view illustrating another state of the cartridge opening/closing mechanism of the first preferred embodiment either during the opening operation or during the closing operation.

As the disk cartridge 200 is inserted even deeper than the position shown in FIG. 4 in the direction indicated by the arrow 60A, the first engaging portion 151c of the first opening/closing lever 151 soon contacts with the outer side surface of the first disk housing portion 221 to overcome the biasing force applied by the lever biasing spring 153 and turn around the pivot 60a in the direction indicated by the arrow 151B as shown in FIG. 5. After that, the first opening/closing lever 151 rotates again in the direction indicated by the arrow 151A under the biasing force applied by the lever biasing spring 153 and the first engaging portion 151c moves to a position to contact with the catching contact face 221f of the notch 221d of the first disk housing portion 221.

In the same way, the engaging portion 152c of the second opening/closing lever 152 soon contacts with the outer side surface of the second disk housing portion 222 to overcome the biasing force applied by the lever biasing spring 154 and turn around the pivot 60b in the direction indicated by the arrow 152B. After that, the second opening/closing lever 152 rotates again in the direction indicated by the arrow 152A under the biasing force applied by the lever biasing spring 154 and the second engaging portion 152c moves to a position to contact with the catching contact face 222f of the notch 222d of the second disk housing portion 222.

Figure 6:
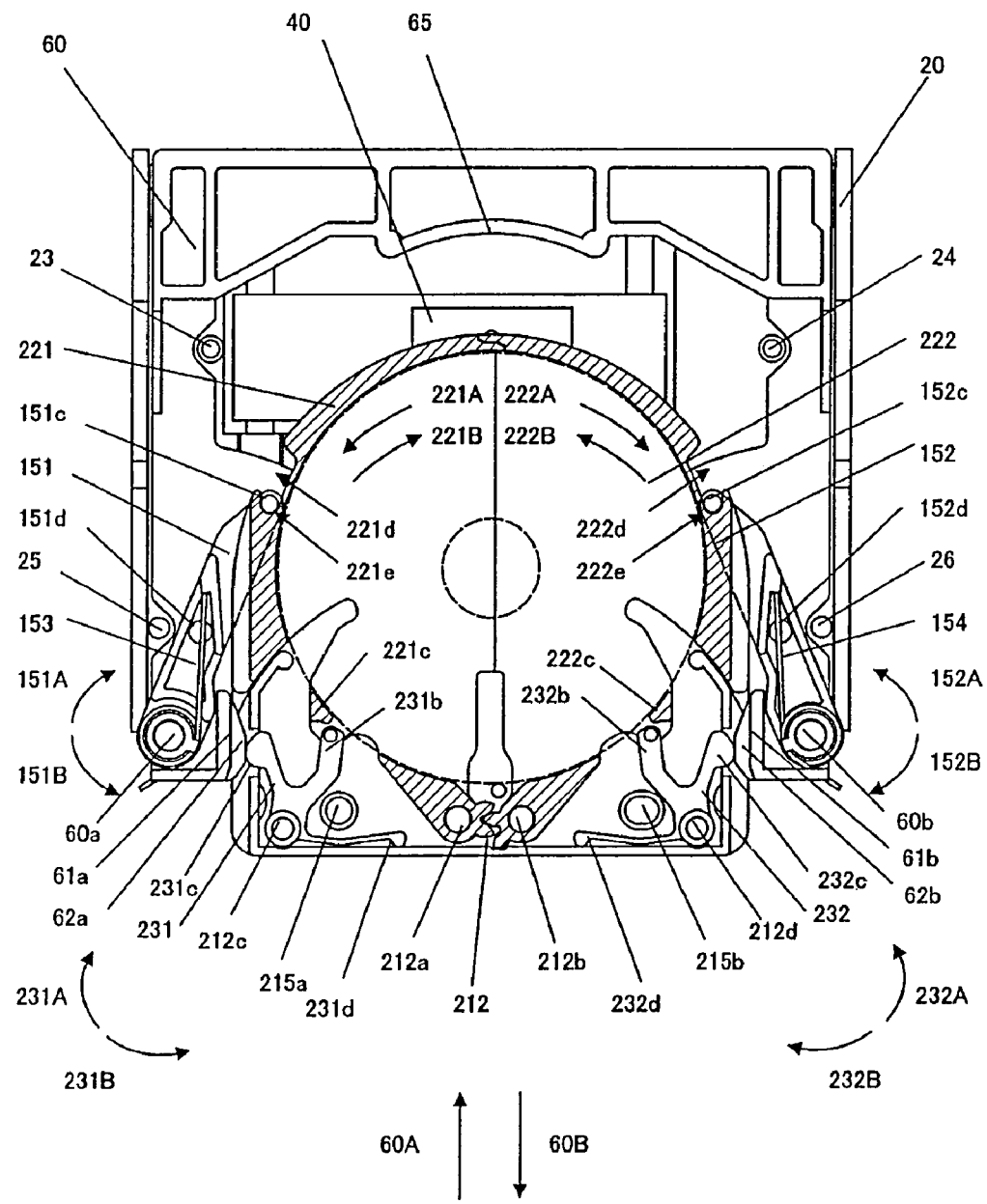
FIG. 6 is a plan view illustrating another state of the cartridge opening/closing mechanism of the first preferred embodiment either during the opening operation or during the closing operation.

As the disk cartridge 200 is inserted even deeper than the position shown in FIG. 5 in the direction indicated by the arrow 60A, the first engaging portion 151c of the first opening/closing lever 151 further goes on the inner wall of the notch 221d of the first disk housing portion 221 under the biasing force applied by the lever biasing spring 153 to reach the semicircular catching portion 221e of the notch 221d and get latched there as shown in FIG. 6. As a result, the first opening/closing lever 151 and the first disk housing portion 221 form a first link mechanism.

In the same way, the engaging portion 152c of the second opening/closing lever 152 further goes on the inner wall of the notch 222d of the second disk housing portion 222 under the biasing force applied by the lever biasing spring 154 to reach the semicircular catching portion 222e of the notch 222d and get latched there. As a result, the second opening/closing lever 152 and the second disk housing portion 222 form a second link mechanism.

In the meantime, the unlocking portions 62a and 62b press the openers/closers 231c and 232c of the first and second locking members 231 and 232 at the same time, thereby turning the first and second locking members 231 and 232 in the directions indicated by the arrows 231A and 232A, respectively, while deforming their elastic portions 231d and 232d simultaneously. As a result, the catching lever portions 231b and 232b of the first and second locking members 231 and 232 disengage themselves from the latching portions 221c and 222c of the first and second disk housing portions 221 and 222, thereby unlocking the first and second disk housing portions 221 and 222. Consequently, the first and second disk housing portions 221 and 222 are now ready to rotate in the directions indicated by the arrows 221A and 222A, respectively.

Figure 7:
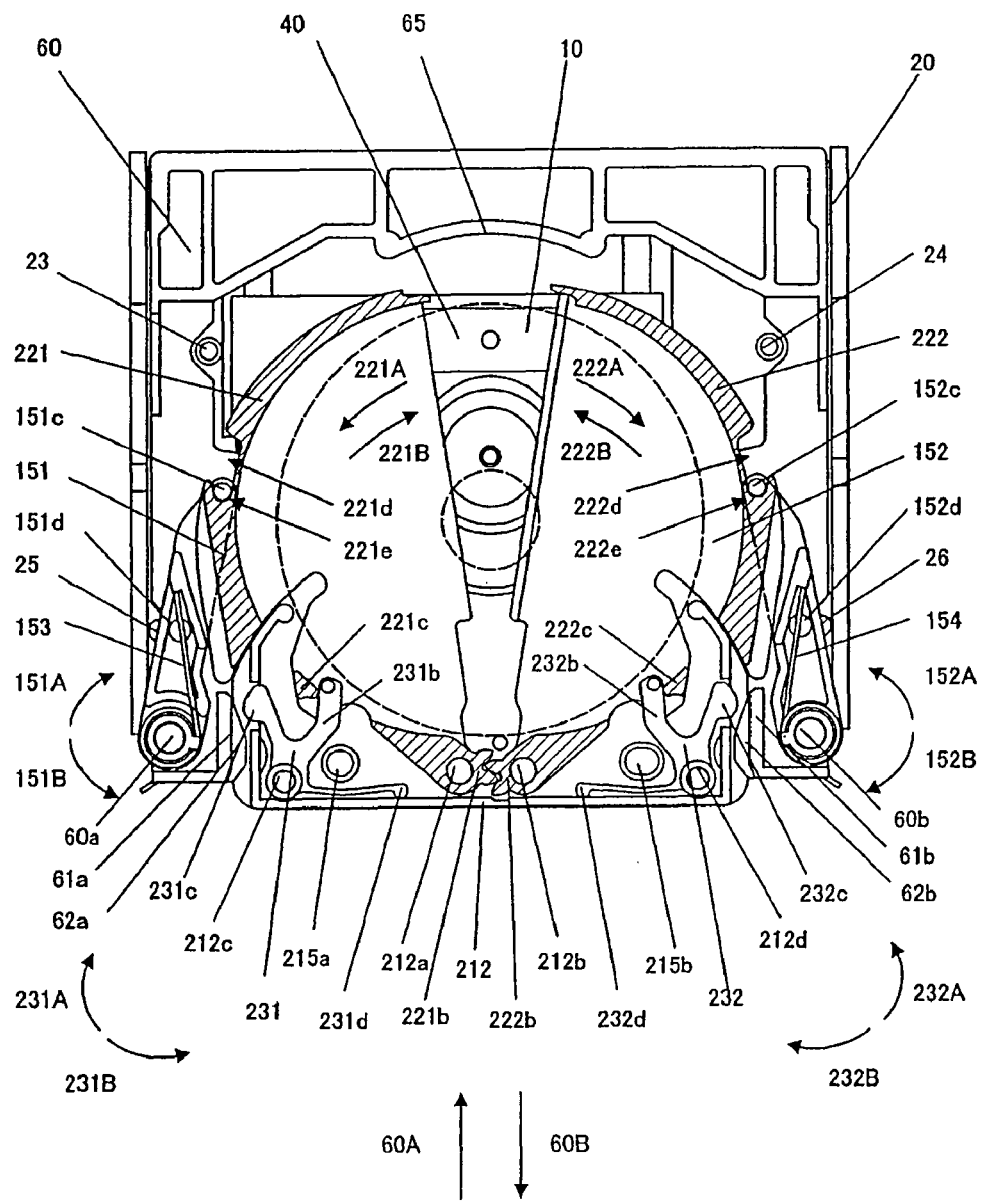
FIG. 7 is a plan view illustrating another state of the cartridge opening/closing mechanism of the first preferred embodiment either during the opening operation or during the closing operation.
Figure 8:
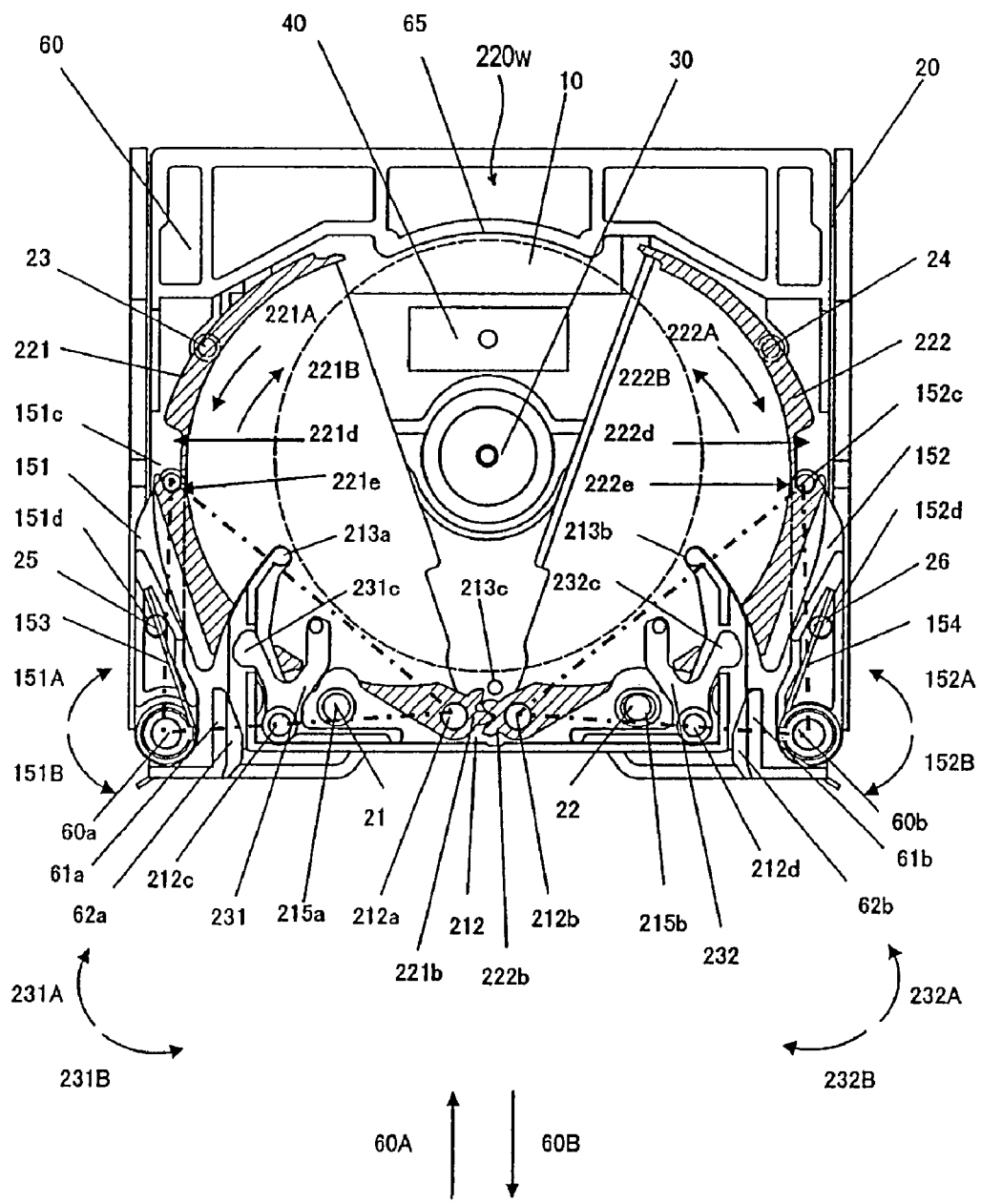
FIG. 8 is a plan view illustrating another state of the cartridge opening/closing mechanism of the first preferred embodiment either during the opening operation or during the closing operation.

As the disk cartridge 200 is inserted even deeper than the position shown in FIG. 6 in the direction indicated by the arrow 60A, the first and second opening/closing levers and 152 start being rotated around the pivots 60a and 60b in the directions indicated by the arrows 151B and 152B, respectively, by the first link mechanism formed by the first opening/closing lever 151 and the first disk housing portion and by the second link mechanism formed by the second opening/closing lever 152 and the second disk housing portion as shown in FIG. 7. Meanwhile, the first and second disk housing portions 221 and 222 start rotating around their pivots 212a and 212b in the directions indicated by the arrows 221A and 222A, respectively.

Specifically, the lower supporting base portion 212 of the disk cartridge 200 is guided by the guide walls 61a and 61b in the directions indicated by the arrows 60A and 60B. Therefore, the pivot 212a of the first disk housing portion 221 is allowed to move only in the directions indicated by the arrows 60A and 60B. On the other hand, the pivot 60a of the first opening/closing lever 151 is fixed. As a result, the first link mechanism is formed by the first opening/closing lever 151 and the first disk housing portion 221.

The first link mechanism is formed by the first opening/closing lever 151 that performs a crank operation (rotation), the pivot 212a of the first disk housing portion 221 that performs a slide operation in the inserting direction (i.e., the direction indicated by the arrow 60A), and the first disk housing portion 221 that functions as a link connecting them. As the first opening/closing lever 151 rotates in the direction indicated by the arrow 151B, the first disk housing portion 221 rotates in the direction indicated by the arrow 221A.

Likewise, the lower supporting base portion 212 is guided by the guide walls 61a and 61b in the directions indicated by the arrows 60A and 60B. Therefore, the pivot 212b of the second disk housing portion 222 is allowed to move only in the directions indicated by the arrows 60A and 60B. On the other hand, the pivot 60a of the first opening/closing lever 151 is fixed. As a result, the second link mechanism is formed by the second opening/closing lever 152 and the second disk housing portion 222.

The second link mechanism is formed by the first opening/closing lever 152 that performs a crank operation (rotation), the pivot 212b of the second disk housing portion 222 that performs a slide operation in the inserting direction (i.e., the direction indicated by the arrow 60A), and the second disk housing portion 222 that functions as a link connecting them. As the second opening/closing lever 152 rotates in the direction indicated by the arrow 152B, the second disk housing portion 222 rotates in the direction indicated by the arrow 222A.

Thus, as the first and second opening/closing levers 151 and 152 rotate in the directions indicated by the arrows 151B and 152B, the first and second disk housing portions 221 and 222 rotate in the directions indicated by the arrows 221A and 222A, respectively, using the pair of link mechanisms (including the first and second opening/closing levers 151 and 152), thereby opening the first and second disk housing portions 221 and 222. In this case, the angle of rotation of the first and second disk housing portions 221 and 222 is determined according to how deep the disk cartridge 200 is inserted in the direction indicated by the arrow 60A.

Also, in this case, as the first and second disk housing portions 221 and 222 rotate in mutually opposite directions and synchronously with each other at the interlocking portions 221b and 222b that engage with each other, the first and second opening/closing levers 151 and 152 also turn in mutually opposite directions via the first and second disk housing portions 221 and 222.

Meanwhile, the first and second opening/closing levers 151 and 152 are arranged symmetrically with respect to the direction in which the disk cartridge 200 is inserted (i.e., the direction indicated by the arrow 60A). That is why the first link mechanism formed by the first opening/closing lever 151 and the first disk housing portion 221 and the second link mechanism formed by the second opening/closing lever 152 and the second disk housing portion 222 operate symmetrically with respect to the direction in which the disk cartridge 200 is inserted (i.e., the direction indicated by the arrow 60A). Consequently, it is possible to guarantee that the disk cartridge 200 being inserted goes straight in its inserting direction.

Meanwhile, parts of the first and second opening/closing levers 151 and 152 near their engaging portions 151c and 152c contact with, and support, the bottom of the first and second disk housing portions 221 and 222. In this manner, while the disk cartridge 200 is being inserted in the direction indicated by the arrow 60A, the first and second disk housing portions 221 and 222 can be guided in the height direction.

Consequently, while the disk cartridge 200 is being inserted in the direction indicated by the arrow 60A, the first and second opening/closing levers 151 and 152, which are arranged symmetrically with each other, make sure that the disk cartridge 200 goes straight and also guide the disk cartridge 200 in the height direction. As a result, the disk housing 220 can be opened with stability.

Next, as the disk cartridge 200 is inserted even deeper in the direction indicated by the arrow 60A than the position shown in FIG. 7, the disk cartridge 200 is now inserted into the cartridge holder 60 fully as shown in FIG. 8, and the first and second disk housing portions 221 and 222 have rotated to form a predetermined angle between them, thereby opening the window 220w.

At this point in time, the positioning portion 65 of the cartridge holder 60 enters the window 220w. Also, the position regulating portions 213a, 213b and 213c of the lower supporting base portion 212 and the positioning portion 65 regulate the position of the disk 10 and position the center of the disk 10 when the window 220w is opened.

When the operator turns the cartridge holder 60 in the direction indicated by the arrow 80B such that the cartridge holder 60, forming a predetermined tilt angle θ with respect to the traverse base 20 as shown in FIG. 3(a), gets ready to perform a read/write operation on the disk 10 as shown in FIG. 3(b), the cartridge positioning pins 21 and 22 of the traverse base 20 fit into the positioning holes 215a and 215b of the lower supporting base portion 212. As a result, the lower supporting base portion 212 is positioned with respect to the traverse base 20. At the same time, the pivots 212a and 212b, around which the first and second disk housing portions 221 and 222 turn, are also positioned with respect to the traverse base 20.

Consequently, the pivot 212a of the first disk housing portion 221 that has been movable in the directions indicated by the arrows 60A and 60B is fixed at the predetermined position. Also, as indicated by the one-dot chain in FIG. 8, a first three-point link (i.e., a truss structure) is formed by the pivot 60a of the first opening/closing lever 151, the pivot 212a of the first disk housing portion 221, and the catching portion 221e of the first disk housing portion 221. As a result, the catching portion 221e of the first disk housing portion 221 has its position defined uniquely with respect to the traverse base 20.

In the same way, the pivot 212b of the second disk housing portion 222 that has been movable in the directions indicated by the arrows 60A and 60B is fixed at the predetermined position. Consequently, as indicated by the one-dot chain in FIG. 8, a second three-point link is formed by the pivot 60b of the second opening/closing lever 152, the pivot 212b of the second disk housing portion 222, and the catching portion 222e of the second disk housing portion 222. As a result, the catching portion 222e of the second disk housing portion 222 has its position defined uniquely with respect to the traverse base 20.

Thus, by positioning the lower supporting base portion 212 with respect to the traverse base 20, the angles of rotation of the first and second opening/closing levers 151 and 152 and the positions of the axes of rotation and the angles of rotation of the first and second disk housing portions 221 and 222 are determined uniquely by the first and second three-point links described above. As a result, the window 220w is opened fully.

Nevertheless, as the first and second lever biasing springs 153 and 154 apply biasing force to the first and second opening/closing levers 151 and 152 in the directions indicated by the arrows 151A and 152A, the first and second disk housing portions 221 and 222 are positioned while being biased in the closing direction. Considering a possible variation in precision between the respective members and a possible misfit of the positioning pins, the window 220w sometimes could become slightly narrower and could not be opened fully.

Thus, according to this preferred embodiment, the lever positioning pins 25 and 26 on the traverse base 20 are fitted into the positioning holes 151d and 152d of the first and second opening/closing levers 151 and 152, thereby positioning the first and second opening/closing levers 151 and 152. In this manner, the first and second disk housing portions 221 and 222 can be opened with even higher precision and a window 220w of a predetermined size can be opened just as intended.

In this case, the gap between the first and second engaging portions 151c and 152c of the first and second opening/closing levers 151 and 152 is wider than the gap between the guide walls 61a and 61b. Therefore, the first and second disk housing portions 221 and 222 can be opened so as to protrude out of the projection area of the disk cartridge when the disk housing portions are closed. As a result, a big window 220w can be opened in the disk cartridge 200.

Also, the catching portions 221e and 222e of the first and second disk housing portions 221 and 222 have regulating contact faces that contact with the engaging portions 151c and 152c of the first and second opening/closing levers 151 and 152 that are rotating in the directions indicated by the arrows 151B and 152B, respectively. That is why when the first and second opening/closing levers 151 and 152 are positioned with respect to the traverse base 20, the engaging portions 151c and 152c of the first and second opening/closing levers 151 and 152 contact with those regulating contact faces, thereby preventing the first and second disk housing portions 221 and 222 from rotating in the directions indicated by the arrows 221B and 222B anymore. As a result, the first and second disk housing portions 221 and 222 can be positioned just as intended without narrowing the window 220w.

Furthermore, by getting the first and second opening/closing levers 151 and 152 engaged with the lever positioning pins 25 and 26 of the traverse base 20, respectively, the first and second disk housing portions 221 and 222 can be held by the traverse base 20 with the first and second opening/closing levers 151 and 152. That is why even if the disk cartridge 200 is subjected to vibrations, shocks or any other disturbance, the window 220w can be kept fully opened just as intended.

The disk 10 is clamped between the disk mount 30a of the disk motor 30 and the damper 50 (not shown) to get ready to rotate. In this case, the position regulating portions 213a, 213b and 213c of the lower supporting base portion 212 are also positioned with respect to the traverse base 20. As a result, the position regulating portions 213a, 213b and 213c can provide required clearance for the disk 10. Also, the positioning portion 65 of the cartridge holder 60 is supported by, and rotatable around, the pivot screws 81 and 82 with respect to the traverse base 20, and therefore, has been positioned accurately with respect to the traverse base 20.

Furthermore, the bottom of the lower supporting base portion 212 is supported on the bearing surfaces 21a and 22a of the cartridge positioning pins 21 and 22, while the bottom of the first and second disk housing portions 221 and 222 is supported on the bearing surfaces 23a and 24a of the fixing pins 23 and 24 on the traverse base 20. At this point in time, parts of the first and second opening/closing levers 151 and 152 near the engaging portions 151c and 152c thereof, which have been in contact with the bottom of the first and second disk housing portions 221 and 222 and have guided the first and second disk housing portions 221 and 222 in the height direction, are no longer in contact with the bottom of the first and second disk housing portions 221 and 222.

That is to say, when a read/write operation is performed on the disk 10, the disk cartridge 200 is supported on only the four bearing surfaces described above in the height direction. For that reason, the disk cartridge 200 can be accurately positioned vertically with respect to the traverse base 20 and required clearance can be left just as intended for the disk 10. Optionally, springs (not shown) for pressing the disk cartridge 200 against the four bearing surfaces described above may be provided. In that case, the disk cartridge 200 can be positioned even more accurately.

Also, as shown in FIG. 8, when a read/write operation is performed on the disk 10, the unlocking portions 62a and 62b are out of contact with, and do not press, the openers/closers 231c and 232c of the first and second locking members 231 and 232. That is why the elastic portions 231d and 232d of the first and second locking members 231 and 232 do not deform elastically. Consequently, even if each of the first and second locking members 231 and 232 is an integral member made of resin, it is still possible to prevent the elastic portions 231d and 232d from creeping.

Furthermore, when the first and second disk housing portions 221 and 222 are fully opened, the pivots 60a and 60b around which the first and second opening/closing levers 151 and 152 rotate are located outside of the projection area of the disk cartridge 200 as shown in FIG. 8. That is why the members of the cartridge opening/closing mechanism 150 can be arranged efficiently without interfering with the disk cartridge 200 in the disk drive and without expanding excessively in the width direction of the disk cartridge 200 opened. As a result, a broad area can be secured for the window 220w, the optical head 40 can be designed more flexibly, and the thickness and overall size of the disk drive 501 can be cut down such that the disk drive 501 does not occupy too much space.

Figure 24:
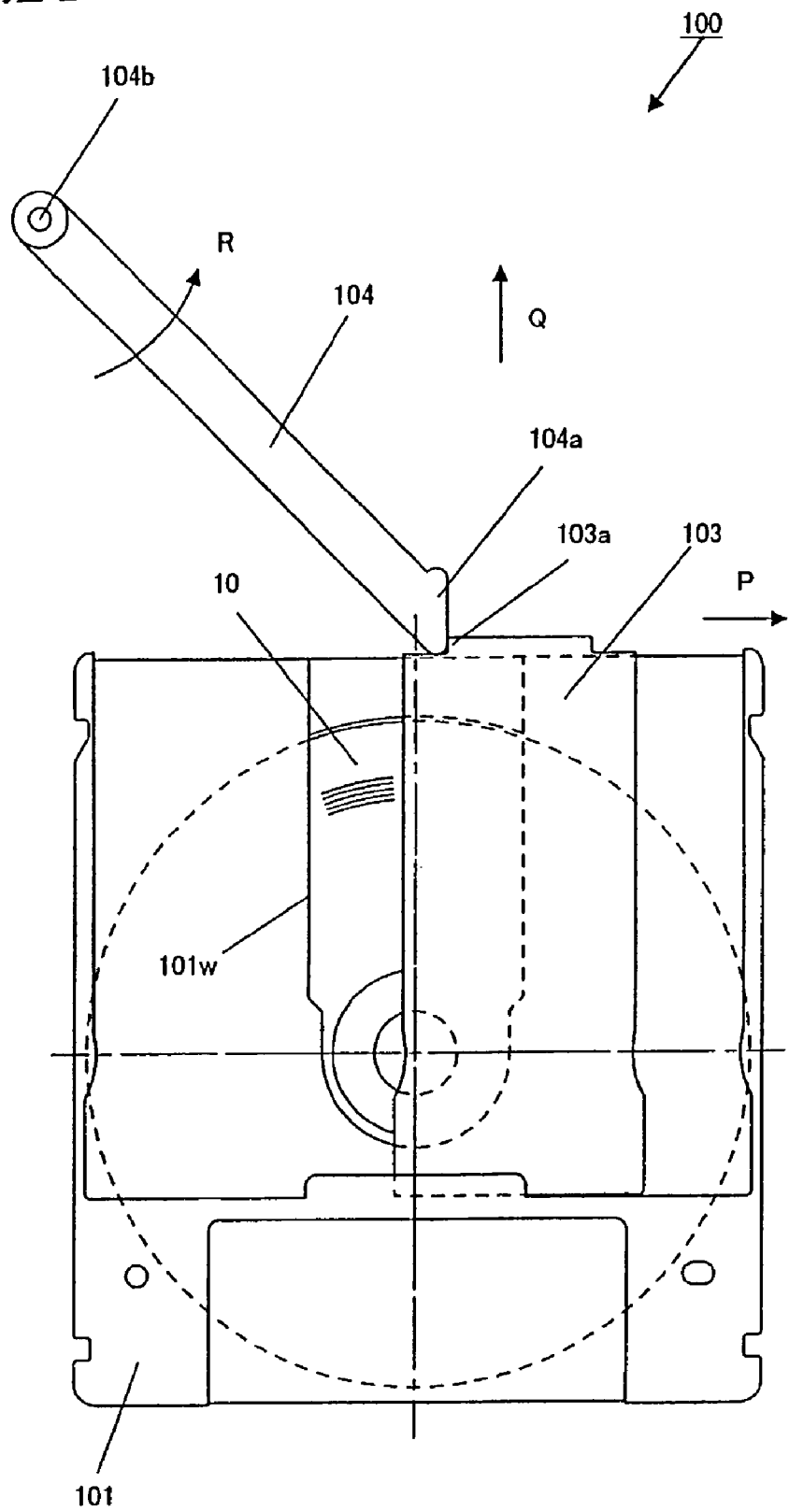
FIG. 24 is a plan view illustrating the general appearance of a conventional disk cartridge and one state thereof while the shutter of that cartridge is being opened or closed.

It should be noted that normally the disk drive 501 is designed so as to allow the disk cartridge 200 being inserted into the disk drive 501 a slightly greater stroke in the direction indicated by the arrow 60A. For that reason, if the disk 10 were centered only with the supporting base member 101 as in the conventional disk cartridge 100 shown in FIG. 24, then the disk 10 being inserted would be positioned slightly deeper by that excessive stroke, thus possibly causing some variation in positioning accuracy depending on how deep the disk 10 has been inserted.

However, according to this preferred embodiment, the cartridge holder 60 includes the positioning portion 65 for centering the disk 10 in the deep area of the disk drive 501. That is why even if the disk cartridge 200 has been inserted to varied depths in the direction indicated by the arrow 60A, the disk 10 can still be centered accurately with respect to the disk drive 501.

As described above, by inserting the disk cartridge 200 in the direction indicated by the arrow 60A such that the disk cartridge 200 changes its positions from the one shown in FIG. 4 through the one shown in FIG. 8, the window 220w of the disk cartridge 200 is fully opened and the cartridge opening/closing mechanism 150 finishes its opening operation. In addition, the disk cartridge 200 is properly loaded in the disk drive 501 and a read/write operation is ready to be started on the disk 10.

Next, it will be described how the cartridge opening/closing mechanism 150 performs its closing operation as the disk cartridge 200 is ejected from the cartridge holder 60.

The cartridge opening/closing mechanism 150 performs its closing operation in reverse order compared to its opening operation described above. That is to say, the cartridge opening/closing mechanism 150 starts operating in the state shown in FIG. 8 and eventually performs the operation of ejecting the disk cartridge 200 in the direction indicated by the arrow 60B to assume the state shown in FIG. 4. As a result, the disk housing 220 is fully closed and the disk cartridge 200 is ejected out of the drive.

Hereinafter, it will be described with reference to FIGS. 4 through 8 exactly how the cartridge opening/closing mechanism 150 performs its closing operation.

First, as shown in FIG. 8, the operator turns the cartridge holder 60 in the direction indicated by the arrow 80A such that the disk cartridge 200 loaded properly in the disk drive 501 as shown in FIG. 3(b) is ready to be inserted or ejected as shown in FIG. 3(a). Then, the cartridge positioning pins 21 and 22 are disengaged from the positioning holes 215a and 215b of the lower supporting base portion 212 and the lever positioning pins 25 and 26 are disengaged from the positioning holes 151d and 152d of the first and second opening/closing levers 151 and 152. Consequently, the first and second three-point link mechanisms described above are unlocked. As a result, the disk cartridge 200 is now movable along the guide walls 61a and 61b of the cartridge holder 60 in the directions indicated by the arrows 60A and 60B. Also, due to the biasing force applied by the first and second lever biasing springs 153 and 154, the first and second opening/closing levers 151 and 152 start to move in the directions indicated by the arrows 151A and 152A, respectively.

Contrary to the opening operation, as the first and second opening/closing levers 151 and 152 move in the directions indicated by the arrows 151A and 152A, the first and second disk housing portions 221 and 222 rotate in the directions indicated by the arrows 221B and 222B, respectively, using the link mechanisms including the first and second opening/closing levers 151 and 152, thereby starting the operation of closing the disk housing 220.

As the first and second opening/closing levers 151 and 152 move from the positions shown in FIG. 8 in the directions indicated by the arrows 151A and 152A, respectively, under the biasing force applied by the first and second lever biasing springs 153 and 154, the disk housing 220 is closed and the disk cartridge 200 is ejected in the direction indicated by the arrow 60B as shown in FIG. 7 while being guided on the guide walls 61a and 61b due to the action of the link mechanisms that consist of the first and second opening/closing levers 151 and 152 and the first and second disk housing portions 221 and 222.

In this case, as in the opening operation described above, the first and second disk housing portions 221 and 222 rotate in mutually opposite directions and synchronously with each other via the interlocking portions 221b and 222b. In addition, since the first and second opening/closing levers 151 and 152 are arranged symmetrically with respect to the direction in which the disk cartridge 200 is ejected (i.e., the direction indicated by the arrow 60B), the disk cartridge 200 can move straight in the ejecting direction just as intended even during the ejecting operation.

Also, as in the opening operation described above, portions of the first and second opening/closing levers 151 and 152 near their engaging portions 151c and 152c contact with, and support, the bottom of the first and second disk housing portions 221 and 222. In this manner, while the disk cartridge 200 is being ejected in the direction indicated by the arrow 60B, the first and second disk housing portions 221 and 222 can be guided in the height direction.

At this point in time, the first and second locking members 231 and 232 of the disk cartridge 200 are out of contact with the unlocking portions 62a and 62b. However, as the first and second disk housing portions 221 and 222 rotate in the directions indicated by the arrows 221B and 222B, the latching portions 221c and 222c of the first and second disk housing portions 221 and 222 contact with the catching lever portions 231b and 232b of the first and second locking members 231 and 232, thereby turning the first and second locking members 231 and 232 in the directions indicated by the arrows 231A and 232A.

Next, as the disk cartridge 200 is ejected further forward in the direction indicated by the arrow 60B than the position shown in FIG. 7 under the biasing force applied by the first and second lever biasing springs 153 and 154, the first and second opening/closing levers 151 and 152 continue to rotate in the directions indicated by the arrows 151A and 152A, thereby turning the first and second disk housing portions 221 and 222 in the directions indicated by the arrows 221B and 222B, respectively. As a result, the window 220w is fully closed by the disk housing 220 as shown in FIG. 6.

At this point in time, the unlocking portions 62a and 62b are in contact with the openers/closers 231c and 232c of the first and second locking members 231 and 232, thus rotating the first and second locking members 231 and 232 in the directions indicated by the arrows 231A and 232A, respectively. That is why the latching portions 221c and 222c of the first and second disk housing portions 221 and 222 are out of contact with the catching lever portions 231b and 232b of the first and second locking members 231 and 232 and the first and second disk housing portions 221 and 222 are not locked.

In the state shown in FIG. 6, the first and second opening/closing levers 151 and 152 continue to rotate in the directions indicated by the arrows 151A and 152A, respectively, under the biasing force applied by the first and second lever biasing springs 153 and 154. Then, the engaging portions 151c and 152c of the first and second opening/closing levers 151 and 152 eject the disk cartridge 200 in the direction indicated by the arrow 60B while keeping in contact with the inner wall of the notches 221d and 222d of the first and second disk housing portions 221 and 222.

Then, as shown in FIG. 5, the engaging portions 151c and 152c of the first and second opening/closing levers 151 and 152 contact with the catching contact faces 221f and 222f of the notches 221d and 222d of the first and second disk housing portions 221 and 222. As a result, the disk cartridge 200 finishes being ejected in the direction indicated by the arrow 60B under the biasing force applied by the first and second lever biasing springs 153 and 154.

The contact of the first and second opening/closing levers 151 and 152 with the catching contact faces 221f and 222f prevents the disk cartridge 200 from popping out in the direction indicated by the arrow 60B and dropping out of the disk drive 501 due to the biasing force applied by the first and second lever biasing springs 153 and 154.

At this point in time, the openers/closers 231c and 232c of the first and second locking members 231 and 232 are out of contact with the unlocking portions 62a and 62b, respectively. Thus, under the elastic force applied by the elastic portions 231d and 232d, the first and second locking members 231 and 232 rotate in the directions indicated by the arrows 231B and 232B, respectively. As a result, the latching portions 221c and 222c of the first and second disk housing portions 221 and 222 get engaged with the catching lever portion 231b and 232b of the first and second locking members 231 and 232, respectively. Consequently, the first and second disk housing portions 221 and 222 are locked so as not to rotate in the directions indicated by the arrows 221A and 222A.

When the operator removes the disk cartridge 200 in the direction indicated by the arrow 60B in the state shown in FIG. 5, the first and second opening/closing levers 151 and 152 overcome the biasing force applied by the first and second lever biasing springs 153 and 154 to rotate in the directions indicated by the arrows 151B and 152B. Consequently, the engaging portions 151c and 152c of the first and second opening/closing levers 151 and 152 move while sliding on the catching contact faces 221f and 222f of the first and second disk housing portions 221 and 222.

As a result, as shown in FIG. 4, the engaging portions 151c and 152c of the first and second opening/closing levers 151 and 152 contact with the outer side surface of the first and second disk housing portions 221 and 222 and are disengaged from the catching contact faces 221f and 222f of the first and second disk housing portions 221 and 222. Consequently, the disk cartridge 200 is no longer held but can be removed from the cartridge holder 60.

Finally, when the operator removes the disk cartridge 200 in the direction indicated by the arrow 60B, the disk cartridge 200 is completely ejected from the cartridge holder 60 and the operation of closing the cartridge opening/closing mechanism 150 ends.

If the biasing force applied by the first and second lever biasing springs 153 and 154 is great, then the disk cartridge 200 can be moved from the position shown in FIG. 6 to the one shown in FIG. 5 by rotating the first and second opening/closing levers 151 and 152 in the directions indicated by the arrows 151A and 152A, respectively. However, if the frictional force caused by the engaging portions 151c and 152c of the first and second opening/closing levers 151 and 152 on the inner wall of the notches 221d and 222d of the first and second disk housing portions 221 and 222 is greater than the biasing force applied by the first and second lever biasing springs 153 and 154, the ejection of the disk cartridge 200 in the direction indicated by the arrow 60B may finish at the stage shown in FIG. 6 under the biasing force applied by the first and second lever biasing springs 153 and 154. Even so, the disk cartridge 200 is just ejected a little less forward from the cartridge holder 60. The operator can also remove the disk cartridge 200 properly by sliding the disk cartridge 200 from the position shown in FIG. 5 to the one shown in FIG. 4 in the direction indicated by the arrow 60B. In this manner, the disk cartridge 200 can be removed from the cartridge holder 60 with no problem at all.

As described above, by using the link mechanisms, the disk drive of this preferred embodiment opens and closes the first and second disk housing portions 221 and 222 while the disk cartridge 200 is being inserted or ejected. Hereinafter, it will be described in further detail how those link mechanisms work.

Figure 9:
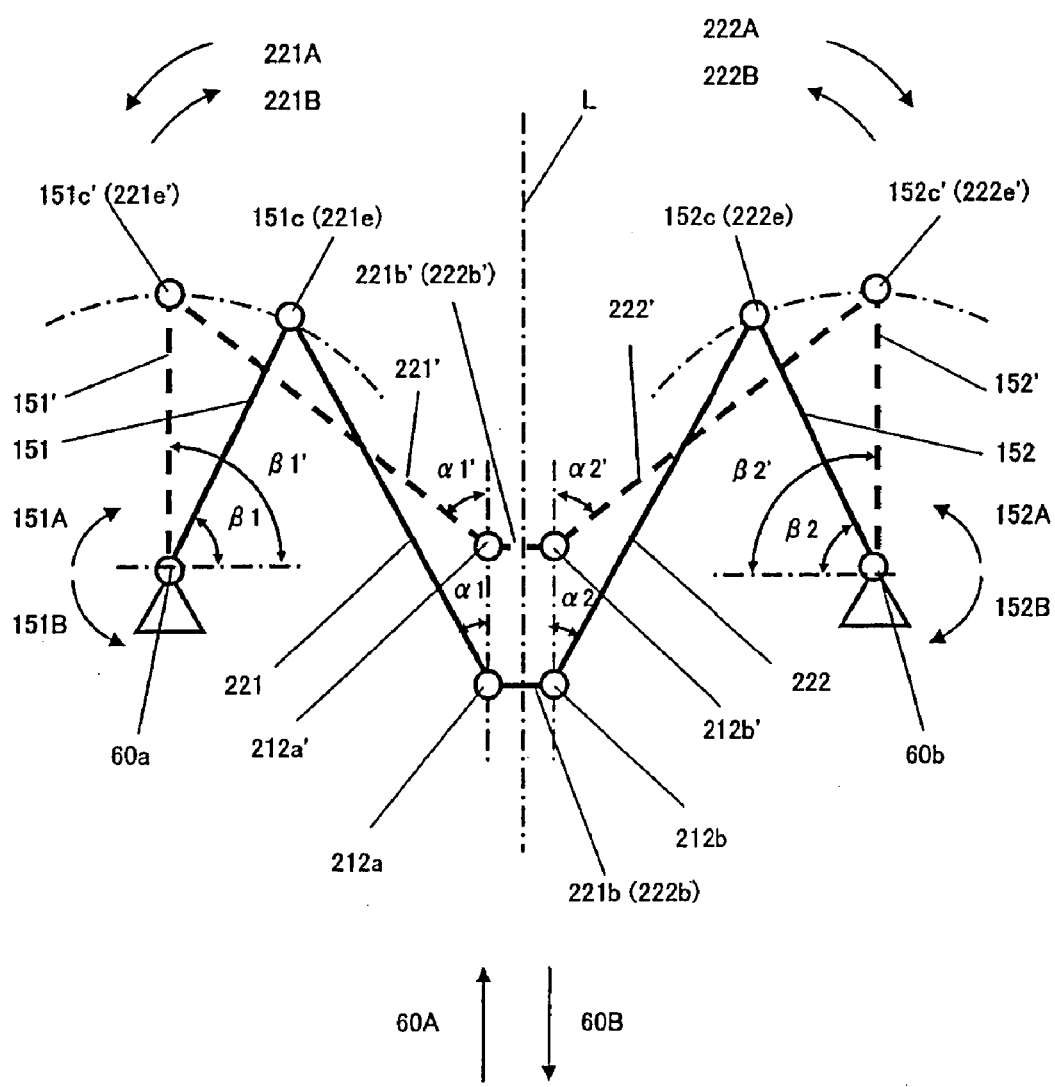
FIG. 9 is a schematic representation of link mechanisms illustrating the operating principle of the cartridge opening/closing mechanism of the first preferred embodiment.

FIG. 9 is a schematic representation illustrating the link mechanisms to show the principle of operation of the cartridge opening/closing mechanism 150 in the disk drive of the present invention. In FIG. 9, any component having substantially the same function as the counterpart shown in FIGS. 4 through 8 is identified by the same reference numeral. It should be noted that each of those components is just shown schematically in this drawing.

Also, in FIG. 9, the first and second opening/closing levers 151 and 152 and the first and second disk housing portions 221 and 222 have their positions shown in FIG. 6 indicated by the solid lines and their positions shown in FIG. 8 indicated by the dashed lines. Also, each reference numeral with a prime such as 151' denotes its associated component that has reached the position indicated by the dashed line in FIG. 8, and the line segment L represents a plane that is defined parallel to the directions indicated by the arrows 60A and 60B and that includes the axis of rotation of the disk 10.

First, as indicated by the solid lines in FIG. 9, when the engaging portion 151c of the first opening/closing lever 151 and the catching portion 221e of the first disk housing portion 221 engage with each other, the first opening/closing lever 151 and the first disk housing portion 221 form a first link mechanism. In the same way, when the engaging portion 152c of the second opening/closing lever 152 and the catching portion 222e of the second disk housing portion 222 engage with each other, the second opening/closing lever 152 and the second disk housing portion 222 form a second link mechanism.

The first and second opening/closing levers 151 and 152 are arranged symmetrically with respect to the line segment L. So are the first and second disk housing portions 221 and 222. That is why in FIG. 9, the first and second link mechanisms are also arranged symmetrically with respect to the line segment L.

In the first and second link mechanisms, the pivots 60a and 60b are located on the cartridge holder 60, and therefore, define the pivots of fixed link mechanisms. On the other hand, as the lower supporting base member 212 is guided by the guide walls 61a and 61b in the directions indicated by the arrows 60A and 60B, the pivots 212a and 212b of the first and second disk housing portions 221 and 222 define the pivots of link mechanisms that have the freedom to move in the directions indicated by the arrows 60A and 60B.

While the disk cartridge 200 is being inserted, the pivots 212a and 212b move in the direction indicated by the arrow 60A to reach the positions identified by 212a' and 212b'. As the pivot 212a moves in the direction indicated by the arrow 60A to reach the position identified by 212a', the first opening/closing lever 151 rotates in the direction indicated by the arrow 151B around the pivot 60a that is fixed. As a result, the engaging portion 151c (or the catching portion 221e) moves to the position of the engaging portion 151c' (or the catching portion 221e'). Meanwhile, the first disk housing portion 221, functioning as an interlocking link, moves in the direction indicated by the arrow 60A while rotating in the direction indicated by the arrow 221A, and the first link mechanism reaches the position indicated by the dashed lines.

Since the pivot 60a is located closer to the front end of the disk drive 501 (i.e., to the holder opening 60s of the cartridge holder 60) than the engaging portion 151c (or the catching portion 221e) is, the rotating direction (indicated by the arrow 151B) of the first opening/closing lever 151 is the same as that (indicated by the arrow 221A) of the first disk housing portion 221 while the disk cartridge 200 is being inserted.

In the same way, as the pivot 212b moves in the direction indicated by the arrow 60A to reach the position identified by 212b', the second opening/closing lever 152 rotates in the direction indicated by the arrow 152B around the pivot 60b that is fixed. As a result, the engaging portion 152c (or the catching portion 222e) moves to the position of the engaging portion 152c' (or the catching portion 222e'). Meanwhile, the second disk housing portion 222, functioning as an interlocking link, moves in the direction indicated by the arrow 60A while rotating in the direction indicated by the arrow 222A, and the second link mechanism reaches the position indicated by the dashed lines.

Since the pivot 60b is also located closer to the front end of the disk drive 501 (i.e., to the holder opening 60s of the cartridge holder 60) than the engaging portion 152c (or the catching portion 222e) is, the rotating direction (indicated by the arrow 152B) of the second opening/closing lever 152 is the same as that (indicated by the arrow 222A) of the second disk housing portion 222 while the disk cartridge 200 is being inserted.

In this case, the first and second disk housing portions 221 and 222, being interlocked with each other at the interlocking portions 221b and 222b that are engaged with each other, rotate in mutually opposite directions and synchronously with each other. That is why the angles defined by the first and second disk housing portions 221 and 222 with respect to the inserting and ejecting directions in FIG. 9 satisfy $\alpha 1 = \alpha 2$ at the position indicated by the solid lines and $\alpha 1' = \alpha 2'$ at the position indicated by the dashed lines. Also, since the first and second link mechanisms are arranged symmetrically with respect to the line segment L, the angles defined by the first and second opening/closing levers 151 and 152 with respect to the directions that intersect with the inserting and ejecting directions at right angles satisfy $\beta 1 = \beta 2$ at the position indicated by the solid lines and $\beta 1' = \beta 2'$ at the position indicated by the dashed lines.

Therefore, the first link mechanism formed by the first opening/closing lever 151 and the first disk housing portion 221 and the second link mechanism formed by the second opening/closing lever 152 and the second disk housing portion 222 operate symmetrically with respect to the line segment L while the disk cartridge 200 is being inserted (in the direction indicated by the arrow 60A). As a result, it is possible to guarantee that the disk cartridge 200 being inserted can go straight in the inserting direction.

While the disk cartridge 200 is being ejected, the first and second opening/closing levers 151 and 152 rotate under the biasing force applied by the lever biasing springs 153 and 154. As a result, the engaging portions 151c' and 152c' (or the catching portions 221e' and 222e') move toward the positions identified by 151c and 152c (i.e., toward the catching portions 221e and 222e) in the directions indicated by the arrows 151A and 152A, which are opposite to the directions during the insertion operation. As the engaging portion 151c' (or the catching portion 221e') moves in the direction indicated by the arrow 151A to reach the position identified by 151c (i.e., toward the catching portion 221e), the pivot 212a moves in the direction indicated by the arrow 60B. Consequently, the first disk housing portion 221, functioning as an interlocking link, moves in the direction indicated by the arrow 60B as a whole while rotating in the direction indicated by the arrow 221B, and the first link mechanism reaches the position indicated by the solid lines.

In the same way, as the engaging portion 152c' (or the catching portion 222e') moves in the direction indicated by the arrow 152A to reach the position identified by 152c (i.e., toward the catching portion 222e), the pivot 212b moves in the direction indicated by the arrow 60B. Consequently, the second disk housing portion 222, functioning as an interlocking link, moves in the direction indicated by the arrow 60B as a whole while rotating in the direction indicated by the arrow 222B, and the second link mechanism reaches the position indicated by the solid lines.

In this case, as in the insertion operation described above, the angles defined by the first and second disk housing portions 221 and 222 with respect to the inserting and ejecting directions in FIG. 9 satisfy $\alpha 1 = \alpha 2$ at the position indicated by the solid lines and $\alpha 1' = \alpha 2'$ at the position indicated by the dashed lines. Also, since the first and second link mechanisms are arranged symmetrically with respect to the line segment L, the angles defined by the first and second opening/closing levers 151 and 152 with respect to the directions that intersect with the inserting and ejecting directions at right angles satisfy $\beta 1 = \beta 2$ at the position indicated by the solid lines and $\beta 1' = \beta 2'$ at the position indicated by the dashed lines.

Therefore, the first link mechanism formed by the first opening/closing lever 151 and the first disk housing portion 221 and the second link mechanism formed by the second opening/closing lever 152 and the second disk housing portion 222 operate symmetrically with respect to the line segment L while the disk cartridge 200 is being ejected (in the direction indicated by the arrow 60B). As a result, it is possible to guarantee that the disk cartridge 200 being ejected can go straight in the ejecting direction.

As described above, the first and second link mechanisms are arranged symmetrically with respect to the inserting and ejecting directions of the disk cartridge 200 (i.e., with respect to the line segment L) and are driven synchronously with each other by way of the disk housing 220. As a result, the disk cartridge 200 can be inserted and ejected and the disk housing 220 can be opened and closed with good stability.

In the first preferred embodiment described above, the cartridge opening/closing mechanism 150 consists of the first and second opening/closing levers 151 and 152. However, the first and second disk housing portions 221 and 222 of the disk cartridge 200 can rotate in mutually opposite directions and synchronously with each other at the interlocking portions 221b and 222b. That is why the first and second disk housing portions 221 and 222 could be opened or closed with only one opening/closing lever in theory.

In the disk cartridge 200, however, the disk housing 220 functioning as a housing needs to be rotated to make the window 220w. That is why the projection area of the disk cartridge 200 becomes greater in the opened state than in the closed state. For that reason, the guide walls 61a and 61b that contact with the outer side surface of the disk cartridge 200 to define the inserting and ejecting directions and positions should be located nowhere but near the holder opening 60s. Therefore, to insert or eject the disk cartridge 200 with good stability, the disk housing 220, which is front end of the disk cartridge 200, should be guided as will be described later.

Figure 10:
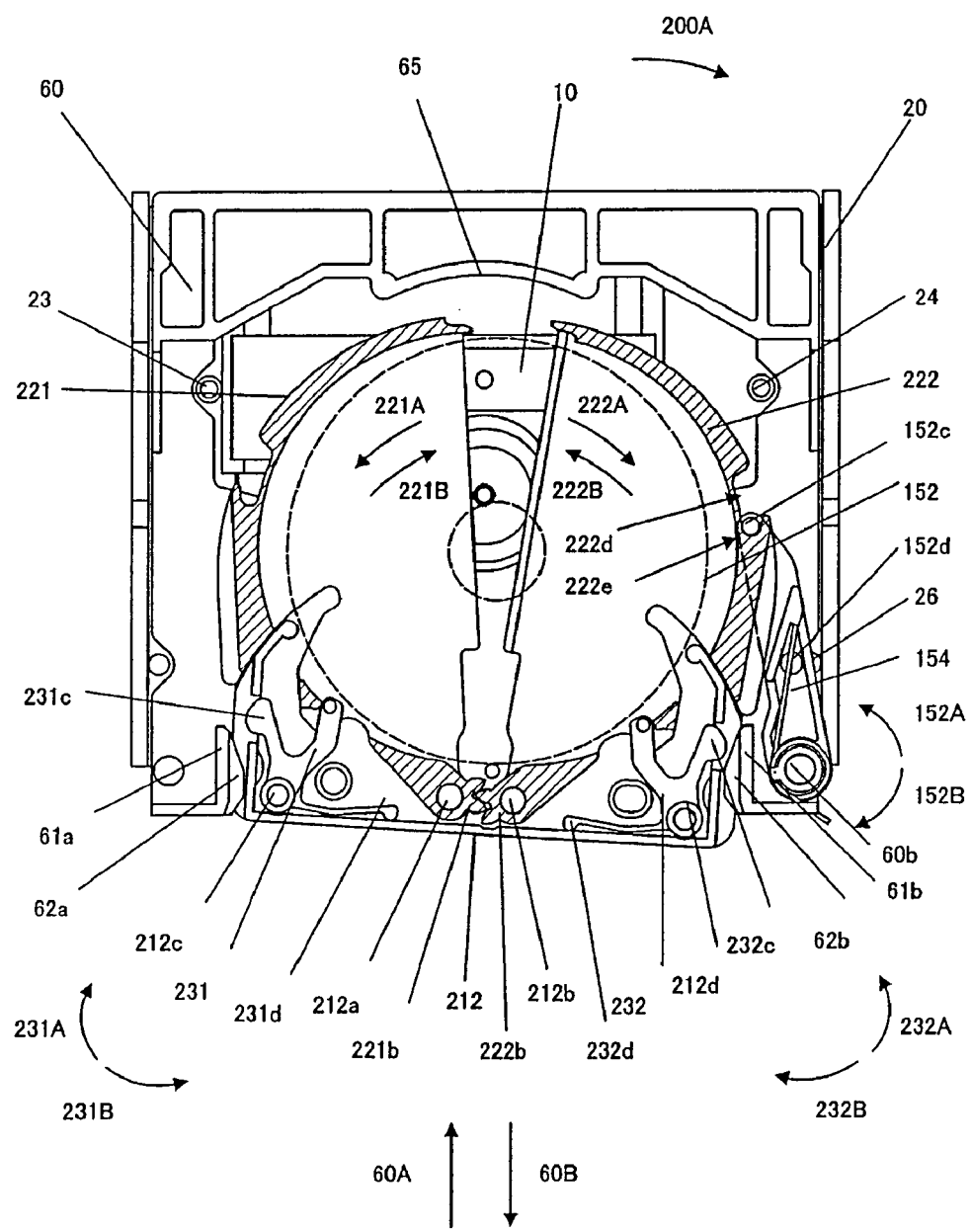
FIG. 10 is a plan view illustrating one state of a modified one of the cartridge opening/closing mechanism of the first preferred embodiment, consisting of only the second opening/closing lever, during its opening operation.

FIG. 10 illustrates how the disk drive 501 of this preferred embodiment would operate if the cartridge opening/closing mechanism consisted of only the second opening/closing lever 152 with the first opening/closing lever 151 removed.

As shown in FIG. 10, if the operator inserts the disk cartridge 200 in the direction indicated by the arrow 60A, the engaging portion 152c of the second opening/closing lever 152 soon gets engaged with the catching portion 222e of the second disk housing portion 222. Then, the second opening/closing lever 152 rotates in the direction indicated by the arrow 152B, thus rotating the second disk housing portion 222 in the direction indicated by the arrow 222A. As a result, the first disk housing portion 221 also rotates in the direction indicated by the arrow 212A because their interlocking portions 221b and 222b engage with each other.

In this case, however, the disk cartridge 200 is guided in the direction indicated by the arrow 60A just by the guide walls 61a and 61b of the cartridge holder 60. That is why in a portion of the disk cartridge deep inside the disk drive 501, only the second disk housing portion 222 is supported by the second opening/closing lever 152.

Thus, as the operator inserts the disk cartridge 200 in the direction indicated by the arrow 60A, the second disk housing portion 222 and the second opening/closing lever 152 form a link mechanism, which supports the second disk housing portion 222 firmly and turns the second disk housing portion 222 in the direction indicated by the arrow 222A. Meanwhile, the first disk housing portion 221 also rotates in the direction indicated by the arrow 212A because the first disk housing portion 221 is interlocked with the second disk housing portion 222 at the interlocking portions 221b and 222b. However, since there is no first opening/closing lever 151, the first disk housing portion 221 cannot be guided sufficiently. As a result, imbalanced load is placed on the first and second disk housing portions 221 and 222.

Consequently, the disk cartridge 200 is inserted while tilting in the direction indicated by the arrow 200A toward the first disk housing portion 221 on which relatively light load is placed. As a result, the disk cartridge 200 cannot be inserted properly and it is difficult to open the disk housing 220 as intended.

Suppose the disk cartridge 200 has been inserted properly. In that case, the second disk housing portion 222, engaged with the second opening/closing lever 152, will be positioned properly with respect to the traverse base 20. On the other hand, the position of the first disk housing portion 221 in the opened state is determined only by the engaging state of the interlocking portions 221b and 222b. As a result, the opening area of the window 220w would vary significantly.

This is because as the interlocking portion 221b is arranged near the pivot 212a, the error caused by slight misfit between the interlocking portions 221b and 222b will be magnified greatly at the end of the first disk housing portion 221. Furthermore, while the disk housing is opened, the first disk housing portion 221 is held only by being interlocked with the second disk housing portion 222 at the interlocking portions 221b and 222b, and therefore, will rotate easily in the direction indicated by the arrow 221A or 221B when subjected to some disturbance. This is another reason why the opening area of the window will vary easily.

That is why if the disk housing 220 were opened and closed with only one opening/closing lever, then the operation of inserting or ejecting the disk cartridge 200 would lose stability and the opening area of the window 220w would vary significantly. For that reason, it is not preferable to provide only one opening/closing lever for the cartridge opening/closing mechanism 150 of the disk cartridge 200 that should open and close the window 220w using the first and second disk housing portions 221 and 222 that function not only as shutters but also as a housing.

Also, when the disk housing 220 that functions as a housing has been rotated to make the window 220w in the disk cartridge 200, the disk cartridge 200 will have a greater projection area than in the closed state as shown in FIG. 8. That is why the guide width between the guide walls 61a and 61b arranged near the holder opening 60s of the disk drive 501 becomes narrower than the width of the disk cartridge 200 including the first and second disk housing portions in the opened state.

Therefore, even if the disk cartridge 200 could not be ejected to its predetermined position only by the biasing force applied by the first and second opening/closing levers 151 and 152 for some reason (e.g., some variation or failure of a member) and should be removed manually in the direction indicated by the arrow 60B by the operator, the first and second disk housing portions 221 and 222 that have been opened would contact with, and be closed by, the guide walls 61a and 61b while passing through the guide walls 61a and 61b at the holder opening. As a result, the disk cartridge 200 could also be removed with the first and second disk housing portions 221 and 222 closed.

In the preferred embodiment described above, the engaging portions 151c and 152c of the first and second opening/closing levers 151 and 152 contact with the catching contact faces 221f and 222f of the first and second disk housing portions 221 and 222, respectively, thereby preventing the first and second opening/closing levers 151 and 152 from coming off the first and second disk housing portions 221 and 222. However, the same effect can also be achieved even if just one of the two opening/closing levers 151 and 152 contacts with its associated catching contact face 221f or 222f.

Also, in the preferred embodiment described above, the disk cartridge 200 is positioned with the cartridge positioning pins 21 and 22 arranged on the traverse base 20. However, the disk cartridge may also be positioned with a different pair of pins arranged somewhere else, not on the traverse base 20. Furthermore, the lever positioning pins 25 and 26 are arranged on the traverse base 20 in the preferred embodiment described above but may also be provided for any other member.

Furthermore, in the preferred embodiment described above, the engaging portions 151c and 152c of the first and second opening/closing levers 151 and 152 engage with the catching contact faces 221f and 222f of the first and second disk housing portions 221 and 222, thereby preventing the disk cartridge 200 being ejected from popping out. However, it is also possible to prevent the disk cartridge 200 from popping out by either providing another preventing mechanism for the disk drive 501 or using a frictional member such as a rubber sheet.

Also, in the preferred embodiment described above, by tilting the cartridge holder 60 with respect to the traverse base 20, the disk cartridge 200 can be inserted or ejected without interfering with the disk motor 30 or the optical head 40. However, such interference with the disk motor 30 or the optical head 40 may also be prevented by using a known mechanism. For example, the same effect can also be achieved even if the disk cartridge 200 is inserted or ejected by lifting the cartridge holder 60 with respect to the traverse base 20 with these two members kept substantially parallel to each other or by tilting the traverse base 20 with respect to the cartridge holder 60.

Furthermore, in the preferred embodiment described above, the disk housing 220 is opened or closed by directly inserting or ejecting the disk cartridge 200 into/from the cartridge holder 60. However, the same effect can also be achieved by adopting a loading mechanism in which a drive source is newly provided, the disk cartridge 200 is put or held on a tray, a holder or any other transporting member, and that transporting member is inserted into, or ejected from, the disk drive.

Furthermore, in the preferred embodiment described above, the first and second opening/closing levers 151 and 152 are positioned with the lever positioning pins 25 and 26 arranged on the traverse base 20, thereby maintaining a sufficiently broad area for the window 220w. As described above, the opening area of the window 220w is determined by one link mechanism consisting of the first opening/closing lever 151 and the first disk housing portion 221 and the other link mechanism consisting of the second opening/closing lever 152 and the second disk housing portion 222. Optionally, to form the respective members with higher precision and in view of possible variation in precision between those members and possible misfit of the positioning pins, this area may be defined to be large enough to provide a sufficient area even if the window has shrunk to its smallest size. In that case, the positioning pins 25 and 26 may be omitted.

As described above, a disk drive according to the preferred embodiment of the present invention described above can be used effectively to operate the disk cartridge 200 that opens and closes the window 220w with the first and second disk housing portions 221 and 222 functioning not only as shutters but also as a housing. Specifically, the disk drive includes the first and second opening/closing levers 151 and 152 that engage with their associated notches 221d and 222d of the first and second disk housing portions 221 and 222. The first and second opening/closing levers 151 and 152 are arranged symmetrically with respect to the directions in which the disk cartridge 200 is inserted or ejected (i.e., the directions indicated by the arrows 60A and 60B) and are respectively rotated synchronously with the insertion or ejection of the disk cartridge 200, thereby opening or closing the first and second disk housing portions appropriately. As a result, it is possible to guarantee that the disk cartridge 200 being inserted or ejected can go straight all the way with extremely high stability.

In addition, while the disk cartridge 200 is being inserted or ejected, the first and second disk housing portions 221 and 222 are firmly held by the first and second opening/closing levers 151 and 152, respectively. Consequently, the disk cartridge 200 can still be inserted or ejected with good stability even when subjected to any disturbance such as vibrations or shocks.

On top of that, the first and second opening/closing levers 151 and 152 are biased by the biasing springs that apply biasing force to the first and second disk housing portions 221 and 222 in the closing direction. Thus, when the operator is inserting the disk cartridge 200, the disk housing can be opened while giving appropriate operation load to the first and second opening/closing levers 151 and 152 rotating and making the first and second opening/closing levers 151 and 152 engage with the first and second disk housing portions just as intended. On the other hand, in performing the ejection operation, under the biasing force applied by the biasing springs, the disk cartridge 200 can be ejected automatically and the first and second disk housing portions 221 and 222 can be closed just as intended.

Consequently, the operability of the disk drive while the disk cartridge 200 is being inserted or ejected into/from the drive (i.e., the operability at the man-machine interface) can be controlled solely according to the biasing force applied by the biasing springs. In addition, there is no need to provide any drive source or drive mechanism to get the disk cartridge insertion/ejection operation done. As a result, the number of members to make a disk drive can be reduced significantly and the weight and the cost of the disk drive can also be cut down.

On top of that, by arranging the unlocking portions 62a and 62b on the guide walls 61a and 61b of the cartridge holder 60, the unlocking portions 62a and 62b can be positioned more accurately with the profile of the disk cartridge 200 taken into consideration. Therefore, the first and second locking members 231 and 232 of the disk cartridge 200 can be pressed just as intended and can be unlocked at the best timing while the disk cartridge 200 is being inserted or ejected through a series of operations.

Furthermore, by arranging the cartridge opening/closing mechanism 150 closer to the holder opening 60s of the disk drive 501, the space left for the optical head 40 and the area in which the first and second opening/closing levers 151 and 152 are supposed to rotate do not overlap with each other. As a result, the optical head 40 can be designed more flexibly. In addition, since the optical head 40 does not overlap with the first and second opening/closing levers 151 and 152, the thickness of the disk drive can be reduced.

Embodiment 2

Hereinafter, a second preferred embodiment of the present invention will be described with reference to the accompanying drawings.

A disk cartridge 200' to be loaded into the disk drive of this preferred embodiment is the same as the disk cartridge 200 that has already been described with reference to FIGS. 19 through 23 except that the first and second disk housing portions 221 and 222 of the disk cartridge 200' have no interlocking portions 221b and 222b. Thus, the description of the disk cartridge 200' will be omitted herein. In the following description of the second preferred embodiment, any member having the same function as the counterpart of the first preferred embodiment described above will be identified by the same reference numeral as the one used to identify that counterpart.

First of all, the structure of the disk drive 502 of the second preferred embodiment will be described with reference to FIGS. 11 through 13.

Figure 11:
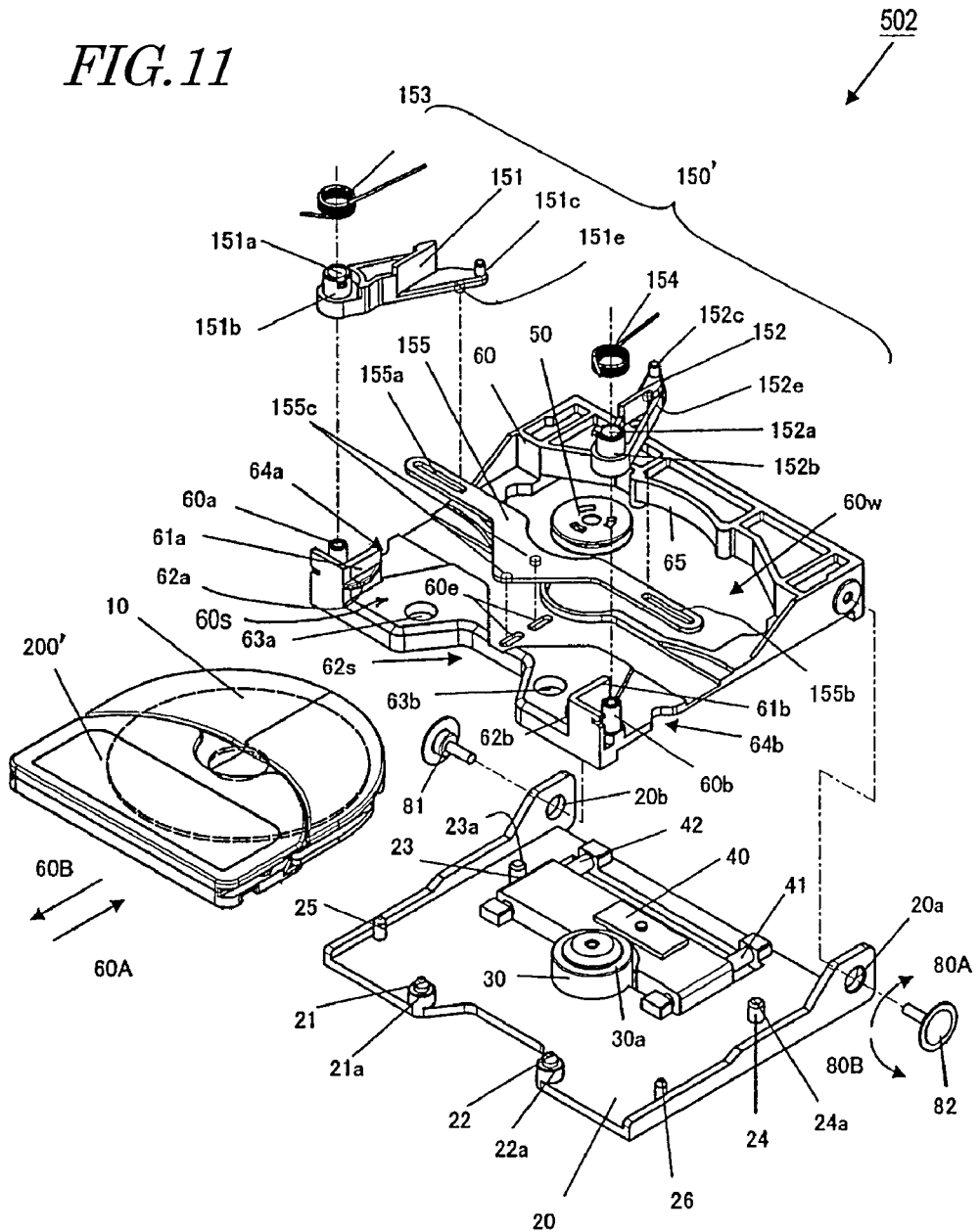
FIG. 11 is an exploded perspective view illustrating the structure of a disk drive as a second preferred embodiment of the present invention.
Figure 12:
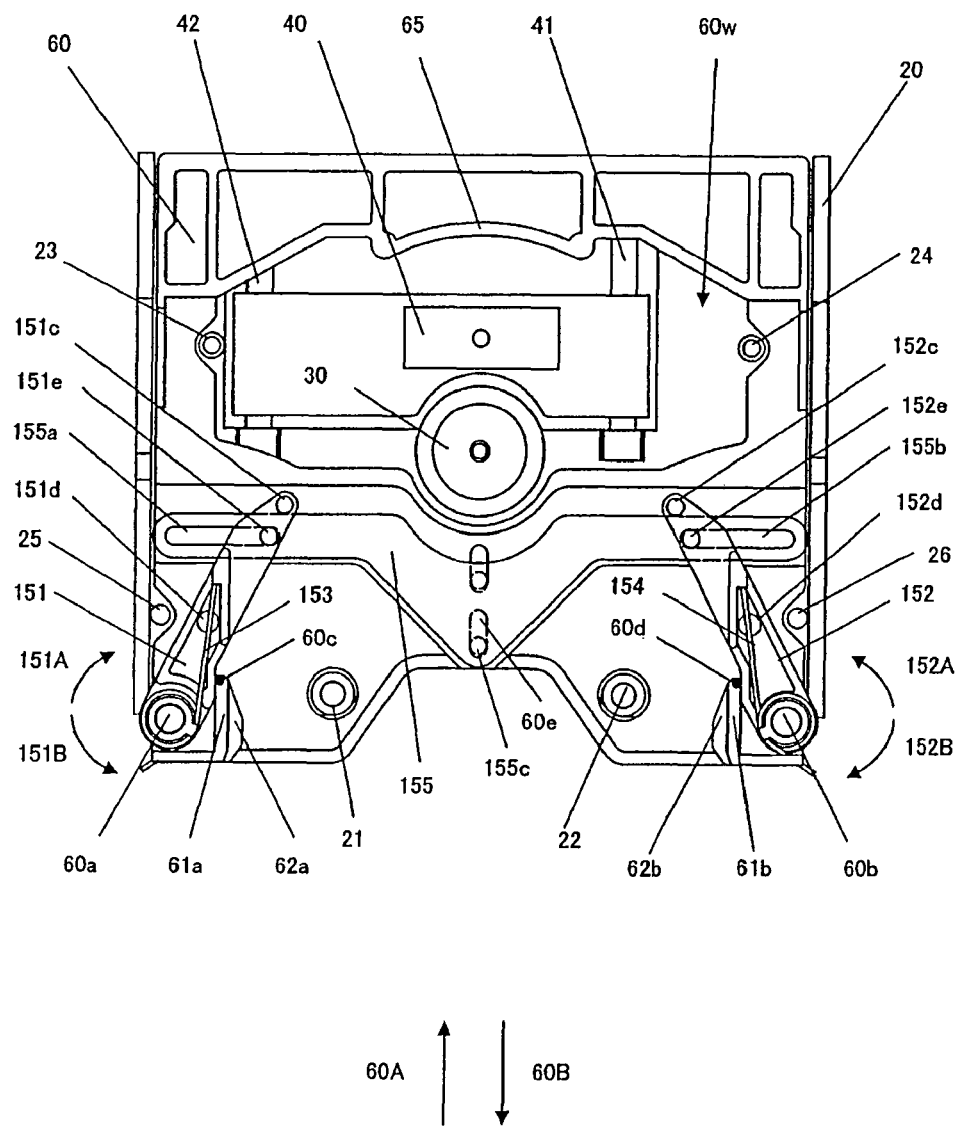
FIG. 12 is a plan view illustrating the structure of the second preferred embodiment.
Figure 13:
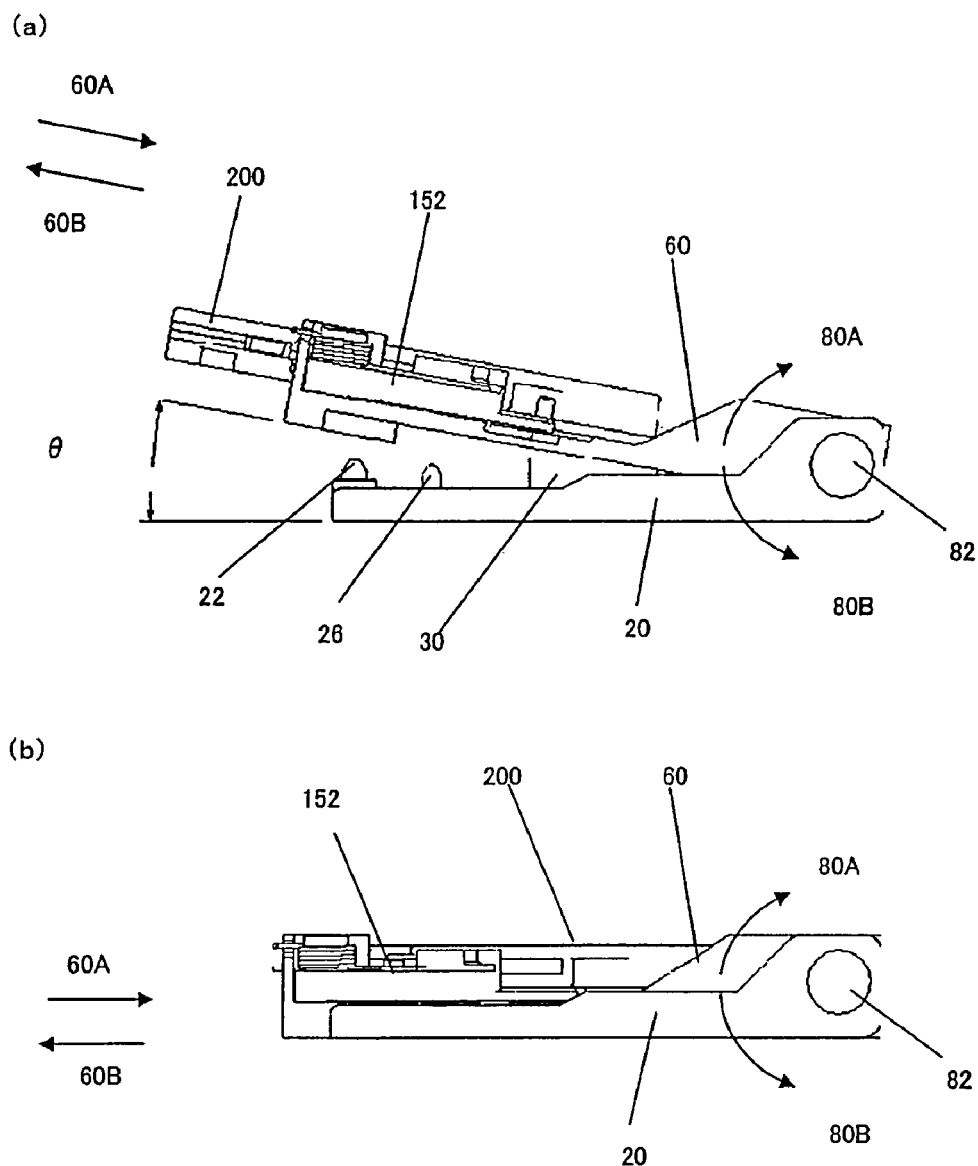
FIGS. 13(a) and 13(b) are side views illustrating the structure of the second preferred embodiment and showing the respective positions of its cartridge holder when a disk cartridge is inserted or ejected and when a read/write operation is performed on a disk housed there, respectively.

FIGS. 11 and 12 are respectively an exploded perspective view and a plan view illustrating the disk drive 502, which can be loaded with the disk cartridge 200'. On the other hand, FIGS. 13(a) and 13(b) are side views of the disk drive 502 in a situation where the disk cartridge 200' is being inserted or ejected and in a situation where a read/write operation is performed on the disk 10, respectively.

In these drawings, any component having either quite the same function, or substantially the same function, as the counterpart of the disk drive 501 of the first preferred embodiment is identified by the same reference numeral as the one used to identify that counterpart. The disk drive 502 has the same structure as the counterpart 501 of the first preferred embodiment described above except that the cartridge opening/closing mechanism 150' of the second preferred embodiment is designed differently from the counterpart of the disk drive 501 of the first preferred embodiment. Thus, the following description of the second preferred embodiment will be focused on the structure and operation of the cartridge opening/closing mechanism 150'.

Unlike the first preferred embodiment described above, the cartridge opening/closing mechanism 150' of this preferred embodiment includes a connecting arm 155 that interlocks with the first and second opening/closing levers 151 and 152 and that rotates the first and second opening/closing levers 151 and 152 in mutually opposite directions and synchronously with each other.

The cartridge opening/closing mechanism 150' opens or closes the disk housing 220 while the disk cartridge 200' is being inserted or ejected into/from the cartridge holder 60 in the direction indicated by the arrow 60A or 60B. For that purpose, the cartridge opening/closing mechanism 150' is attached to the cartridge holder 60 and includes first and second opening/closing levers 151 and 152, first and second lever biasing springs 153 and 154 that apply biasing force to the first and second opening/closing levers 151 and 152, respectively, and the connecting arm 155 that interlocks with the first and second opening/closing levers 151 and 152.

The first and second opening/closing levers 151 and 152 have pivot holes 151a and 152a, respectively, and are arranged on the cartridge holder 60 so as to turn around pivots 60a and 60b on the cartridge holder 60 when the pivots 60a and 60b are inserted into the pivot holes 151a and 152a, respectively.

The first and second lever biasing springs 153 and 154 are attached to the pivots 151b and 152b of the first and second opening/closing levers 151 and 152, respectively, thereby applying biasing force to the first opening/closing lever 151 in the direction indicated by the arrow 151A and to the second opening/closing lever 152 in the direction indicated by the arrow 152A, respectively.

Also, the first opening/closing lever 151 has a first engaging portion 151c that engages with the notch 221d of the first disk housing portion 221 and a positioning hole 151d to receive the lever positioning pin 25 of the traverse base 20. When the first opening/closing lever 151 turns in the direction indicated by the arrow 151A, the positioning hole 151d positions the first opening/closing lever 151 with respect to the disk motor 30.

Likewise, the second opening/closing lever 152 has an engaging portion 152c that engages with the notch 222d of the second disk housing portion 222 and a positioning hole 152d to receive the lever positioning pin 26 of the traverse base 20. When the second opening/closing lever 152 turns in the direction indicated by the arrow 152A, the positioning hole 152d positions the second opening/closing lever 152 with respect to the disk motor 30.

The pivots 60a and 60b are arranged closer to the front end of the disk drive 502 (i.e., closer to the holder opening 60s of the cartridge holder 60 than to the center of the disk 10 when the disk drive is loaded with the disk cartridge 200') than the engaging portions 151c and 152c of the first and second opening/closing levers 151 and 152 are as shown in FIG. 12. Also, the pivots 60a and 60b are arranged in the direction in which the guide walls 61a and 61b are arranged. Furthermore, the pivots 60a and 60b are arranged symmetrically with respect to a plane that is defined parallel to the inserting and ejecting directions of the disk cartridge 200', that passes the center of the disk 10 when the disk drive is loaded with the disk cartridge 200', and that intersects with the disk 10 at right angles.

Likewise, the first and second engaging portions 151c and 152c of the first and second opening/closing levers 151 and 152 are arranged symmetrically with respect to a plane that is defined parallel to the inserting and ejecting directions of the disk cartridge 200', that passes the center of the disk 10 when the disk drive is loaded with the disk cartridge 200', and that intersects with the disk 10 at right angles. That is why the first and second opening/closing levers 151 and 152 are also arranged symmetrically with respect to a plane that is defined parallel to the inserting and ejecting directions of the disk cartridge 200', that passes the center of the disk 10 when the disk drive is loaded with the disk cartridge 200', and that intersects with the disk 10 at right angles.

The connecting arm 155 has interlocking grooves 155a and 155b that receive the interlocking portions 151e and 152e of the first and second opening/closing levers 151 and 152, respectively. By fitting protrusions 155c into guide grooves 60e of the cartridge holder 60, the connecting arm 155 is supported on the cartridge holder 60 so as to be movable in the directions indicated by the arrows 60A and 60B.

The interlocking grooves 155a and 155b are arranged symmetrically with respect to a plane that is defined parallel to the inserting and ejecting directions (i.e., the directions indicated by the arrows 60A and 60B) and that includes the axis of rotation of the disk 10.

The connecting arm 155 is movable only in the inserting and ejecting directions (i.e., in the directions indicated by the arrows 60A and 60B). When interlocked with the connecting arm 155, the first and second opening/closing levers 151 and 152 rotate in mutually opposite directions and synchronously with each other with respect to the directions in which the disk cartridge 200' is inserted and ejected (i.e., in the directions indicated by the arrows 60A and 60B).

As shown in FIG. 12, the cartridge holder 60 has stopper portions 60c and 60d to stop the rotation of the first and second opening/closing levers 151 and 152 that has been set off by the first and second lever biasing springs 153 and 154. The first and second opening/closing levers 151 and 152 are held at predetermined standby positions by these stopper portions 60c and 60d.

It should be noted that the first and second opening/closing levers 151 and 152 rotate synchronously with each other. That is why even if only one stopper portion is provided, the first and second opening/closing levers 151 and 152 can still be held at the predetermined standby positions.

Also, since the first and second opening/closing levers 151 and 152 are interlocked with the connecting arm 155, the same effects as the ones achieved by the stopper portions 60c and 60d are achievable even by bringing the connecting arm 155 into contact with the cartridge holder 60.

Furthermore, as the first and second opening/closing levers 151 and 152 rotate synchronously with each other, biasing force can also be applied to the first and second opening/closing levers 151 and 152 in the directions indicated by the arrows 151A and 152A even by using only the first lever biasing spring 153.

While in contact with the stopper portions 60c and 60d of the cartridge holder 60, the first and second opening/closing levers 151 and 152 do not interfere with the lever positioning pins 25 and 26 of the traverse base 20 as shown in FIG. 12. That is why there should be no problem even if the cartridge holder 60 were turned as shown in FIG. 13(b) while the cartridge holder 60 is not loaded with the disk cartridge 200'.

Hereinafter, it will be described how the cartridge opening/closing mechanism 150' with such a configuration works. As described above, unlike the disk cartridge 200 of the first preferred embodiment, the disk cartridge 200' has no interlocking portions 221b and 222b in the first and second disk housing portions 221 and 222. That is why the first and second disk housing portions 221 and 222 cannot be rotated synchronously with each other by the disk cartridge 200' by itself.

As the disk cartridge 200' is inserted deeper into the cartridge holder 60 in the direction indicated by the arrow 60A, the cartridge opening/closing mechanism 150' opens the disk housing 220. On the other hand, as the disk cartridge 200' is ejected in the direction indicated by the arrow 60B, the cartridge opening/closing mechanism 150' closes the disk housing 220. It should be noted that the disk drive 502 of this preferred embodiment has no drive mechanism for inserting and ejecting the disk cartridge 200' automatically. That is to say, the disk cartridge 200' is manually inserted in the direction indicated by the arrow 60A by the operator. On the other hand, the disk cartridge 200 is ejected in the direction indicated by the arrow 60B by using the biasing force applied by the first and second lever biasing springs 153 and 154 and then removed manually by the operator.

First, it will be described with reference to FIGS. 14 through 18 how the cartridge opening/closing mechanism 150 opens the disk housing of the disk cartridge 200' being inserted into the cartridge holder 60.

While the disk cartridge 200' is being inserted or ejected into/out of the cartridge holder 60, the cartridge holder 60 is tilted with respect to the traverse base 20 as shown in FIG. 13(a). However, the traverse base 20 has nothing to do with the operation of inserting or ejecting the disk cartridge 200' but only the cartridge holder 60 has something to do with it. For that reason, the cartridge holder 60 and the traverse base 20 are illustrated on the same plane in FIGS. 14 through 17 for the sake of convenience. And FIG. 18 illustrates a situation where the cartridge holder 60 has been loaded with the disk cartridge 200'. In this state, the cartridge holder 60 has been lowered and is now on a level with the traverse base 20 as shown in FIG. 13(b) such that the disk 10 in the disk cartridge 200' is mounted on the disk mount 30a of the disk motor 30.

Figure 14:
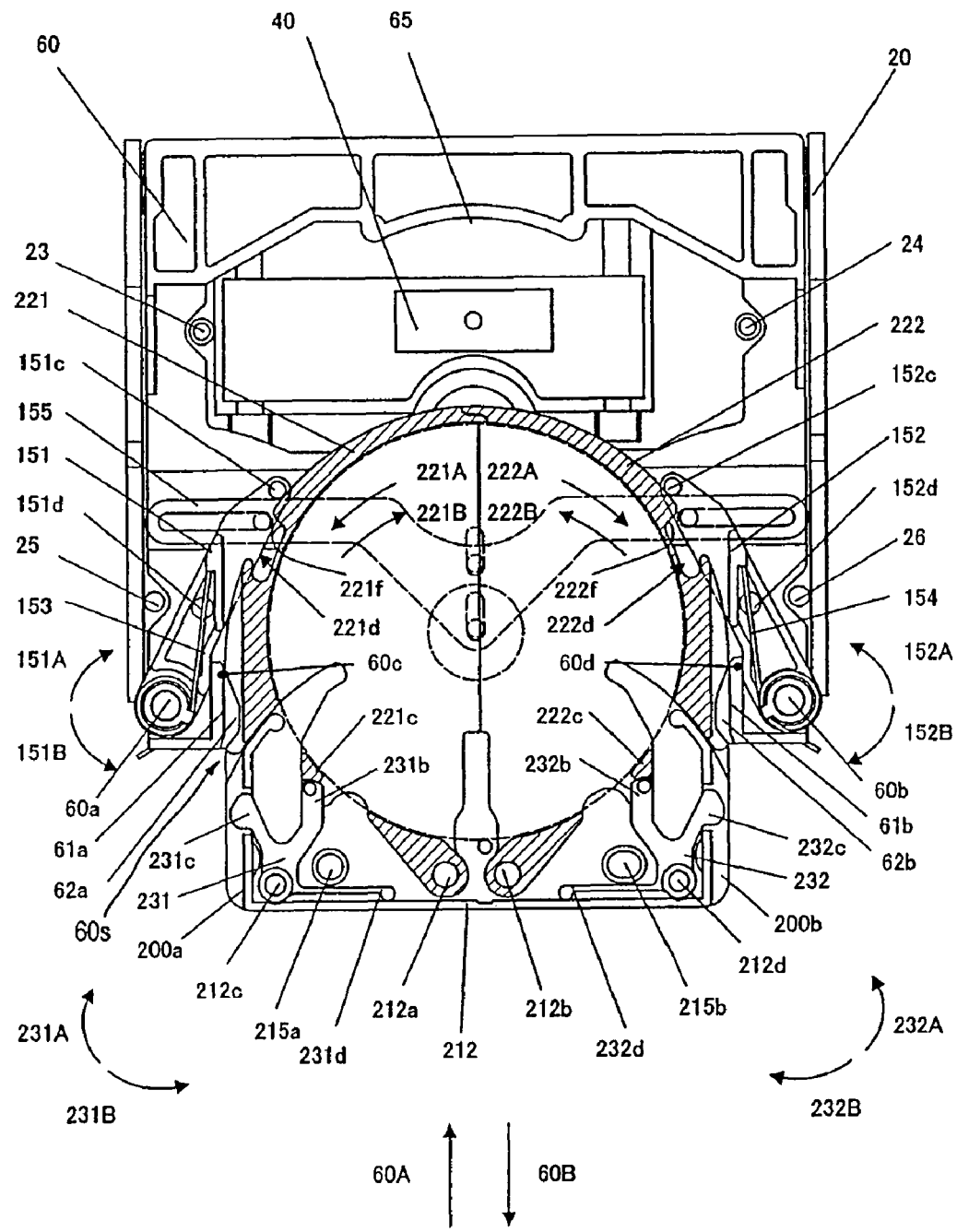
FIG. 14 is a plan view illustrating one state of the cartridge opening/closing mechanism of the second preferred embodiment either during an opening operation or during a closing operation.

First, as shown in FIG. 14, the operator manually inserts the disk cartridge 200' through the holder opening 60s into the cartridge holder 60 in the direction indicated by the arrow 60A. In this case, the disk cartridge 200' is inserted into the cartridge holder 60 while being guided by the guide walls 61a and 61b of the cartridge holder 60 in its width direction, i.e., in the direction that intersects with the inserting direction 60A at right angles.

The first and second opening/closing levers 151 and 152 contact with the stopper portions 60c and 60d of the cartridge holder 60, and are held at predetermined standby positions. At this point in time, the gap between the first and second engaging portions 151c and 152c of the first and second opening/closing levers 151 and 152 is narrower than the one between the guide walls 61a and 61b. For that reason, as the disk cartridge 200' is inserted deeper, the first and second engaging portions 151c and 152c will soon contact with the outer side surface of the first and second disk housing portions 221 and 222 of the disk cartridge 200'.

In the meantime, the unlocking portions 62a and 62b of the guide walls 61a and 61b respectively go through the unlocking slits 200a and 200b of the disk cartridge 200'.

Figure 15:
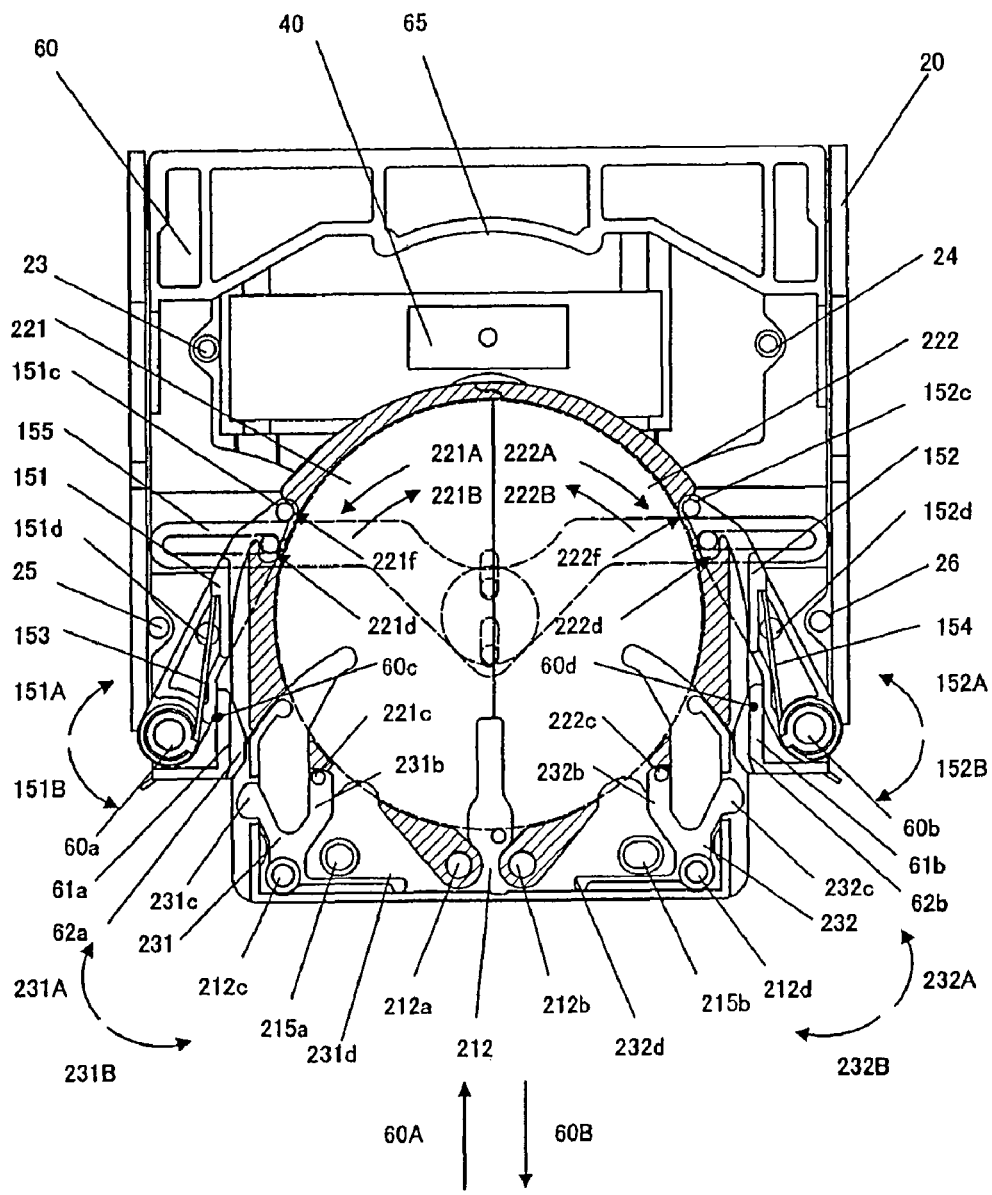
FIG. 15 is a plan view illustrating another state of the cartridge opening/closing mechanism of the second preferred embodiment either during the opening operation or during the closing operation.

As the disk cartridge 200' is inserted even deeper than the position shown in FIG. 14 in the direction indicated by the arrow 60A, the first engaging portion 151c of the first opening/closing lever 151 soon contacts with the outer side surface of the first disk housing portion 221 to overcome the biasing force applied by the lever biasing spring 153 and turn around the pivot 60a in the direction indicated by the arrow 151B as shown in FIG. 15. After that, the first opening/closing lever 151 rotates again in the direction indicated by the arrow 151A under the biasing force applied by the lever biasing spring 153 and the first engaging portion 151c moves to a position to contact with the catching contact face 221f of the notch 221d of the first disk housing portion 221.

In the same way, the engaging portion 152c of the second opening/closing lever 152 soon contacts with the outer side surface of the second disk housing portion 222 to overcome the biasing force applied by the lever biasing spring 154 and turn around the pivot 60b in the direction indicated by the arrow 152B. After that, the second opening/closing lever 152 rotates again in the direction indicated by the arrow 152A under the biasing force applied by the lever biasing spring 154 and the second engaging portion 152c moves to a position to contact with the catching contact face 222f of the notch 222d of the second disk housing portion 222.

Figure 16:
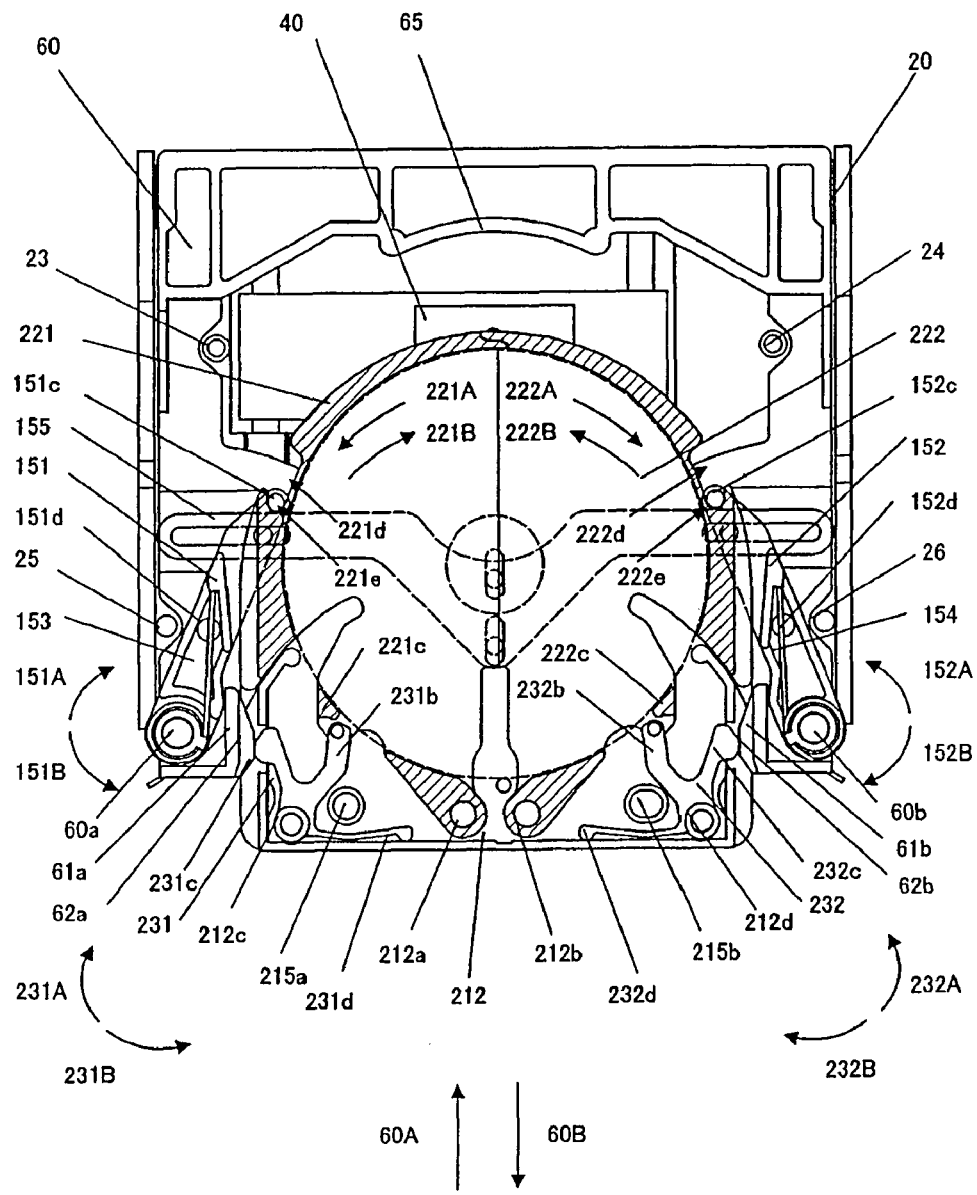
FIG. 16 is a plan view illustrating another state of the cartridge opening/closing mechanism of the second preferred embodiment either during the opening operation or during the closing operation.

As the disk cartridge 200' is inserted even deeper than the position shown in FIG. 15 in the direction indicated by the arrow 60A, the first engaging portion 151c of the first opening/closing lever 151 further goes on the inner wall of the notch 221d of the first disk housing portion 221 under the biasing force applied by the lever biasing spring 153 to reach the semicircular catching portion 221e of the notch 221d and get latched there as shown in FIG. 16. As a result, the first opening/closing lever 151 and the first disk housing portion 221 form a first link mechanism.

In the same way, the engaging portion 152c of the second opening/closing lever 152 further goes on the inner wall of the notch 222d of the second disk housing portion 222 under the biasing force applied by the lever biasing spring 154 to reach the semicircular catching portion 222e of the notch 222d and get latched there. As a result, the second opening/closing lever 152 and the second disk housing portion 222 form a second link mechanism.

In the meantime, the unlocking portions 62a and 62b press the openers/closers 231c and 232c of the first and second locking members 231 and 232 at the same time, thereby turning the first and second locking members 231 and 232 in the directions indicated by the arrows 231A and 232A, respectively, while deforming their elastic portions 231d and 232d simultaneously. As a result, the catching lever portions 231b and 232b of the first and second locking members 231 and 232 disengage themselves from the latching portions 221c and 222c of the first and second disk housing portions 221 and 222, thereby unlocking the first and second disk housing portions 221 and 222. Consequently, the first and second disk housing portions 221 and 222 are now ready to rotate in the directions indicated by the arrows 221A and 222A, respectively.

Figure 17:
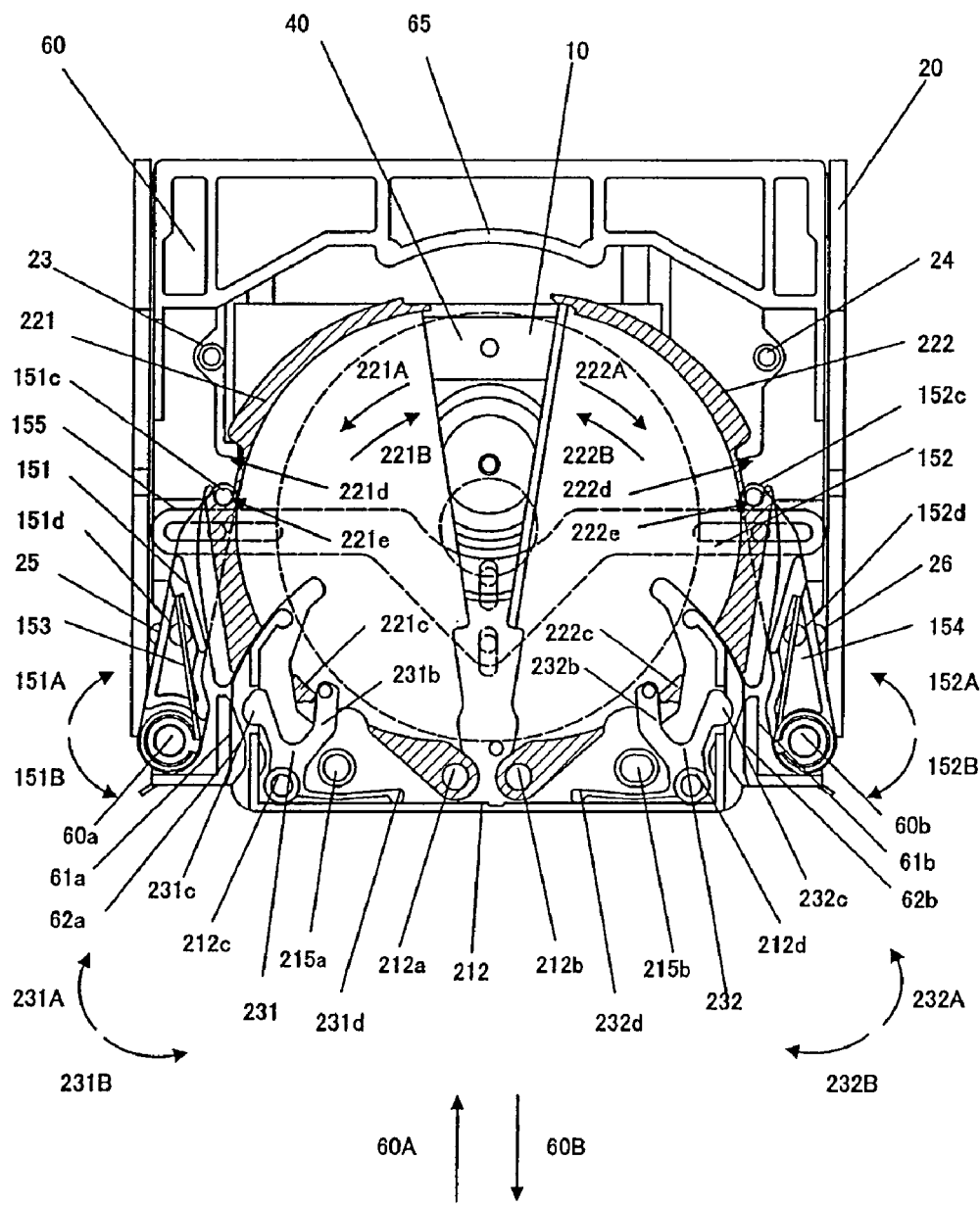
FIG. 17 is a plan view illustrating another state of the cartridge opening/closing mechanism of the second preferred embodiment either during the opening operation or during the closing operation.
Figure 18:
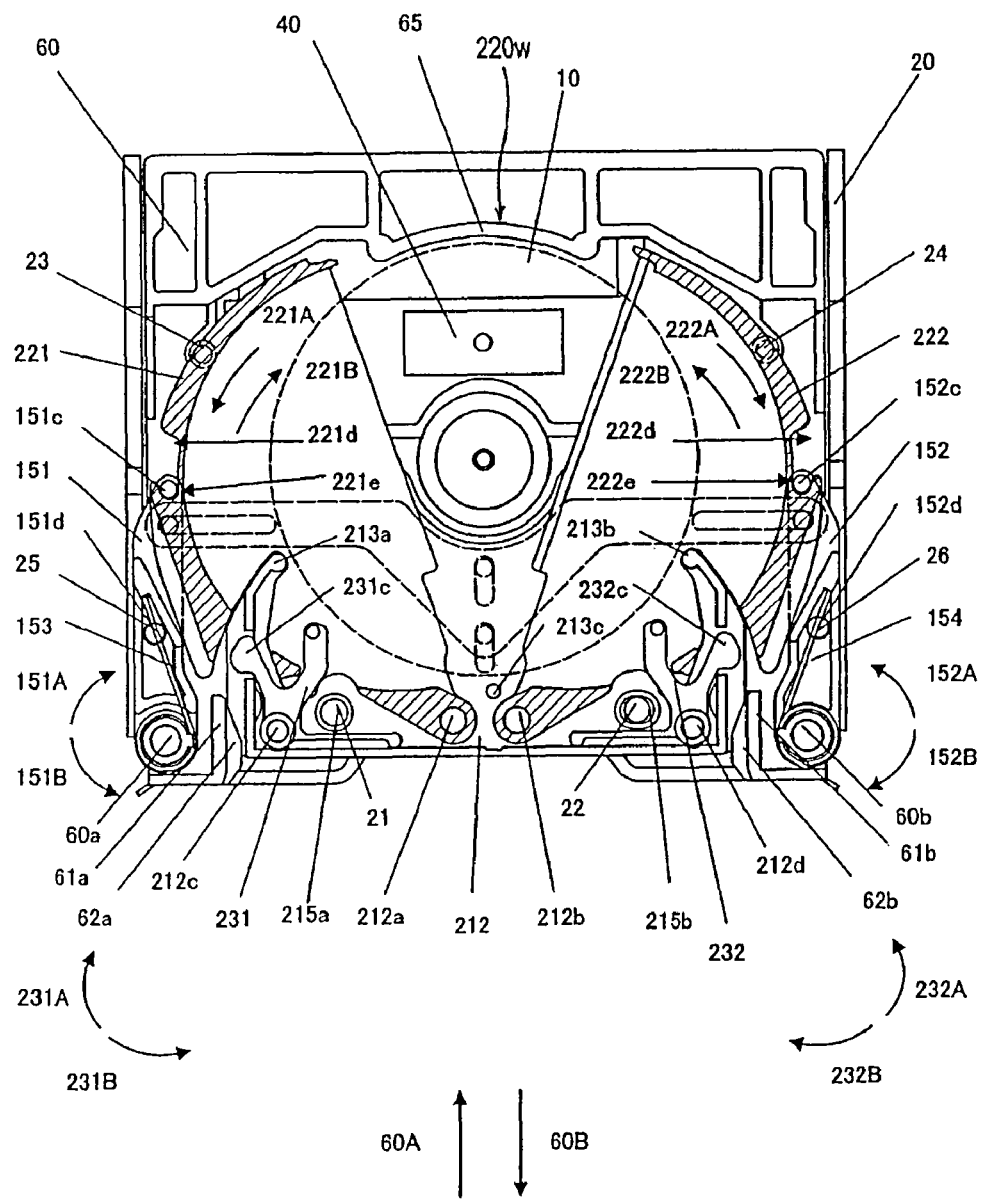
FIG. 18 is a plan view illustrating another state of the cartridge opening/closing mechanism of the second preferred embodiment either during the opening operation or during the closing operation.

As the disk cartridge 200' is inserted even deeper than the position shown in FIG. 16 in the direction indicated by the arrow 60A, the first and second opening/closing levers 151 and 152 start being rotated around the pivots 60a and 60b in the directions indicated by the arrows 151B and 152B, respectively, by the first link mechanism formed by the first opening/closing lever 151 and the first disk housing portion 221 and by the second link mechanism formed by the second opening/closing lever 152 and the second disk housing portion 222 as shown in FIG. 17. Meanwhile, the first and second disk housing portions 221 and 222 start rotating around their pivots 212a and 212b in the directions indicated by the arrows 221A and 222A, respectively.

This can be done thanks to the action of the first and second link mechanisms as in the first preferred embodiment described above. Thus, the first and second disk housing portions 221 and 222 rotate in the directions indicated by the arrows 221A and 222A, respectively, using the pair of link mechanisms (including the first and second opening/closing levers 151 and 152), thereby opening the disk housing 220. In this case, the angle of rotation of the first and second disk housing portions 221 and 222 is determined according to how deep the disk cartridge 200' is inserted in the direction indicated by the arrow 60A.

In this case, the first and second opening/closing levers 151 and 152 being interlocked with the connecting arm 155 rotate in mutually opposite directions and synchronously with each other with respect to the direction in which the disk cartridge 200' is inserted (i.e., the direction indicated by the arrow 60A) unlike the first preferred embodiment described above. That is why the first link mechanism formed by the first opening/closing lever 151 and the first disk housing portion 221 and the second link mechanism formed by the second opening/closing lever 152 and the second disk housing portion 222 operate symmetrically to each other with respect to the direction in which the disk cartridge 200' is inserted (i.e., the direction indicated by the arrow 60A).

Consequently, even without providing the interlocking portions 221b and 222b for the disk cartridge 200', the first and second disk housing portions 221 and 222 being interlocked with the first and second opening/closing levers 151 and 152 rotate in mutually opposite directions and synchronously with each other. As a result, the disk cartridge 200' can go straight in the inserting direction during the insertion operation.

Meanwhile, parts of the first and second opening/closing levers 151 and 152 near their engaging portions 151c and 152c contact with, and support, the bottom of the first and second disk housing portions 221 and 222. In this manner, while the disk cartridge 200' is being inserted in the direction indicated by the arrow 60A, the first and second disk housing portions 221 and 222 can be guided in the height direction.

Consequently, while the disk cartridge 200' is being inserted in the direction indicated by the arrow 60A, the first and second opening/closing levers 151 and 152, which are arranged symmetrically with each other, make sure that the disk cartridge 200' goes straight and also guide the disk cartridge 200' in the height direction. As a result, the disk housing 220 can be opened with stability.

Optionally, it is possible to load the disk drive 502 of this preferred embodiment with the disk cartridge 200, of which the first and second disk housing portions 221 and 222 interlock with each other via the interlocking portions 221b and 222b as described for the first preferred embodiment. In that case, however, there would be two pairs of engaging portions to be driven synchronously with each other, and therefore, their degrees of precision and misfit should be taken into consideration so as to avoid mutual interference.

Next, as the disk cartridge 200' is inserted even deeper in the direction indicated by the arrow 60A than the position shown in FIG. 17, the disk cartridge 200' is now inserted into the cartridge holder 60 fully as shown in FIG. 18, and the first and second disk housing portions 221 and 222 have rotated to form a predetermined angle between them, thereby opening the window 220w.

At this point in time, the positioning portion 65 of the cartridge holder 60 enters the window 220w. Also, the position regulating portions 213a, 213b and 213c of the lower supporting base portion 212 and the positioning portion 65 regulate the position of the disk 10 and position the center of the disk 10 when the window 220w is opened.

When the operator turns the cartridge holder 60 in the direction indicated by the arrow 80B such that the cartridge holder 60, forming a predetermined tilt angle θ with respect to the traverse base 20 as shown in FIG. 13(a), gets ready to perform a read/write operation on the disk 10 as shown in FIG. 13(b), the cartridge positioning pins 21 and 22 of the traverse base 20 fit into the positioning holes 215a and 215b of the lower supporting base portion 212. As a result, the lower supporting base portion 212 is positioned with respect to the traverse base 20. At the same time, the pivots 212a and 212b, around which the first and second disk housing portions 221 and 222 turn, are also positioned with respect to the traverse base 20.

Consequently, the pivot 212a of the first disk housing portion 221 that has been movable in the directions indicated by the arrows 60A and 60B is fixed at the predetermined position. Also, as indicated by the one-dot chain in FIG. 18, a first three-point link (i.e., a truss structure) is formed by the pivot 60a of the first opening/closing lever 151, the pivot 212a of the first disk housing portion 221, and the catching portion 221e of the first disk housing portion 221. As a result, the catching portion 221e of the first disk housing portion 221 has its position defined uniquely with respect to the traverse base 20.

In the same way, the pivot 212b of the second disk housing portion 222 that has been movable in the directions indicated by the arrows 60A and 60B is fixed at the predetermined position. Consequently, as indicated by the one-dot chain in FIG. 18, a second three-point link is formed by the pivot 60b of the second opening/closing lever 152, the pivot 212b of the second disk housing portion 222, and the catching portion 222e of the second disk housing portion 222. As a result, the catching portion 222e of the second disk housing portion 222 has its position defined uniquely with respect to the traverse base 20.

Thus, by positioning the lower supporting base portion 212 with respect to the traverse base 20, the angles of rotation of the first and second opening/closing levers 151 and 152 and the positions of the axes of rotation and the angles of rotation of the first and second disk housing portions 221 and 222 are determined uniquely by the first and second three-point links described above. As a result, the window 220w is opened fully.

Nevertheless, as the first and second lever biasing springs 153 and 154 apply biasing force to the first and second opening/closing levers 151 and 152 in the directions indicated by the arrows 151A and 152A, the first and second disk housing portions 221 and 222 are positioned while being biased in the closing direction. Considering a possible variation in precision between the respective members and a possible misfit of the positioning pins, the window 220w sometimes could become slightly narrower and could not be opened fully.

Thus, according to this preferred embodiment, the lever positioning pins 25 and 26 on the traverse base 20 are fitted into the positioning holes 151d and 152d of the first and second opening/closing levers 151 and 152, thereby positioning the first and second opening/closing levers 151 and 152. In this manner, the first and second disk housing portions 221 and 222 can be opened with even higher precision and a window 220w of a predetermined size can be opened just as intended.

In this case, the gap between the first and second engaging portions 151c and 152c of the first and second opening/closing levers 151 and 152 is wider than the gap between the guide walls 61a and 61b. Therefore, the first and second disk housing portions 221 and 222 can be opened so as to protrude out of the projection area of the disk cartridge when the disk housing portions are closed. As a result, a big window 220w can be opened in the disk cartridge 200'.

Also, the catching portions 221e and 222e of the first and second disk housing portions 221 and 222 have regulating contact faces that contact with the engaging portions 151c and 152c of the first and second opening/closing levers 151 and 152 that are rotating in the directions indicated by the arrows 151B and 152B, respectively. That is why when the first and second opening/closing levers 151 and 152 are positioned with respect to the traverse base 20, the engaging portions 151c and 152c of the first and second opening/closing levers 151 and 152 contact with those regulating contact faces, thereby preventing the first and second disk housing portions 221 and 222 from rotating in the directions indicated by the arrows 221B and 222B anymore. As a result, the first and second disk housing portions 221 and 222 can be positioned just as intended without narrowing the window 220w.

Furthermore, by getting the first and second opening/closing levers 151 and 152 engaged with the lever positioning pins 25 and 26 of the traverse base 20, respectively, the first and second disk housing portions 221 and 222 can be held by the traverse base 20 with the first and second opening/closing levers 151 and 152. That is why even if the disk cartridge 200' is subjected to vibrations, shocks or any other disturbance, the window 220w can be kept fully opened just as intended.

The disk 10 is clamped between the disk mount 30a of the disk motor 30 and the damper 50 (not shown) to get ready to rotate. In this case, the position regulating portions 213a, 213b and 213c of the lower supporting base portion 212 are also positioned with respect to the traverse base 20. As a result, the position regulating portions 213a, 213b and 213c can provide required clearance for the disk 10. Also, the positioning portion 65 of the cartridge holder 60 is supported by, and rotatable around, the pivot screws 81 and 82 with respect to the traverse base 20, and therefore, has been positioned accurately with respect to the traverse base 20.

Furthermore, the bottom of the lower supporting base portion 212 is supported on the bearing surfaces 21a and 22a of the cartridge positioning pins 21 and 22, while the bottom of the first and second disk housing portions 221 and 222 is supported on the bearing surfaces 23a and 24a of the fixing pins 23 and 24 on the traverse base 20. At this point in time, parts of the first and second opening/closing levers 151 and 152 near the engaging portions 151c and 152c thereof, which have been in contact with the bottom of the first and second disk housing portions 221 and 222 and have guided the first and second disk housing portions 221 and 222 in the height direction, are no longer in contact with the bottom of the first and second disk housing portions 221 and 222.

That is to say, when a read/write operation is performed on the disk 10, the disk cartridge 200' is supported on only the four bearing surfaces described above in the height direction. For that reason, the disk cartridge 200' can be accurately positioned vertically with respect to the traverse base 20 and required clearance can be left just as intended for the disk 10. Optionally, springs (not shown) for pressing the disk cartridge 200' against the four bearing surfaces described above may be provided. In that case, the disk cartridge 200' can be positioned even more accurately.

Also, as shown in FIG. 18, when a read/write operation is performed on the disk 10, the unlocking portions 62a and 62b are out of contact with, and do not press, the openers/closers 231c and 232c of the first and second locking members 231 and 232. That is why the elastic portions 231d and 232d of the first and second locking members 231 and 232 do not deform elastically. Consequently, even if each of the first and second locking members 231 and 232 is an integral member made of resin, it is still possible to prevent the elastic portions 231d and 232d from creeping.

Furthermore, when the first and second disk housing portions 221 and 222 are fully opened, the pivots 60a and 60b around which the first and second opening/closing levers 151 and 152 rotate are located outside of the projection area of the disk cartridge 200' as shown in FIG. 18. That is why the members of the cartridge opening/closing mechanism 150' can be arranged efficiently without interfering with the disk cartridge 200' in the disk drive and without expanding excessively in the width direction of the disk cartridge 200' opened. As a result, a broad area can be secured for the window 220w, the optical head 40 can be designed more flexibly, and the thickness and overall size of the disk drive 502 can be cut down such that the disk drive 502 does not occupy too much space.

It should be noted that normally the disk drive 502 is designed so as to allow the disk cartridge 200' being inserted into the disk drive 502 a slightly greater stroke in the direction indicated by the arrow 60A. For that reason, if the disk 10 were centered only with the supporting base member 101 as in the conventional disk cartridge 100 shown in FIG. 24, then the disk 10 being inserted would be positioned slightly deeper by that excessive stroke, thus possibly causing some variation in positioning accuracy depending on how deep the disk 10 has been inserted.

However, according to this preferred embodiment, the cartridge holder 60 includes the positioning portion 65 for centering the disk 10 in the deep area of the disk drive 502. That is why even if the disk cartridge 200' has been inserted to varied depths in the direction indicated by the arrow 60A, the disk 10 can still be centered accurately with respect to the disk drive 502.

As described above, by inserting the disk cartridge 200' in the direction indicated by the arrow 60A such that the disk cartridge 200' changes its positions from the one shown in FIG. 14 through the one shown in FIG. 18, the window 220w of the disk cartridge 200' is fully opened and the cartridge opening/closing mechanism 150' finishes its opening operation. In addition, the disk cartridge 200' is properly loaded in the disk drive 502 and a read/write operation is ready to be started on the disk 10.

Next, it will be described how the cartridge opening/closing mechanism 150' performs its closing operation as the disk cartridge 200' is ejected from the cartridge holder 60.

The cartridge opening/closing mechanism 150' performs its closing operation in reverse order compared to its opening operation described above. That is to say, the cartridge opening/closing mechanism 150' starts operating in the state shown in FIG. 18 and eventually performs the operation of ejecting the disk cartridge 200' in the direction indicated by the arrow 60B to assume the state shown in FIG. 14. As a result, the disk housing 220 is fully closed and the disk cartridge 200' is ejected out of the drive.

Hereinafter, it will be described with reference to FIGS. 14 through 18 exactly how the cartridge opening/closing mechanism 150' performs its closing operation.

First, as shown in FIG. 18, the operator turns the cartridge holder 60 in the direction indicated by the arrow 80A such that the disk cartridge 200' loaded properly in the disk drive 502 as shown in FIG. 13(b) is ready to be inserted or ejected as shown in FIG. 13(a). Then, the cartridge positioning pins 21 and 22 are disengaged from the positioning holes 215a and 215b of the lower supporting base portion 212 and the lever positioning pins 25 and 26 are disengaged from the positioning holes 151d and 152d of the first and second opening/closing levers 151 and 152. Consequently, the first and second three-point link mechanisms described above are unlocked. As a result, the disk cartridge 200' is now movable along the guide walls 61a and 61b of the cartridge holder 60 in the directions indicated by the arrows 60A and 60B. Also, due to the biasing force applied by the first and second lever biasing springs 153 and 154, the first and second opening/closing levers 151 and 152 start to move in the directions indicated by the arrows 151A and 152A, respectively.

Contrary to the opening operation, as the first and second opening/closing levers 151 and 152 move in the directions indicated by the arrows 151A and 152A, the first and second disk housing portions 221 and 222 rotate in the directions indicated by the arrows 221B and 222B, respectively, using the link mechanisms including the first and second opening/closing levers 151 and 152, thereby starting the operation of closing the disk housing 220.

As the first and second opening/closing levers 151 and 152 move from the positions shown in FIG. 18 in the directions indicated by the arrows 151A and 152A, respectively, under the biasing force applied by the first and second lever biasing springs 153 and 154, the disk housing 220 is closed and the disk cartridge 200' is ejected in the direction indicated by the arrow 60B as shown in FIG. 17 while being guided on the guide walls 61a and 61b due to the action of the link mechanisms that consist of the first and second opening/closing levers 151 and 152 and the first and second disk housing portions 221 and 222.

In this case, as in the opening operation described above, the first and second opening/closing levers 151 and 152 being interlocked with the connecting arm 155 rotate in mutually opposite directions and synchronously with each other and are arranged symmetrically with respect to the direction in which the disk cartridge 200' is ejected (i.e., the direction indicated by the arrow 60B). Thus, the first and second disk housing portions 221 and 222 being interlocked with the first and second opening/closing levers 151 and 152 also rotate in mutually opposite directions and synchronously with each other and the disk cartridge 200' can move straight just as intended even during the ejecting operation.

Also, as in the opening operation described above, portions of the first and second opening/closing levers 151 and 152 near their engaging grooves 151c and 152c contact with, and support, the bottom of the first and second disk housing portions 221 and 222. In this manner, while the disk cartridge 200' is being ejected in the direction indicated by the arrow 60B, the first and second disk housing portions 221 and 222 can be guided in the height direction.

At this point in time, the first and second locking members 231 and 232 of the disk cartridge 200' are out of contact with the unlocking portions 62a and 62b. However, as the first and second disk housing portions 221 and 222 rotate in the directions indicated by the arrows 221B and 222B, the latching portions 221c and 222c of the first and second disk housing portions 221 and 222 contact with the catching lever portions 231b and 232b of the first and second locking members 231 and 232, thereby turning the first and second locking members 231 and 232 in the directions indicated by the arrows 231A and 232A.

Next, as the disk cartridge 200' is ejected further forward in the direction indicated by the arrow 60B than the position shown in FIG. 17 under the biasing force applied by the first and second lever biasing springs 153 and 154, the first and second opening/closing levers 151 and 152 continue to rotate in the directions indicated by the arrows 151A and 152A, thereby turning the first and second disk housing portions 221 and 222 in the directions indicated by the arrows 221B and 222B, respectively. As a result, the window 220w is fully closed by the disk housing 220 as shown in FIG. 16.

At this point in time, the unlocking portions 62a and 62b are in contact with the openers/closers 231c and 232c of the first and second locking members 231 and 232, thus rotating the first and second locking members 231 and 232 in the directions indicated by the arrows 231A and 232A, respectively. That is why the latching portions 221c and 222c of the first and second disk housing portions 221 and 222 are out of contact with the catching lever portions 231b and 232b of the first and second locking members 231 and 232 and the first and second disk housing portions 221 and 222 are not locked.

In the state shown in FIG. 16, the first and second opening/closing levers 151 and 152 continue to rotate in the directions indicated by the arrows 151A and 152A, respectively, under the biasing force applied by the first and second lever biasing springs 153 and 154. Then, the engaging portions 151c and 152c of the first and second opening/closing levers 151 and 152 eject the disk cartridge 200' in the direction indicated by the arrow 60B while keeping in contact with the inner wall of the notches 221d and 222d of the first and second disk housing portions 221 and 222.

Then, as shown in FIG. 15, the engaging portions 151c and 152c of the first and second opening/closing levers 151 and 152 contact with the catching contact faces 221f and 222f of the notches 221d and 222d of the first and second disk housing portions 221 and 222. As a result, the disk cartridge 200' finishes being ejected in the direction indicated by the arrow 60B under the biasing force applied by the first and second lever biasing springs 153 and 154.

The contact of the first and second opening/closing levers 151 and 152 with the catching contact faces 221f and 222f prevents the disk cartridge 200' from popping out in the direction indicated by the arrow 60B and dropping out of the disk drive 502 due to the biasing force applied by the first and second lever biasing springs 153 and 154.

At this point in time, the openers/closers 231c and 232c of the first and second locking members 231 and 232 are out of contact with the unlocking portions 62a and 62b, respectively. Thus, under the elastic force applied by the elastic portions 231d and 232d, the first and second locking members 231 and 232 rotate in the directions indicated by the arrows 231B and 232B, respectively. As a result, the latching portions 221c and 222c of the first and second disk housing portions 221 and 222 get engaged with the catching lever portion 231b and 232b of the first and second locking members 231 and 232, respectively. Consequently, the first and second disk housing portions 221 and 222 are locked so as not to rotate in the directions indicated by the arrows 221A and 222A.

When the operator removes the disk cartridge 200' in the direction indicated by the arrow 60B in the state shown in FIG. 15, the first and second opening/closing levers 151 and 152 overcome the biasing force applied by the first and second lever biasing springs 153 and 154 to rotate in the directions indicated by the arrows 151B and 152B. Consequently, the engaging portions 151c and 152c of the first and second opening/closing levers 151 and 152 move while sliding on the catching contact faces 221f and 222f of the first and second disk housing portions 221 and 222.

As a result, as shown in FIG. 14, the engaging portions 151c and 152c of the first and second opening/closing levers 151 and 152 contact with the outer side surface of the first and second disk housing portions 221 and 222 and are disengaged from the catching contact faces 221f and 222f of the first and second disk housing portions 221 and 222. Consequently, the disk cartridge 200' is no longer held but can be removed from the cartridge holder 60.

Finally, when the operator removes the disk cartridge 200' in the direction indicated by the arrow 60B, the disk cartridge 200' is completely ejected from the cartridge holder 60 and the operation of closing the cartridge opening/closing mechanism 150' ends.

If the biasing force applied by the first and second lever biasing springs 153 and 154 is great, then the disk cartridge 200' can be moved from the position shown in FIG. 16 to the one shown in FIG. 15 by rotating the first and second opening/closing levers 151 and 152 in the directions indicated by the arrows 151A and 152A, respectively. However, if the frictional force caused by the engaging portions 151c and 152c of the first and second opening/closing levers 151 and 152 on the inner wall of the notches 221d and 222d of the first and second disk housing portions 221 and 222 is greater than the biasing force applied by the first and second lever biasing springs 153 and 154, the ejection of the disk cartridge 200' in the direction indicated by the arrow 60B may finish at the stage shown in FIG. 16 under the biasing force applied by the first and second lever biasing springs 153 and 154. Even so, the disk cartridge 200' is just ejected a little less forward from the cartridge holder 60. The operator can also remove the disk cartridge 200' properly by sliding the disk cartridge 200' from the position shown in FIG. 5 to the one shown in FIG. 14 in the direction indicated by the arrow 60B. In this manner, the disk cartridge 200' can be removed from the cartridge holder 60 with no problem at all.

As described above, by using link mechanisms as in the first preferred embodiment, the disk drive 502 of this preferred embodiment can open and close the first and second disk housing portions 221 and 222 while the disk cartridge 200' is being inserted or ejected.

However, unlike the first preferred embodiment, the first and second opening/closing levers 151 and 152 are driven synchronously with each other in this preferred embodiment while being interlocked with the connecting arm 155. In this manner, the first link mechanism formed by the first opening/closing lever 151 and the first disk housing portion 221 and the second link mechanism formed by the second opening/closing lever 152 and the second disk housing portion 222 are driven synchronously with each other.

Thus, while the disk cartridge 200' is being inserted or ejected, the first and second opening/closing levers 151 and 152 being interlocked with the connecting arm 155 rotate in mutually opposite directions and synchronously with each other. Consequently, as already described for the first preferred embodiment, the angles defined by the first and second opening/closing levers 151 and 152 with respect to the directions that intersect with the inserting and ejecting directions at right angles in FIG. 9 satisfy $\beta 1 = \beta 2$ at the position indicated by the solid lines and $\beta 1' = \beta 2'$ at the position indicated by the dashed lines. Likewise, since the first and second link mechanisms are arranged symmetrically with respect to the line segment L, the angles defined by the first and second disk housing portions 221 and 222 with respect to the inserting and ejecting directions also satisfy $\alpha 1 = \alpha 2$ at the position indicated by the solid lines and $\alpha 1' = \alpha 2'$ at the position indicated by the dashed lines.

Therefore, the first link mechanism formed by the first opening/closing lever 151 and the first disk housing portion 221 and the second link mechanism formed by the second opening/closing lever 152 and the second disk housing portion 222 operate symmetrically with respect to the inserting and ejecting directions of the disk cartridge 200' (i.e., with respect to the line segment L). As a result, it is possible to guarantee that the disk cartridge 200' being inserted or ejected can go straight in the inserting or ejecting direction.

As described above, the first and second link mechanisms are arranged symmetrically with respect to the inserting and ejecting directions of the disk cartridge 200' (i.e., with respect to the line segment L) and are driven synchronously with each other by way of the connecting arm 155. As a result, the disk cartridge 200' can be inserted and ejected and the disk housing 220 can be opened and closed with good stability.

In the disk cartridge 200' of the second preferred embodiment, the first and second disk housing portions 221 and 222 are not interlocked with each other at the interlocking portions 221b and 222b unlike the first and second preferred embodiments described above. That is why the disk housing 220 cannot be opened or closed with only one opening/closing lever. If the disk cartridge 200 inserted is compatible with the disk drive 501 of the first preferred embodiment, however, the disk housing 220 can be opened or closed with only one opening/closing lever. But since this operation is the same as what has already been described for the first preferred embodiment, the description thereof will be omitted herein.

In the preferred embodiments described above, the lever positioning pins 25 and 26 that position the first and second opening/closing levers 151 and 152, respectively, are arranged on the traverse base 20. However, if the precision of fitting is increased between the first and second opening/closing levers 151 and 152 and the connecting arm 155 and between the cartridge holder 60 and the connecting arm 155, the same effect will be achieved even by providing only one lever positioning pin.

As described above, a disk drive according to the preferred embodiment of the present invention described above can be used effectively to operate the disk cartridge 200' that opens and closes the window 220w with the first and second disk housing portions 221 and 222 functioning not only as shutters but also as a housing. Specifically, the first and second opening/closing levers 151 and 152 that engage with their associated notches 221d and 222d of the first and second disk housing portions 221 and 222 are arranged symmetrically with respect to the directions in which the disk cartridge 200' is inserted or ejected (i.e., the directions indicated by the arrows 60A and 60B) and are rotated synchronously with the insertion or ejection of the disk cartridge 200', thereby opening or closing the first and second disk housing portions appropriately. As a result, it is possible to guarantee that the disk cartridge 200' being inserted or ejected can go straight all the way with extremely high stability.

In addition, by rotating the first and second opening/closing levers 151 and 152, which are interlocked with the connecting arm 155, in mutually opposite directions and synchronously with each other with respect to the inserting and ejecting directions of the disk cartridge 200', the present invention can also be applied to even the disk cartridge 200' of which the first and second disk housing portions 221 and 222 do not rotate synchronously with each other.

On top of that, since the first and second opening/closing levers 151 and 152 rotate synchronously with each other while being interlocked with the connecting arm 155, only one lever biasing spring needs to be provided to apply biasing force to the first and second opening/closing levers 151 and 152. As a result, the number of members required can be reduced.

As described as the first and second preferred embodiments of the present invention, while the disk cartridge is being inserted into the disk drive of the present invention, the gap between the first and second engaging portions of the first and second opening/closing levers is narrower than the one between the guide walls. For that reason, the first and second engaging portions will soon contact and get engaged with the disk cartridge inserted. On the other hand, once the disk drive is loaded with the disk cartridge, the first and second opening/closing levers rotate such that the gap between the first and second engaging portions is wider than the gap between the guide walls. Therefore, the shutters and housing of the disk cartridge can be opened so as to protrude out of the projection area of the disk cartridge when the disk housing portions are closed. As a result, a big window can be opened. Consequently, the disk drive of the present invention is compatible with a disk cartridge that has relatively small outer dimensions but can still make a big head access window.

As described above, a disk drive according to the present invention can be used effectively to operate a disk cartridge with first and second disk housing portions functioning not only as shutters but also as a housing. Specifically, first and second opening/closing levers that engage with their associated notches of the first and second disk housing portions of the disk cartridge are arranged symmetrically with respect to a plane including the directions in which the disk cartridge is inserted or ejected and the axis of rotation of the disk and are rotated synchronously with the insertion or ejection of the disk cartridge, thereby opening or closing the first and second disk housing portions appropriately. On top of that, a link mechanism consisting of the first opening/closing lever and the first disk housing portion and another link mechanism consisting of the second opening/closing lever and the second disk housing portion are arranged symmetrically to each other, thereby getting the insertion and ejection operations done with extremely high stability such that the disk cartridge can go straight. Furthermore, the first and second disk housing portions can be held firmly by the first and second opening/closing levers and the insertion and ejection operations can also get done with as good stability as usual even when subjected to vibrations, shocks and other disturbances.

Furthermore, the pivots around which the first and second opening/closing levers rotate are arranged outside of the projection area of the disk cartridge, of which the first and second disk housing portions are opened. Thus, the interference between the first and second opening/closing levers and the disk cartridge can be avoided in the disk drive, and the thickness of the disk drive can be reduced.

Furthermore, the cartridge opening/closing mechanism, including the first and second opening/closing levers, can be arranged efficiently without exceeding the areas defined by the maximum width of the disk cartridge, of which the first and second disk housing portions are opened. As a result, the thickness and overall size of the disk drive can be cut down such that the disk drive does not occupy too much space, a broad area can be secured for the head access window, and the optical head of the disk drive can be designed more flexibly.

On top of that, a link mechanism is formed by the first opening/closing lever and the first disk housing portion and another link mechanism is formed by the second opening/closing lever and the second disk housing portion. That is why if the supporting base member is positioned with a pair of positioning pins on a base when the first and second disk housing portions are opened, a first three-point link is formed by the rotation supporting portion of the first disk housing portion, the pivot of the first opening/closing lever, and the first catching portion. On the other hand, a second three-point link is formed by the rotation supporting portion of the second disk housing portion, the pivot of the second opening/closing lever, and the second catching portion. Thus, by positioning the supporting base portion with respect to the base, the first and second three-point links define the locations and angles of all members including the opening/closing levers uniquely, get the disk cartridge loaded in its predetermined position, and eventually, the first and second disk housing portions can make a window of a predetermined size at a predetermined position. As a result, positioning can get done with a reduced number of positioning portions and yet the reliability of positioning can be improved. In addition, by directly positioning the first and second opening/closing levers with positioning pins that have been arranged on the base, the first and second disk housing portions in the opened state can be positioned even more accurately.

Moreover, the first and second opening/closing levers fit into the positioning pins arranged on the base, thereby maintaining a predetermined angle between the first and second opening/closing levers even under some disturbance such as vibrations or shocks. As a result, even under such a condition, the window can still keep sufficiently broad area and it is possible to prevent the disk cartridge from colliding against the head or disk motor.

Furthermore, by providing not only supporting portions to contact with the respective bottoms of the first and second disk housing portions that function as a housing but also a bearing surface to contact with the bottom of the supporting base member for the base that supports the disk motor, the first and second disk housing portions can be positioned vertically and minimum required clearance to rotate the disk can be left accurately. As a result, the disk drive can have a reduced thickness with unnecessary space eliminated, the first and second disk housing portions can be held firmly when opened and the steadiness of the disk cartridge can be increased in its opened state.

What is more, the first and second opening/closing levers are provided with biasing springs that apply biasing force to the first and second disk housing portions in the closing direction. Thus, when the operator performs the operation of inserting the disk cartridge, the first and second disk housing portions can be opened while being given appropriate operation load. On the other hand, in performing the ejection operation, the disk cartridge can be ejected automatically and the first and second disk housing portions can be closed just as intended by utilizing the biasing force applied by the biasing springs. Consequently, the operability of the disk drive while the disk cartridge is being inserted or ejected into/from the drive can be controlled solely according to the biasing force applied by the biasing springs. In addition, there is no need to provide any drive source or drive mechanism to get the disk cartridge insertion/ejection operation done. Consequently, the number of members required can be reduced significantly and the weight and the cost of the disk drive can also be cut down.

Besides, when the first and second disk housing portions are fully closed, the first and second engaging portions of the first and second opening/closing levers contact with the respective catching contact faces of the notches of the first and second disk housing portions in the disk cartridge. Thus, it is possible to prevent the disk cartridge being ejected automatically from popping out of the disk drive due to the excessive biasing force applied by the biasing springs. As a result, the disk cartridge can be removed from the disk drive safely and would not drop by itself accidentally during the ejection operation.

What is more, the width of the insertion slot, through which the disk cartridge is inserted and which is defined by the guide walls, is set substantially equal to the minimum width of the projection area of the disk cartridge that is defined perpendicularly to the axis of rotation of the disk. In that case, even if the disk cartridge cannot be ejected for some reason with the biasing force applied by the biasing springs and if the disk cartridge should be manually removed externally, the first and second disk housing portions that have been opened contact with, and are closed by, the guide walls while passing through the opening. Thus, the disk cartridge can also be removed with the first and second disk housing portions closed. As a result, even in an emergency where the disk cartridge cannot be ejected automatically, the disk cartridge can still be manually ejected safely without scratching the disk in the disk cartridge.

On top of that, by arranging unlocking portions on portions of the guide walls, the locking members of the disk cartridge can be unlocked at the best timing and just as intended after the disk cartridge has been inserted and before the disk cartridge is ejected. As a result, even if the disk cartridge should be ejected manually as described above, the first and second disk housing portions can be locked just as intended without breaking the locking members.

Also, after the disk cartridge has been inserted, the locking members are not pressed, thus preventing the locking members made of resin from creeping.

Furthermore, by arranging the first and second opening/closing levers closer to the holder opening of the disk drive (i.e., closer to the front end of the drive), the space left for the head and the area in which the first and second opening/closing levers are supposed to rotate do not overlap with each other. As a result, the head can be designed more flexibly. In addition, since the head does not overlap with the first and second opening/closing levers, the thickness of the disk drive can be reduced.

INDUSTRIAL APPLICABILITY

The disk cartridge of the present invention can be used effectively to read and/or write information from/on a disk housed in a disk cartridge that is designed to perform the read/write operations by any of various methods including optical, magneto-optical and magnetic ones. Among other things, the present invention is particularly effectively applicable to a disk cartridge that houses a disk of a small diameter.

The invention claimed is:

1. A disk drive to be loaded with a disk cartridge that houses a disk therein, the drive comprising:
   a cartridge holder for holding the disk cartridge, the holder having a holder opening, through which the disk cartridge is inserted from outside of the drive into the cartridge holder and ejected out of the cartridge holder;
   a pair of guide walls, which is arranged in the vicinity of the holder opening of the cartridge holder to define a direction in which the disk cartridge is supposed to be inserted;
   a disk motor for rotating the disk that has been mounted thereon;
   a head for reading and/or writing information from/on the disk;
   a base for supporting the head and the disk motor thereon;
   a first opening/closing lever, which has a first engaging portion that engages with a portion of the disk cartridge and which rotates while the disk cartridge is being inserted or ejected; and
   a second opening/closing lever, which has a second engaging portion that engages with another portion of the disk cartridge and which rotates while the disk cartridge is being inserted or ejected,
   wherein the first and second opening/closing levers rotate and get engaged with the disk cartridge so as to leave a narrower gap between the first and second engaging portions than between the guide walls when the disk cartridge is being inserted but to leave a broader gap between the first and second engaging portions than between the guide walls when the drive gets loaded with the disk cartridge, thereby opening a window in the disk cartridge so as to allow the head to access the disk and also allow the disk motor to mount the disk.

2. The disk drive of claim 1, wherein the respective axes of rotation of the first and second opening/closing levers are located closer to the holder opening than the center of the disk is when the disk drive is loaded with the disk cartridge.

3. The disk drive of claim 2, wherein the respective axes of rotation of the first and second opening/closing levers are arranged near the guide walls on the cartridge holder.

4. The disk drive of claim 3, wherein the disk cartridge includes:
　first and second disk housing portions, each of which has a space to house the disk partially and which house the disk entirely when joined together; and
　a supporting base member for supporting the first and second disk housing portions so as to allow the first and second disk housing portions to turn around their respective pivots,
　wherein the first and second engaging portions of the first and second opening/closing levers interlock with the first and second disk housing portions, respectively, thereby turning the first and the second disk housing portions so as to open a window in the disk cartridge being inserted.

5. The disk drive of claim 4, wherein each of the first and second disk housing portions of the disk cartridge includes:
　a notch, with which an associated one of the first and second engaging portions of the first and second opening/closing levers engages rotatably; and
　an interlocking portion,
　wherein the interlocking portions of the first and second disk housing portions engage with each other such that the first and second disk housing portions turn around the pivots in mutually opposite directions and synchronously with each other.

6. The disk drive of claim 5, wherein while the disk cartridge is being inserted or ejected, the first engaging portion gets engaged rotatably with the notch of the first disk housing portion, thereby forming a first link mechanism, of which the nodes are defined by the pivot of the first opening/closing lever, the engagement between the first engaging portion and the notch, and the pivot of the first disk housing portion, and
　the second engaging portion also gets engaged rotatably with the notch of the second disk housing portion, thereby forming a second link mechanism, of which the nodes are defined by the pivot of the second opening/closing lever, the engagement between the second engaging portion and the notch, and the pivot of the second disk housing portion, and
　wherein the first and second disk housing portions rotate around their pivots in mutually opposite directions and synchronously with each other, thereby enabling the first and second link mechanisms to keep the inserting direction of the disk cartridge constant.

7. The disk drive of claim 6, wherein the guide walls are arranged only in the vicinity of the holder opening.

8. The disk drive of claim 5, further comprising a positioning portion to contact with the outer edge of the disk when the disk cartridge is loaded,
　wherein the positioning portion and the disk contact with each other, thereby positioning the center of the disk with respect to the disk motor.

9. The disk drive of claim 8, wherein the positioning portion forms part of the cartridge holder.

10. The disk drive of claim 9, wherein the first and second opening/closing levers have guide faces in the vicinity of the first and second engaging portions, the guide faces contacting with the bottom of the first and second disk housing portions while the disk cartridge is being inserted or ejected.

* * * * *